US012803731B2

(12) United States Patent
Yu et al.

(10) Patent No.: US 12,803,731 B2
(45) Date of Patent: Nov. 17, 2026

(54) DMRS CONFIGURATION METHOD AND DEVICE

(71) Applicant: HUAWEI TECHNOLOGIES CO., LTD., Shenzhen (CN)

(72) Inventors: Yawei Yu, Shenzhen (CN); Zhiheng Guo, Beijing (CN); Jian Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 313 days.

(21) Appl. No.: 18/352,257

(22) Filed: Jul. 14, 2023

(65) Prior Publication Data

US 2023/0361960 A1 Nov. 9, 2023

Related U.S. Application Data

(63) Continuation of application No. PCT/CN2021/085515, filed on Apr. 5, 2021.

(30) Foreign Application Priority Data

Jan. 15, 2021 (WO) ................ PCT/CN2021/072329

(51) Int. Cl.
*H04L 5/00* (2006.01)
*H04W 8/24* (2009.01)
(Continued)

(52) U.S. Cl.
CPC ............. *H04L 5/0048* (2013.01); *H04W 8/24* (2013.01); *H04W 72/1263* (2013.01); *H04W 72/23* (2023.01)

(58) Field of Classification Search
CPC ................. H04L 5/0048; H04L 5/0087; H04L 5/0091; H04L 25/0224; H04L 27/261;
(Continued)

(56) References Cited

U.S. PATENT DOCUMENTS

2018/0145809 A1 5/2018 Kwak et al.
2020/0389283 A1* 12/2020 Manolakos ........... H04L 5/0051
2020/0403768 A1* 12/2020 Manolakos ......... H04L 25/0224
(Continued)

FOREIGN PATENT DOCUMENTS

CN 109983730 A 7/2019
WO 2020247152 A1 12/2020
(Continued)

OTHER PUBLICATIONS

Provisional U.S. Appl. No. 63/061,397 , Hasegawa, filed Aug. 5, 2020, entire document , 2020.*
(Continued)

*Primary Examiner* — Ian N Moore

(57) ABSTRACT

In a demodulation reference signal (DMRS) configuration method, a terminal device receives first scheduling information and based thereon, determines whether a transmission of a first time unit meets a condition of having the same transmit power, same precoding, same antenna port, or a same frequency domain resource as the transmission of a second time unit. The second time unit is before the first time unit and has a transmission direction that is the same as a transmission direction in the in the first time unit, and no transmission in an opposite direction exists between the second time unit and the first time unit. When the first time unit meets the above condition, the terminal device sends uplink data in the first time unit and the second time unit, or receiving downlink data in the first time unit and the second time unit.

20 Claims, 9 Drawing Sheets

(51) Int. Cl.
*H04W 72/1263* (2023.01)
*H04W 72/23* (2023.01)

(58) Field of Classification Search
CPC .................. H04L 5/0023; H04W 8/24; H04W 72/1263; H04W 72/23
See application file for complete search history.

(56) References Cited

U.S. PATENT DOCUMENTS

2021/0014095 A1* 1/2021 Ly .......................... H04W 72/23
2021/0226748 A1* 7/2021 Frenne ................ H04L 25/0204
2023/0291523 A1* 9/2023 Hasegawa ............. H04L 5/0094

FOREIGN PATENT DOCUMENTS

WO 2020256903 A1 12/2020
WO 2021007239 A1 1/2021
WO 2021062815 A1 4/2021
WO 2021114173 A1 6/2021

OTHER PUBLICATIONS

Provisional U.S. Appl. No. 63/091,454 , Hasegawa, filed Oct. 14, 2020, entire document , 2020.*

3GPP TS 38.212 V16.4.0 (Dec. 2020), 3rd Generation Partnership Project; Technical Specification Group Radio Access Network;NR; Multiplexing and channel coding (Release 16), total 152 pages.

Sharp, Joint channel estimation for PUSCH, 3GPP TSG RAN WG1 #104-e, R1-2101547, e-Meeting, Jan. 25-Feb. 5, 2021, total 3 pages.

3GPP TS 38.214 V16.4.0 (Dec. 2020), 3rd Generation Partnership Project; Technical Specification Group Radio Access Network;NR;Physical layer procedures for data(Release 16), 169 pages.

Xiaomi, PUSCH coverage enhancement, 3GPP TSG RAN WG1 #103-e, R1-2007640, e-Meeting, Oct. 26-Nov. 13, 2020, total 7 pages.

Qualcomm Incorporated, Potential coverage enhancement techniques for PUSCH , 3GPP TSG-RAN WG1 Meeting #103e, R1-2008626, e-Meeting, Oct. 26-Nov. 13, 2020, total 13 pages.

NTT DOCOMO, Inc., Joint channel estimation for PUSCH, 3GPP TSG RAN WG1 #104e, R1-2101643, e-Meeting, Jan. 25-Feb. 5, 2021, total 3 pages.

InterDigital Inc., Discussions on joint channel estimation for PUSCH, 3GPP TSG RAN WG1 #104-e, R1-2100733, e-Meeting, Jan. 25-Feb. 5, 2021, total 7 pages.

Huawei, HiSilicon, Potential solutions for PUSCH coverage enhancement, 3GPP TSG RAN WG1 Meeting #103-e, R1-2007583, E-meeting, Oct. 26-Nov. 13, 2020, total 11 pages.

Nokia, Nokia Shanghai Bell, Joint channel estimation for PUSCH coverage enhancements, 3GPP TSG RAN WG1 #104-e, R1-2101712, e-Meeting, Jan. 25-Feb. 5, 2021, total 5 pages.

* cited by examiner

DMRS CONFIGURATION METHOD AND DEVICE

CROSS-REFERENCE TO RELATED APPLICATIONS

This application is a continuation of International Application PCT/CN2021/085515, filed on Apr. 5, 2021, which claims priority to International Application PCT/CN2021/072329, filed on Jan. 15, 2021. The disclosures of the aforementioned applications are hereby incorporated by reference in their entirety.

TECHNICAL FIELD

This application relates to the field of wireless communication, and in particular, to a DMRS configuration method and a device.

BACKGROUND

A demodulation reference signal (DMRS) is defined in the new radio (NR) protocol for channel estimation. A network side configures different DMRSs for a terminal based on channel quality, to ensure communication performance. Same precoding is performed on data carried in the DMRSs and a physical uplink shared channel (PUSCH) or a physical downlink shared channel (PDSCH). Therefore, a receive end can demodulate, based on channel state information estimated based on the DMRSs, the data transmitted on the PUSCH or the PDSCH. When a channel is poor, a network device may configure a large quantity of DMRSs to improve accuracy of channel estimation. When a channel is good, a network device may configure a small quantity of DMRSs to reduce time-frequency resource overheads of the DMRSs.

In the current new radio (NR) technology, a quantity of DMRSs is determined and configured based on radio resource control (RRC) signaling, and the RRC signaling is updated slowly. A quantity of DMRSs in each time of sending is determined by using same DMRS configuration information for a plurality times of sending within the duration before the update. Consequently, a quantity of configured DMRSs cannot be dynamically adjusted by flexibly matching channel fading changes of different sending, resulting in a poor channel estimation capability.

SUMMARY

This application provides a DMRS configuration method and a device, to implement flexible adaptation between a quantity of DMRSs and channel quality.

According to a first aspect, a DMRS configuration method is provided, and the method includes: A terminal device receives first scheduling information sent by a network device, where the first scheduling information is used by the terminal device to determine whether transmission in a first time unit meets a first condition, where when the first scheduling information is the same as second scheduling information of a second time unit, transmission in the first time unit meets the first condition, or when the first scheduling information is different from second scheduling information of a second time unit, transmission in the first time unit does not meet the first condition;

the second time unit is a time unit before the first time unit, a transmission direction in the first time unit is the same as a transmission direction in the second time unit, and no transmission in an opposite direction exists between the second time unit and the first time unit; and the first condition includes at least one of same transmit power, same precoding, a same antenna port, and a same frequency domain resource;

transmission in the first time unit meets the first condition, and transmission in the first time unit is the same as transmission in the second time unit; and the terminal device sends uplink data in the first time unit and the second time unit, or by the terminal device receives downlink data in the first time unit and the second time unit.

This technical solution is performed by the terminal device. Transmission in a plurality of time units is limited, so that the plurality of time units meet a requirement of joint channel estimation, and phase continuity between sending in the first time unit and sending in the second time unit can be maintained. DMRSs that meet the phase continuity in the first time unit and the second time unit can be combined when data is received, to implement more accurate channel estimation and improve demodulation performance of transmitted data.

With reference to the first aspect, in some implementations of the first aspect, the first scheduling information and the second scheduling information are carried in downlink control information DCI.

When it is determined whether transmission in a current time unit and transmission in a previous time unit meet a specific limitation condition, scheduling information for implementing this function is directly carried in DCI corresponding to each time unit scheduled by a base station. Specifically, a redundant field or a newly added field of the DCI may be reused. This can reduce a delay, and has high compatibility.

With reference to the first aspect, in some implementations of the first aspect, the terminal device receives third scheduling information sent by the network device, where the third scheduling information indicates that the terminal device meets a second condition within first duration, and the second condition includes one or more of the following:

The sending device does not turn off a power amplifier, the sending device does not perform carrier frequency switching, or the sending device does not perform antenna switching.

In this technical solution, a sending device may be understood as a data sending device, namely, any one of the network device or the terminal device. The first duration may be understood as a time period, and a time domain symbol in which no data is transmitted or a periodic time period exists between the first time unit and the second time unit. The third scheduling information may be used to limit a case in which the second condition needs to be met within the first duration when the terminal device sends uplink data or the network device sends downlink data, that is, the terminal device or the network device does not turn off the power amplifier, perform carrier frequency switching, or perform antenna switching within the first duration. Joint channel estimation may be performed in a time unit that meets the second condition.

Sending of uplink data or downlink data is further limited by using the third scheduling information, thereby improving a possibility of joint channel estimation, and further improving accuracy of channel estimation.

The third scheduling information in this technical solution may be scheduling information that is different from the first scheduling information, or may be scheduling information that is the same as the first scheduling information, that is, if the first scheduling information indicates that the first time unit meets the first condition, by default, the second condition also needs to be met when the first time unit and the second time unit are inconsecutive.

With reference to the first aspect, in some implementations of the first aspect, the second condition is valid within the first duration, and the first duration is configured by the network device by using radio resource control RRC signaling, or the first duration is predefined.

In this technical solution, sending of downlink data or uplink data may be limited within the first duration. If the time exceeds first limiting time, sending of data by the network device or the terminal device is not limited by the second condition.

In this technical solution, the network device may configure one first duration by using the RRC signaling. A value of the first duration may be several slots, several milliseconds, several time domain symbols, or the like. The value of the first duration is used to determine effective limiting time of the second condition. Alternatively, the first duration is predefined. In this case, the network device does not need to separately configure and send the third scheduling information. This reduces signaling overheads of the network device.

With reference to the first aspect, in some implementations of the first aspect, before the terminal device receives the downlink data, the method further includes: The terminal device reports capability information to the network device, where the capability information indicates whether the terminal device can support joint channel estimation in a plurality of time units.

In this technical solution, the capability information may be indication information of 1 bit, one parameter configured by the network device, or indication information of a plurality of bits.

The capability information is indication information of 1 bit, and a value of the 1 bit notifies the network device whether the terminal device can support joint channel estimation in a plurality of time units. For example, when the value of the 1 bit is 1, the terminal device can support joint channel estimation in a plurality of time units, and when the value of the 1 bit is 0, the terminal device cannot support joint channel estimation in a plurality of time units.

The capability information is one parameter configured by the terminal device, and the parameter includes a plurality of bits. Different values of the parameter indicate a maximum quantity of different time units in which the terminal device can support joint channel estimation. A value of the parameter may directly indicate a quantity of time units in which the terminal device can support joint channel estimation, that is, the value of the parameter is the same as the maximum quantity of time units in which the terminal device can support joint channel estimation. For example, if a value of the capability information is 6, it indicates that the terminal device can support joint channel estimation in a maximum of six time units. The value of the parameter may alternatively correspond to a quantity of time units based on a predefined relationship. For example, the predefined relationship is that the value of the parameter is half of the maximum quantity of time units in which the terminal device can support joint channel estimation. For example, if the value of the capability information is 3, it indicates that the terminal device can support joint channel estimation in six time units.

The capability information includes indication information of a plurality of bits, and the plurality of bits include a first bit part and a second bit part. A value of the first bit indicates whether the network device and the terminal device can support joint channel estimation in a plurality of time units. A value of the second bit part indicates the maximum quantity of time units in which the terminal device can support joint channel estimation. In this technical solution, the terminal device actively reports the capability information to notify the network device of whether the terminal device can perform joint channel estimation in a plurality of time units. This improves efficiency of limiting downlink data sending by the network device.

With reference to the first aspect, in some implementations of the first aspect, a quantity of time units included in the first time unit and a quantity of time units included in the second time unit may be the same or different.

With reference to the first aspect, in some implementations of the first aspect, the time unit is any one of the following: a slot, a sub-slot, a frame, a subframe, or a time domain resource occupied by one time of data block transmission.

According to a second aspect, a DMRS configuration method is provided, where the method includes: A terminal device receives first indication information sent by a network device, where the first indication information indicates a quantity of time units between a third time unit and a fourth time unit, the third time unit belongs to a plurality of time units, the fourth time unit is a time unit in the plurality of time units that has a same quantity of configured demodulation reference signals DMRSs as the third time unit and that is closest to the third time unit, at least one fifth time unit is included between the third time unit and the fourth time unit, and a quantity of DMRSs configured in the fifth time unit is less than the quantity of DMRSs configured in the third time unit.

The technical solution is performed by the terminal device. An interval between time units in which a large quantity of DMRSs can be configured is determined by using the first indication information, and a small quantity of DMRSs are configured in a middle time unit. In this way, total DMRS overheads in a plurality of time units can be reduced, and spectral efficiency of a system can be improved.

With reference to the second aspect, in some implementations of the second aspect, the method further includes: The terminal device receives second indication information sent by the network device, where the second indication information is used to determine that a quantity of the plurality of time units is K, and K is a positive integer greater than or equal to 2, where data blocks transmitted in all of the K time units are the same, and the second indication information is used to determine a quantity of times of repeated transmission of the data block; or data blocks transmitted in all of the K time units are different from each other, and the second indication information is used to determine the quantity of the K time units; or the K time units include a plurality of data blocks, some of the plurality of data blocks are the same and the others are different, and the second indication information is used to determine the quantity of the K time units.

In this technical solution, when data blocks transmitted in the plurality of time units are not completely the same, a quantity of time units in which a quantity of DMRSs is jointly configured may be determined based on a value of the second indication information. When a same data block is transmitted in a plurality of time units, the second indication information indicates whether a function of joint channel estimation in the K time units is enabled, and a quantity of times of repeated transmission is configured by using RRC signaling.

With reference to the second aspect, in some implementations of the second aspect, the quantity of time units between the third time unit and the fourth time unit indicated by using the first indication information is greater than the quantity of the plurality of time units determined by using the second indication information minus 2. In this case, DMRSs in the K time units are configured in a dense-to-sparse manner.

In this technical solution, the third time unit is a head time unit in the K time units determined by using the second indication information, and the fourth time unit is not in the K time units. In this case, a large quantity of time units are configured in the third time unit, and a small quantity of DMRSs are configured in another time unit. A quantity of DMRSs in the middle time unit is less than the quantity of DMRSs configured in the third time unit.

According to the present technology, quick and accurate channel estimation is performed by using a plurality of DMRSs centralized in one time unit. This reduces a delay, and improves efficiency of demodulating data.

With reference to the second aspect, in some implementations of the second aspect, before the terminal device receives data in the plurality of time units, the method further includes: The terminal device reports first capability information to the network device; where the first capability information indicates that the terminal device can support joint channel estimation in a maximum of M time units, and M is a positive integer greater than or equal to 2.

In this technical solution, an indication of the first capability information may be indication information of 1 bit, one parameter configured by the network device, or indication information of a plurality of bits.

The capability information is indication information of 1 bit, and a value of the 1 bit notifies the network device whether the terminal device can support joint channel estimation in the K time units. For example, when the value of the 1 bit is 1, the terminal device can support joint channel estimation in the K time units, and when the value of the 1 bit is 0, the terminal device cannot support joint channel estimation in the K time units.

The capability information is one parameter configured by the terminal device, and the parameter includes a plurality of bits. Different values of the parameter indicate that the terminal device can support joint channel estimation in a maximum of M time units. A value of the parameter may directly indicate a quantity of time units in which the terminal device can support joint channel estimation, that is, the value of the parameter is the same as the maximum quantity of time units in which the terminal device can support joint channel estimation. For example, if a value of the capability information is 6, it indicates that the terminal device can support joint channel estimation in a maximum of six time units. The value of the parameter may alternatively correspond to a quantity of time units based on a predefined relationship. For example, the predefined relationship is that the value of the parameter is half of the maximum quantity of time units in which the terminal device can support joint channel estimation. For example, if the value of the capability information is 3, it indicates that the terminal device can support joint channel estimation in six time units.

The capability information includes indication information of a plurality of bits, and the plurality of bits include a first bit part and a second bit part. A value of the first bit indicates whether the network device and the terminal device can support joint channel estimation in the K time units. A value of the second bit part indicates that the terminal device can support joint channel estimation in a maximum of M time units.

In this technical solution, the terminal device actively reports the first capability information, to notify the network device of whether the terminal device can perform joint channel estimation in the K time units. This improves data transmission efficiency.

With reference to the second aspect, in some implementations of the second aspect, K is less than or equal to M.

In this technical solution, when a value of K indicated by the network device is less than the value M of the maximum quantity of time units that can be supported by the terminal device, the terminal device can receive DMRSs sent in the K time units, and perform joint channel estimation in the K time units.

It should be understood that the terminal device does not expect that a quantity of time units for joint channel estimation indicated in indication information delivered by the network device is less than the quantity of time units in which the terminal device can support joint channel estimation. When the quantity of time units for joint channel estimation indicated in the indication information delivered by the network device is greater than the quantity of time units in which the terminal device can support joint channel estimation, when the terminal device performs operations related to joint channel estimation, “interruption processing” or “sliding processing” is used. For a specific operation manner, refer to the following descriptions. Details are not described herein.

With reference to the second aspect, in some implementations of the second aspect, the first indication information and the second indication information may be carried in radio resource control RRC signaling.

With reference to the second aspect, in some implementations of the second aspect, when only one front-loaded DMRS is configured in a $j^{th}$ time unit in the K time units, a start time domain symbol occupied by the front-loaded DMRS is a middle time domain symbol of the $j^{th}$ time unit. The $j^{th}$ time unit is any time unit other than a head time unit and a tail time unit in the K time units, where j is a positive integer greater than or equal to 1 and less than or equal to K.

In this technical solution, the “middle” time domain symbol refers to any possible time domain symbol in the middle third of the $j^{th}$ time unit. Ensuring that a DMRS is in a middle part of a time unit helps improve spectral efficiency and channel estimation accuracy of the system.

With reference to the second aspect, in some implementations of the second aspect, the start time domain symbol occupied by the front-loaded DMRS is configured by using RRC signaling or is predefined.

With reference to the second aspect, in some implementations of the second aspect, a time unit in the plurality of time units is any one of the following: a slot, a sub-slot, a frame, a subframe, or a time domain resource occupied by one time of data block transmission.

According to a third aspect, a DMRS configuration method is provided, and the method includes: A terminal device receives first downlink control information DCI sent by a network device, where the first DCI indicates a first DMRS configuration pattern, the first DMRS configuration pattern belongs to a DMRS configuration pattern set, and the DMRS configuration pattern set includes at least two different DMRS configuration patterns; and the terminal device determines, based on the first DMRS configuration pattern, quantities of DMRSs configured in K time units, where quantities of DMRSs configured in at least two of the K time units are different, and K is a positive integer greater than or equal to 2.

The technical solution is performed by the terminal device. The terminal device determines, by using the first DCI, the first DMRS configuration pattern from the set that includes a plurality of different DMRS configuration patterns, and in the DMRS configuration pattern, the quantities of DMRSs configured in at least two time units are different. This implements dynamic and flexible scheduling of a DMRS configuration pattern, reduces a delay, and improves adaptation between channel quality and a quantity of DMRSs.

With reference to the third aspect, in some implementations of the third aspect, K is predefined, or K is indicated by the network device by using additional indication information, or is determined by a quantity of pieces of value content in the first DMRS configuration pattern.

In this technical solution, a value of K is flexible and varied. If K is predefined, signaling overheads can be reduced to some extent. Alternatively, K may be determined by the network device by using the additional indication information. When a same transport block is transmitted in a plurality of time units, the additional indication information is used to determine a quantity of times of repeated transmission of a data block; or when transport blocks that are not completely the same are transmitted in a plurality of time units, the indication information is used to determine a quantity of different data blocks. Not completely the same may be understood as that the data blocks transmitted in the plurality of time units are different from each other, or may be understood as that some data blocks transmitted in the plurality of time units are the same, and the other data blocks transmitted in the plurality of time units are different. Alternatively, K may be determined based on a quantity of corresponding parameters dmrs-Additional Position in the first DMRS pattern. For example, when the value content in the first DMRS configuration pattern is {Pos2, Pos0, Pos2, Pos0}, that is, includes four values, the first DMRS configuration pattern implicitly indicates performing joint DMRS configuration in K=4 time units. That is, a maximum of 2, 0, 2, and 0 additional DMRSs can be configured in a $1^{st}$ to $4^{th}$ time units respectively.

With reference to the third aspect, in some implementations of the third aspect, in an additional DMRS configuration pattern set, max Length can have only one value, that is, quantities of time domain symbols occupied by front-loaded DMRSs in all time units are the same. Certainly, in an additional DMRS configuration pattern set, max Length may have two values, that is, in each configuration solution, quantities of time domain symbols occupied by a front-loaded DMRS in time units are different.

With reference to the third aspect, in some implementations of the third aspect, the DMRS configuration pattern set is configured by using radio resource control RRC signaling, and the DMRS configuration pattern set is a predefined configuration pattern set.

With reference to the third aspect, in some implementations of the third aspect, the first DCI indicates an index value of the first DMRS configuration pattern. Before the terminal device receives the first DCI sent by the network device, the method further includes: The terminal device receives media access control control element MAC CE signaling sent by the network device, where the MAC CE signaling is used to activate determining the first DMRS configuration pattern from the DMRS configuration pattern set by the terminal device based on the index value of the first DMRS configuration pattern.

In this technical solution, if the network device does not send trigger signaling, namely, the MAC CE signaling, to the terminal device, that is, there is no MAC CE signaling to activate determining the first DMRS pattern by the terminal device based on the first DCI, the terminal device still configures a DMRS in each time unit based on values of parameters such as dmrs-Additional Position and max Length that are configured by using the RRC signaling, and performs uplink sending or downlink receiving.

In this technical solution, the first DMRS pattern is determined by using the index value of the first DCI. This reduces the delay, implements dynamic and flexible scheduling of the DMRS configuration pattern, and improves adaptation between channel quality and the quantity of DMRS s.

With reference to the third aspect, in some implementations of the third aspect, when only one front-loaded DMRS is configured in a $j^{th}$ time unit in the K time units, a start time domain symbol occupied by the front-loaded DMRS is a middle time domain symbol of the $j^{th}$ time unit. The $j^{th}$ time unit is any time unit other than a head time unit and a tail time unit in the K time units, where j is a positive integer greater than or equal to 1 and less than or equal to K.

In this technical solution, the "middle" time domain symbol refers to any possible time domain symbol in the middle third of the $j^{th}$ time unit. Ensuring that a DMRS is in a middle part of a time unit helps improve spectral efficiency and channel estimation accuracy of the system.

With reference to the third aspect, in some implementations of the third aspect, the start time domain symbol occupied by the front-loaded DMRS is configured by using RRC signaling or is predefined.

With reference to the third aspect, in some implementations of the third aspect, the time unit is any one of the following: a slot, a sub-slot, a frame, a subframe, or a time domain resource occupied by one time of data block transmission.

With reference to the third aspect, in some implementations of the third aspect, the DMRS configuration pattern set may further include any one of an additional DMRS quantity configuration set, an additional DMRS quantity variation configuration set, a total DMRS quantity configuration set, or a total DMRS quantity variation configuration set.

According to a fourth aspect, a DMRS configuration method is provided. The method includes: A terminal device receives first information sent by a network device, where the first information indicates to use same transmit power in K time units or perform joint channel estimation in K time units; and the terminal device determines, based on the first information, that a maximum of one additional demodulation reference signal DMRS is configured in each of the K time units, where K is a positive integer greater than or equal to 2.

This technical solution is performed by the terminal device, to determine, by using the first information, that the same transmit power is used in the K time units or joint channel estimation is performed in the K time units, and a maximum of one additional demodulation reference signal DMRS is configured in each of the K time units. This can implement more accurate channel estimation, improves demodulation performance of transmitted data is improved, and reduces total DMRS overheads.

With reference to the fourth aspect, in some implementations of the fourth aspect, K is greater than a first threshold.

The first threshold is predefined, or the first threshold is indicated by the network device by using second information. The second information and the first information are carried in same signaling, or the second information and the first information are carried in different signaling.

In this technical solution, the network device further configures a first threshold. When joint channel estimation is performed in the K time units, when K is greater than or equal to the first threshold, a maximum of one DMRS is configured in each of the K time units. That is, a candidate value of the additional DMRS can only be {0, 1}. During joint channel estimation, more DMRSs are available compared with a quantity of DMRSs in a single time unit. Therefore, two or three additional DMRSs do not need to be configured in each time unit. This reduces DMRS overheads.

With reference to the fourth aspect, in some implementations of the fourth aspect, the first information is carried in downlink control information DCI or radio resource control RRC signaling.

With reference to the fourth aspect, in some implementations of the fourth aspect, a possible value of the first threshold may be 2, 4, 8, or the like, and the first threshold is greater than or equal to 2.

With reference to the fourth aspect, in some implementations of the fourth aspect, when only one front-loaded DMRS is configured in a $j^{th}$ time unit in the K time units, a start time domain symbol occupied by the front-loaded DMRS is a middle time domain symbol of the $j^{th}$ time unit. The $j^{th}$ time unit is any time unit other than a head time unit and a tail time unit in the K time units, where j is a positive integer greater than or equal to 1 and less than or equal to K.

In this technical solution, the "middle" time domain symbol refers to any possible time domain symbol in the middle third of the $j^{th}$ time unit. Ensuring that a DMRS is in a middle part of a time unit helps improve spectral efficiency and channel estimation accuracy of the system.

With reference to the fourth aspect, in some implementations of the fourth aspect, the start time domain symbol occupied by the front-loaded DMRS is configured by using RRC signaling or is predefined.

With reference to the fourth aspect, in some implementations of the fourth aspect, the time unit is any one of the following: a slot, a sub-slot, a frame, a subframe, or a time domain resource occupied by one time of data block transmission.

According to a fifth aspect, a DMRS configuration method is provided. The method includes:

A terminal device receives third indication information sent by a network device, where the third indication information includes N values, the N values are in a one-to-one correspondence with N time units, and an $i^{th}$ value in the N values indicates a quantity of demodulation reference signals DMRSs in an $i^{th}$ time unit in the N time units, where i and N are positive integers, and $1 \le i \le N$; and the terminal device determines a quantity of DMRSs in each of the N time units based on the third indication information.

This technical solution is performed by the terminal device. Information about a quantity of DMRSs in the K time units is configured by using the third indication information. This implements joint and flexible DMRS quantity configuration in the K time units.

With reference to the fifth aspect, in some implementations of the fifth aspect, a quantity of time domain symbols occupied by a front-loaded DMRS is 1, and the $i^{th}$ value is determined by using 2 bits. Alternatively, a quantity of time domain symbols occupied by a front-loaded DMRS is 2, and the $i^{th}$ value is determined by using 1 bit.

In this technical solution, a DMRS occupies a maximum of four time domain symbol positions in a time unit. Therefore, when the front-loaded DMRS occupies one time domain symbol, an additional DMRS also occupies one time domain symbol, that is, a maximum of four DMRSs may be configured in one time unit. Information about a quantity of DMRSs may be determined by using a value of 2 bits. When the front-loaded DMRS occupies two time domain symbols, the additional DMRS also occupies two time domain symbols, that is, a maximum of two DMRSs can be configured in one time unit. Information about a quantity of DMRSs may be determined by using a value of 1 bit.

With reference to the fifth aspect, in some implementations of the fifth aspect, the third indication information may be carried in radio resource control RRC signaling or downlink control information DCI.

In this technical solution, when the third indication information is carried in the RRC signaling, the third indication information includes N values, which are {Pos s1, Pos s2, Pos s3, . . . , and Pos sN}. Each value corresponds to a position of an additional DMRS in each of the N time units, and a value of Pos si corresponds to information about a quantity of DMRSs in the $i^{th}$ time unit in the N time units. The network device or the terminal device may flexibly configure the quantity of DMRSs in the N time units by using the third indication information. During joint channel estimation, sufficient accuracy of channel estimation can be ensured. In addition, low total DMRS overheads can be ensured. This helps improve transmission efficiency and performance.

When the third indication information is carried in the DCI, the third indication information includes N groups of bits, the N groups of bits are in a one-to-one correspondence with the N time units, and the $i^{th}$ value in the N values corresponds to an $i^{th}$ group of bits in the N groups of bits. That is, the $i^{th}$ value is determined by using the $i^{th}$ group of bits. The network device or the terminal device may indicate configuration of the quantity of DMRSs in the N time units by using the third indication information carried in the DCI. This implements dynamic adjustment of the quantity of configured DMRSs and reduces a delay.

With reference to the fifth aspect, in some implementations of the fifth aspect, the information about the quantity of DMRSs includes any one of the following types of information: a quantity of additional DMRSs, a total quantity of DMRSs, a variation of the quantity of additional DMRSs, and a variation of the total quantity of DMRSs. The total quantity of DMRSs is a sum of the quantity of additional DMRSs and a quantity of front-loaded DMRSs.

With reference to the fifth aspect, in some implementations of the fifth aspect, the network device sends configuration information to the terminal device, where the configuration information is used to determine a type of the information about the quantity of DMRSs.

In this technical solution, when the third indication information is carried in the RRC signaling, the type of the information about the quantity of DMRSs is indicated by the network device by using the configuration information, which includes determining the type of the information about the quantity of DMRSs by using a value of the configuration information or an index value of the value. An indication manner is not specifically limited in this embodiment of this application. If the network device does not send the information to the terminal device, or when a value of the indication information is a default value, the $i^{th}$ value indicates a quantity of additional DMRSs in the $i^{th}$ time unit by default. When the third indication information is carried in the DCI, the type of the information about the quantity of DMRSs is indicated by the network device by using the configuration information, which includes determining the type of the information about the quantity of DMRSs by using a value of the configuration information or an index value of the value.

With reference to the fifth aspect, in some implementations of the fifth aspect, the $i^{th}$ value indicates the quantity of additional DMRSs in the $i^{th}$ time unit. The method further includes: The terminal device receives fourth indication information sent by the network device, where the fourth indication information indicates that no front-loaded DMRS is configured in the $i^{th}$ time unit.

In this technical solution, if the network device does not send the fourth indication information to the terminal device, or when a value of the fourth indication information is a default value, a front-loaded DMRS is configured in the $i^{th}$ time unit by default.

With reference to the fifth aspect, in some implementations of the fifth aspect, the $i^{th}$ value indicates a variation of the quantity of additional DMRSs in the $i^{th}$ time unit. The method further includes:

The terminal device receives fifth indication information sent by the network device, where the fifth indication information indicates whether a front-loaded DMRS is configured in the $i^{th}$ time unit.

With reference to the fifth aspect, in some implementations of the fifth aspect, the third indication information is carried in the DCI. The method further includes:

The terminal device determines the quantity of additional DMRSs in the $i^{th}$ time unit based on the third indication information, where the $i^{th}$ value indicates the quantity of additional DMRSs in the $i^{th}$ time unit; or

- the terminal device determines a total quantity of DMRSs in the $i^{th}$ time unit based on the third indication information, where the $i^{th}$ value indicates the total quantity of DMRSs in the $i^{th}$ time unit; or
- the terminal device determines the quantity of additional DMRSs in the $i^{th}$ time unit based on the third indication information and the RRC signaling, where the $i^{th}$ value indicates the variation of the quantity of additional DMRSs in the $i^{th}$ time unit, and the RRC signaling indicates the quantity of additional DMRSs in the $i^{th}$ time unit; or
- the terminal device determines a total quantity of DMRSs in the $i^{th}$ time unit based on the third indication information and the RRC signaling, where the $i^{th}$ value indicates a variation of the total quantity of DMRSs in the $i^{th}$ time unit, and the RRC signaling indicates the quantity of additional DMRSs in the $i^{th}$ time unit.

In this technical solution, when the third indication information is carried in the DCI, when the third indication information indicates information about a quantity of additional DMRSs in the N time units or information about a total quantity of DMRSs in the N time units, the terminal device or the network device configures the quantity of additional DMRSs or the total quantity of DMRSs in the N time units based on the third indication information. That is, the DCI covers a value of the quantity of additional DMRSs configured in the original RRC signaling. This implements dynamic adjustment of the quantity of DMRSs in the K time units.

When the third indication information indicates information about a variation of a quantity of additional DMRSs in the N time units or information about a variation of a total quantity of DMRSs in the N time units, the terminal device or the network device performs algebra calculation based on the third indication information with reference to a value of the quantity of additional DMRSs configured in the original RRC signaling, to configure the quantity of additional DMRSs or the total quantity of DMRSs in the N time units.

With reference to the fifth aspect, in some implementations of the fifth aspect, when only one front-loaded DMRS is configured in a $j^{th}$ time unit in the K time units, a start time domain symbol occupied by the front-loaded DMRS is a middle time domain symbol of the $j^{th}$ time unit. The $j^{th}$ time unit is any time unit other than a head time unit and a tail time unit in the K time units, where j is a positive integer greater than or equal to 1 and less than or equal to K.

In this technical solution, the "middle" time domain symbol refers to any possible time domain symbol in the middle third of the $j^{th}$ time unit. Ensuring that a DMRS is in a middle part of a time unit helps improve spectral efficiency and channel estimation accuracy of the system.

With reference to the fifth aspect, in some implementations of the fifth aspect, the start time domain symbol occupied by the front-loaded DMRS is configured by using RRC signaling or is predefined.

With reference to the fifth aspect, in some implementations of the fifth aspect, the time unit is any one of the following: a slot, a sub-slot, a frame, a subframe, or a time domain resource occupied by one time of data block transmission.

According to a sixth aspect, a DMRS configuration method is provided. The method includes:

A network device determines first scheduling information, where the first scheduling information is used by a terminal device to determine whether transmission in a first time unit meets a first condition, where

- when the first scheduling information is the same as second scheduling information of a second time unit, transmission in the first time unit meets the first condition, or when the first scheduling information is different from second scheduling information of a second time unit, transmission in the first time unit does not meet the first condition;
- the second time unit is a time unit before the first time unit, a transmission direction in the first time unit is the same as a transmission direction in the second time unit, no transmission in an opposite direction exists between the second time unit and the first time unit, and the first condition includes at least one of same transmit power, same precoding, a same antenna port, and a same frequency domain resource; and
- transmission in the first time unit meets the first condition, and transmission in the first time unit is the same as transmission in the second time unit;
- the network device sends a first scheduling message to the terminal device; and
- the network device sends downlink data to the terminal device in the first time unit and the second time unit, or the network device receives, in the first time unit and the second time unit, uplink data sent by the terminal device.

This technical solution is performed by the network device. Data transmission in a plurality of time units is limited, so that the plurality of time units meet a requirement of joint channel estimation, and phase continuity between data sending in the first time unit and sending in the second time unit can be maintained. DMRSs that meet the phase continuity in the first time unit and the second time unit can be combined when data is received, to implement more accurate channel estimation and improve demodulation performance of transmitted data.

With reference to the sixth aspect, in some implementations of the sixth aspect, the first scheduling information and the second scheduling information are carried in downlink control information DCI.

When it is determined whether transmission in a current time unit and transmission in a previous time unit meet a specific limitation condition, scheduling information for implementing this function is directly carried in DCI corresponding to each time unit scheduled by a base station. Specifically, a redundant field or a newly added field of the DCI may be reused. This can reduce a delay, and has high compatibility.

With reference to the sixth aspect, in some implementations of the sixth aspect, the method further includes:

the network device sends third scheduling information to the terminal device, where the third scheduling information indicates that a sending device meets a second condition within first duration, and the second condition includes one or more of the following:

The sending device does not turn off a power amplifier, the sending device does not perform carrier frequency switching, or the sending device does not perform antenna switching.

In this technical solution, the sending device refers to a device that sends data, that is, one of the network device or the terminal device. The first duration may be understood as a time period, and a time domain symbol in which no data is transmitted or a periodic time period exists between the first time unit and the second time unit. The third scheduling information may be used to limit a case in which the second condition needs to be met within the first duration when the terminal device sends the uplink data or the network device sends the downlink data, that is, the terminal device or the network device does not turn off the power amplifier, perform carrier frequency switching, or perform antenna switching within the first duration. Joint channel estimation may be performed in a time unit that meets the second condition.

Sending of the uplink data or the downlink data is further limited by using the third scheduling information, thereby improving a possibility of joint channel estimation, and further improving accuracy of channel estimation.

The third scheduling information in this technical solution may be scheduling information that is different from the first scheduling information, or may be scheduling information that is the same as the first scheduling information, that is, if the first scheduling information indicates that the first time unit meets the first condition, by default, the second condition also needs to be met when the first time unit and the second time unit are inconsecutive.

With reference to the sixth aspect, in some implementations of the sixth aspect, the second condition is valid within the first duration, and the first duration is configured by the network device by using radio resource control RRC signaling, or the first duration is predefined.

In this technical solution, sending of the downlink data or the uplink data may be limited within the first duration. If the time exceeds first limiting time, sending of data by the network device or the terminal device is not limited by the second condition.

In this technical solution, the network device may configure one first duration by using the RRC signaling. A value of the first duration may be several slots, several milliseconds, several time domain symbols, or the like. A value of the first duration is used to determine effective limiting time of the second condition. Alternatively, the first duration is predefined. In this case, the network device does not need to separately configure and send the third scheduling information. This reduces signaling overheads of the network device.

With reference to the sixth aspect, in some implementations of the sixth aspect, before the network device sends the downlink data, the method further includes:

the network device receives capability information sent by the terminal device, where the capability information indicates whether the terminal device can support joint channel estimation in a plurality of time units.

In this technical solution, the capability information may be a field, the field includes one or more bits, and different status values or different values of the field indicate different capability information.

The capability information is indication information of 1 bit, one parameter configured by the network device, or indication information of a plurality of bits. A value of the 1 bit notifies the network device whether the terminal device can support joint channel estimation in a plurality of time units. For example, when the value of the 1 bit is 1, the terminal device can support joint channel estimation in a plurality of time units, and when the value of the 1 bit is 0, the terminal device cannot support joint channel estimation in a plurality of time units.

The capability information is one parameter configured by the terminal device, and the parameter includes a plurality of bits. Different values of the parameter indicate a maximum quantity of different time units in which the terminal device can support joint channel estimation. A value of the parameter may directly indicate a quantity of time units in which the terminal device can support joint channel estimation, that is, the value of the parameter is the same as the maximum quantity of time units in which the terminal device can support joint channel estimation. For example, if a value of the capability information is 6, it indicates that the terminal device can support joint channel estimation in a maximum of six time units. The value of the parameter may alternatively correspond to a quantity of time units based on a predefined relationship. For example, the predefined relationship is that the value of the parameter is half of the maximum quantity of time units in which the terminal device can support joint channel estimation. For example, if the value of the capability information is 3, it indicates that the terminal device can support joint channel estimation in six time units.

The capability information includes indication information of a plurality of bits, and the plurality of bits include a first bit part and a second bit part. A value of the first bit indicates whether the network device and the terminal device can support joint channel estimation in a plurality of time units. A value of the second bit part indicates the maximum quantity of time units in which the terminal device can support joint channel estimation. In this technical solution, the terminal device actively reports the capability information to notify the network device of whether the terminal device can perform joint channel estimation in a plurality of time units. This improves efficiency of limiting downlink data sending by the network device.

With reference to the sixth aspect, in some implementations of the sixth aspect, a quantity of time units included in the first time unit and a quantity of time units included in the second time unit may be the same or different.

With reference to the sixth aspect, in some implementations of the sixth aspect, the time unit is any one of the following: a slot, a sub-slot, a frame, a subframe, or a time domain resource occupied by one time of data block transmission.

According to a seventh aspect, a DMRS configuration method is provided. The method includes:

A network device determines first indication information, where the first indication information indicates a quantity of time units between a third time unit and a fourth time unit, the third time unit belongs to a plurality of time units, the fourth time unit is a time unit in the plurality of time units that has a same quantity of configured demodulation reference signals DMRSs as the third time unit and that is closest to the third time unit, at least one fifth time unit is included between the third time unit and the fourth time unit, and a quantity of DMRSs configured in the fifth time unit is less than the quantity of DMRSs configured in the third time unit; and the network device sends the first indication information to a terminal device.

The technical solution is performed by the network device. An interval between time units in which a large quantity of DMRSs can be configured is determined by using the first indication information, and a small quantity of DMRSs are configured in a middle time unit. In this way, total DMRS overheads in a plurality of time units can be reduced, and spectral efficiency of a system can be improved.

With reference to the seventh aspect, in some implementations of the seventh aspect, the method further includes:

The network device sends second indication information to the terminal device, where the second indication information is used to determine that a quantity of the plurality of time units is K, and K is a positive integer greater than or equal to 2.

Data blocks transmitted in all of the K time units are the same, and the second indication information is used to determine a quantity of times of repeated transmission of the data block; or data blocks transmitted in all of the K time units are different from each other, and the second indication information is used to determine a quantity of different data blocks in the K time units; or the K time units includes a plurality of data blocks, some of the plurality of data blocks are the same and the others are different, and the second indication information is used to determine the quantity of the K time units. In this technical solution, when data blocks transmitted in the plurality of time units are not completely the same, a quantity of time units in which a quantity of DMRSs is jointly configured may be determined based on a value of the second indication information. When a same data block is transmitted in a plurality of time units, the second indication information indicates whether a function of joint channel estimation in the K time units is enabled, and a quantity of times of repeated transmission is configured by using RRC signaling.

With reference to the seventh aspect, in some implementations of the seventh aspect, the quantity of time units between the third time unit and the fourth time unit indicated by using the first indication information is greater than the quantity of the plurality of time units determined by using the second indication information minus 2. In this case, DMRSs in the K time units are configured in a dense-to-sparse manner.

In this technical solution, the third time unit is a head time unit in the K time units determined by using the second indication information, and the fourth time unit is not in the K time units. In this case, a large quantity of time units are configured in the third time unit, and a small quantity of DMRSs are configured in another time unit. A quantity of DMRSs in the middle time unit is less than the quantity of DMRSs configured in the third time unit. According to the present technology, quick and accurate channel estimation is performed by using a plurality of DMRSs centralized in one time unit. This reduces a delay, and improves efficiency of demodulating data.

With reference to the seventh aspect, in some implementations of the seventh aspect, before the network device sends downlink data in the plurality of time units, the method further includes: The network device receives first capability information sent by the terminal device. The first capability information indicates that the terminal device can support joint channel estimation in a maximum of M time units, where M is a positive integer greater than or equal to 2.

In this technical solution, the capability information may be a field, the field includes one or more bits, and different status values or different values of the field indicate different capability information. Specific indication includes the following possible manners.

The capability information is indication information of 1 bit, and a value of the 1 bit notifies the network device whether the terminal device can support joint channel estimation in a plurality of time units. For example, when the value of the 1 bit is 1, the terminal device can meet joint channel estimation in a plurality of time units. When the value of the 1 bit is 0, the terminal device cannot support joint channel estimation in a plurality of time units.

The capability information is one parameter configured by the terminal device, and the parameter includes a plurality of bits. Different values of the parameter indicate that the terminal device can support joint channel estimation in a maximum of M time units. A value of the parameter may directly indicate a quantity of time units in which the terminal device can support joint channel estimation, that is, the value of the parameter is the same as the maximum quantity of time units in which the terminal device can support joint channel estimation. For example, if a value of the capability information is 6, it indicates that the terminal device can support joint channel estimation in a maximum of six time units. The value of the parameter may alternatively correspond to a quantity of time units based on a predefined relationship. For example, the predefined relationship is that the value of the parameter is half of the maximum quantity of time units in which the terminal device can support joint channel estimation. For example, if the value of the capability information is 3, it indicates that the terminal device can support joint channel estimation in six time units.

The capability information includes indication information of a plurality of bits, and the plurality of bits include a first bit part and a second bit part. A value of the first bit indicates whether the network device and the terminal device can support joint channel estimation in a plurality of time units. A value of the second bit part indicates the maximum quantity of time units in which the terminal device can support joint channel estimation.

In this technical solution, the terminal device actively reports the first capability information, to notify the network device of whether the terminal device can perform joint channel estimation in the K time units. This improves data transmission efficiency.

With reference to the seventh aspect, in some implementations of the seventh aspect, K is less than or equal to M.

In this technical solution, when a value of K indicated by the network device is less than the value M of the maximum quantity of time units that can be supported by the terminal device, the terminal device can receive DMRSs sent in the K time units, and perform joint channel estimation in the K time units.

It should be understood that the terminal device does not expect that a quantity of time units for joint channel estimation indicated in indication information delivered by the network device is less than the quantity of time units in which the terminal device can support joint channel estimation. When the quantity of time units for joint channel estimation indicated in the indication information delivered by the network device is greater than the quantity of time units in which the terminal device can support joint channel estimation, when the terminal device performs operations related to joint channel estimation, "interruption processing" or "sliding processing" is used. For a specific operation manner, refer to the following descriptions. Details are not described herein.

With reference to the seventh aspect, in some implementations of the seventh aspect, the first indication information and the second indication information may be carried in radio resource control RRC signaling.

With reference to the seventh aspect, in some implementations of the seventh aspect, when only one front-loaded DMRS is configured in a $j^{th}$ time unit in the K time units, a start time domain symbol occupied by the front-loaded DMRS is a middle time domain symbol of the $j^{th}$ time unit. The $j^{th}$ time unit is any time unit other than a head time unit and a tail time unit in the K time units, where j is a positive integer greater than or equal to 1 and less than or equal to K.

In this technical solution, the "middle" time domain symbol refers to any possible time domain symbol in the middle third of the $j^{th}$ time unit. Ensuring that a DMRS is in a middle part of a time unit helps improve spectral efficiency and channel estimation accuracy of the system.

With reference to the seventh aspect, in some implementations of the seventh aspect, the start time domain symbol occupied by the front-loaded DMRS is configured by using RRC signaling or is predefined.

With reference to the seventh aspect, in some implementations of the seventh aspect, a time unit in the plurality of time units is any one of the following: a slot, a sub-slot, a frame, a subframe, or a time domain resource occupied by one time of data block transmission.

According to an eighth aspect, a DMRS configuration method is provided. The method includes:

A network device determines first downlink control information DCI, where the first DCI indicates a first DMRS configuration pattern, the first DMRS configuration pattern belongs to a DMRS configuration pattern set, the DMRS configuration pattern set includes at least two different DMRS configuration patterns, the first DMRS configuration pattern is used to determine quantities of DMRSs configured in K time units, and quantities of DMRSs configured in at least two of the K time units are different, where K is a positive integer greater than or equal to 2. The network device sends the first DCI to a terminal device.

The technical solution is performed by the terminal device. The terminal device determines, by using the first DCI, the first DMRS configuration pattern from the set that includes a plurality of different DMRS configuration patterns, and in the DMRS configuration pattern, the quantities of DMRSs configured in at least two time units are different. This implements dynamic and flexible scheduling of a DMRS configuration pattern, reduces a delay, and improves adaptation between channel quality and a quantity of DMRSs.

With reference to the eighth aspect, in some implementations of the eighth aspect, K is predefined, or K is indicated by the network device by using additional indication information, or is determined by a quantity of pieces of value content in the first DMRS configuration pattern.

In this technical solution, a value of K is flexible and varied. If K is predefined, signaling overheads can be reduced to some extent. Alternatively, the network device may determine by using additional indication information. When a same transport block is transmitted in a plurality of time units, the additional indication information is used to determine a quantity of times of repeated transmission of a data block; or when different transport blocks are transmitted in a plurality of time units, the indication information is used to determine a quantity of different data blocks. Alternatively, the device may be determined based on a quantity of corresponding parameters dmrs-Additional Position in the first DMRS pattern. For example, when the value content in the first DMRS configuration pattern is {Pos2, Pos0, Pos2, Pos0}, that is, includes four values, the first DMRS configuration pattern implicitly indicates performing joint DMRS configuration in K=4 time units. That is, a maximum of 2, 0, 2, and 0 additional DMRSs can be configured in a $1^{st}$ to $4^{th}$ time units respectively.

With reference to the eighth aspect, in some implementations of the eighth aspect, in an additional DMRS configuration pattern set, max Length can have only one value, that is, quantities of time domain symbols occupied by front-loaded DMRSs in all time units are the same. Certainly, in an additional DMRS configuration pattern set, max Length may have two values, that is, in each configuration solution, quantities of time domain symbols occupied by a front-loaded DMRS in time units are different.

With reference to the eighth aspect, in some implementations of the eighth aspect, the DMRS configuration pattern set is configured by using radio resource control RRC signaling, and the DMRS configuration pattern set is a predefined configuration pattern set.

With reference to the eighth aspect, in some implementations of the eighth aspect, the first DCI indicates an index value of the first DMRS configuration pattern, and before the network device sends the first DCI to the terminal device, the method further includes:

The network device sends media access control control element MAC CE signaling to the terminal device, where the MAC CE signaling is used to activate determining the first DMRS configuration pattern from the DMRS configuration pattern set by the terminal device based on the index value of the first DMRS configuration pattern.

In this technical solution, if the network device does not send trigger signaling, namely, the MAC CE signaling, to the terminal device, that is, there is no MAC CE signaling to activate determining the first DMRS pattern by the terminal device based on the first DCI, the terminal device still configures a DMRS in each time unit based on values of parameters such as dmrs-Additional Position and max Length that are configured by using the RRC signaling, and performs uplink sending or downlink receiving.

In this technical solution, the first DMRS pattern is determined by using the index value of the first DCI. This reduces a delay, implements dynamic and flexible scheduling of a DMRS configuration pattern, and improves adaptation between channel quality and the quantity of DMRS s.

With reference to the eighth aspect, in some implementations of the eighth aspect, when only one front-loaded DMRS is configured in a $j^{th}$ time unit in the K time units, a start time domain symbol occupied by the front-loaded DMRS is a middle time domain symbol of the $j^{th}$ time unit. The $j^{th}$ time unit is any time unit other than a head time unit and a tail time unit in the K time units, where j is a positive integer greater than or equal to 1 and less than or equal to K.

In this technical solution, the "middle" time domain symbol refers to any possible time domain symbol in the middle third of the $j^{th}$ time unit. Ensuring that a DMRS is in a middle part of a time unit helps improve spectral efficiency and channel estimation accuracy of the system.

With reference to the eighth aspect, in some implementations of the eighth aspect, the start time domain symbol occupied by the front-loaded DMRS is configured by using RRC signaling or is predefined.

With reference to the eighth aspect, in some implementations of the eighth aspect, the time unit is any one of the following: a slot, a sub-slot, a frame, a subframe, or a time domain resource occupied by one time of data block transmission.

With reference to the eighth aspect, in some implementations of the eighth aspect, the DMRS configuration pattern set may further include any one of an additional DMRS quantity configuration set, an additional DMRS quantity variation configuration set, a total DMRS quantity configuration set, or a total DMRS quantity variation configuration set.

According to a ninth aspect, a DMRS configuration method is provided. The method includes:

A network device determines first information, where the first information indicates to use same transmit power in K time units or perform joint channel estimation in K time units, and a maximum of one additional demodulation reference signal DMRS is configured in each of the K time units, where K is a positive integer greater than or equal to 2. The network device sends the first information to the terminal device.

This technical solution is performed by the network device, to determine, by using the first information, that the same transmit power is used in the K time units or joint channel estimation is performed in the K time units, and a maximum of one additional demodulation reference signal DMRS is configured in each of the K time units. This can implement more accurate channel estimation, improves demodulation performance of transmitted data is improved, and reduces total DMRS overheads.

With reference to the ninth aspect, in some implementations of the ninth aspect, K is greater than a first threshold.

The first threshold is predefined, or the first threshold is indicated by the network device by using second information. The second information and the first information are carried in same signaling, or the second information and the first information are carried in different signaling.

In this technical solution, the network device further configures a first threshold. When joint channel estimation is performed in the K time units, when K is greater than or equal to the first threshold, a maximum of one DMRS is configured in each of the K time units. That is, a candidate value of the additional DMRS can only be {0, 1}. During joint channel estimation, more DMRSs are available compared with a quantity of DMRSs in a single time unit. Therefore, two or three additional DMRSs do not need to be configured in each time unit. This reduces DMRS overheads.

With reference to the ninth aspect, in some implementations of the ninth aspect, the first information is carried in downlink control information DCI or radio resource control RRC signaling.

With reference to the ninth aspect, in some implementations of the ninth aspect, a possible value of the first threshold may be 2, 4, 8, or the like, and the first threshold is greater than or equal to 2.

With reference to the ninth aspect, in some implementations of the ninth aspect, when only one front-loaded DMRS is configured in a $j^{th}$ time unit in the K time units, a start time domain symbol occupied by the front-loaded DMRS is a middle time domain symbol of the $j^{th}$ time unit. The $j^{th}$ time unit is any time unit other than a head time unit and a tail time unit in the K time units, where j is a positive integer greater than or equal to 1 and less than or equal to K.

In this technical solution, the "middle" time domain symbol refers to any possible time domain symbol in the middle third of the $j^{th}$ time unit. Ensuring that a DMRS is in a middle part of a time unit helps improve spectral efficiency and channel estimation accuracy of the system.

With reference to the ninth aspect, in some implementations of the ninth aspect, the start time domain symbol occupied by the front-loaded DMRS is configured by using RRC signaling or is predefined.

With reference to the ninth aspect, in some implementations of the ninth aspect, the time unit is any one of the following: a slot, a sub-slot, a frame, a subframe, or a time domain resource occupied by one time of data block transmission.

According to a tenth aspect, a DMRS configuration method is provided. The method includes:

A network device determines third indication information, where the third indication information includes N values, the N values are in a one-to-one correspondence with N time units, and an $i^{th}$ value in the N values indicates a quantity of demodulation reference signals DMRSs in an $i^{th}$ time unit in the N time units, where $1 \leq i \leq N$, and i and N are positive integers.

The network device sends the third indication information to a terminal device.

This technical solution is performed by the network device. Information about a quantity of DMRSs in N time units is configured by using the third indication information. This implements joint and flexible DMRS quantity configuration in the N time units.

With reference to the tenth aspect, in some implementations of the tenth aspect, a quantity of time domain symbols occupied by a front-loaded DMRS is 1, and the $i^{th}$ value is determined by using 2 bits. Alternatively, a quantity of time domain symbols occupied by a front-loaded DMRS is 2, and the $i^{th}$ value is determined by using 1 bit.

In this technical solution, a DMRS occupies a maximum of four time domain symbol positions in a time unit. Therefore, when the front-loaded DMRS occupies one time domain symbol, an additional DMRS also occupies one time domain symbol, that is, a maximum of four DMRSs may be configured in one time unit. Information about a quantity of DMRSs may be determined by using a value of 2 bits. When the front-loaded DMRS occupies two time domain symbols, the additional DMRS also occupies two time domain symbols, that is, a maximum of two DMRSs can be configured in one time unit. Information about a quantity of DMRSs may be determined by using a value of 1 bit.

With reference to the tenth aspect, in some implementations of the tenth aspect, the third indication information may be carried in radio resource control RRC signaling or downlink control information DCI.

In this technical solution, when the third indication information is carried in the RRC signaling, the third indication information includes N values, which are {Pos s1, Pos s2, Pos s3, . . . , and Pos sN}. Each value corresponds to a position of an additional DMRS in each of the N time units, and a value of Pos si corresponds to information about a quantity of DMRSs in the $i^{th}$ time unit in the N time units. The network device or the terminal device may flexibly configure the quantity of DMRSs in the N time units by using the third indication information. During joint channel estimation, sufficient accuracy of channel estimation can be ensured. In addition, low total DMRS overheads can be ensured. This helps improve transmission efficiency and performance.

When the third indication information is carried in the DCI, the third indication information includes N groups of bits, the N groups of bits are in a one-to-one correspondence with the N time units, and the $i^{th}$ value in the N values corresponds to an $i^{th}$ group of bits in the N groups of bits. That is, the $i^{th}$ value is determined by using the $i^{th}$ group of bits. The network device or the terminal device may indicate configuration of the quantity of DMRSs in the N time units by using the third indication information carried in the DCI. This implements dynamic adjustment of the quantity of configured DMRSs and reduces a delay.

With reference to the tenth aspect, in some implementations of the tenth aspect, the information about the quantity of DMRSs includes any one of the following types of information: a quantity of additional DMRSs, a total quantity of DMRSs, a variation of the quantity of additional DMRSs, and a variation of the total quantity of DMRSs. The total quantity of DMRSs is a sum of the quantity of additional DMRSs and a quantity of front-loaded DMRSs.

With reference to the tenth aspect, in some implementations of the tenth aspect, the network device sends configuration information to the terminal device, where the configuration information is used to determine a type of the information about the quantity of DMRSs.

In this technical solution, when the third indication information is carried in the RRC signaling, the type of the information about the quantity of DMRSs is indicated by the network device by using the configuration information, which includes determining the type of the information about the quantity of DMRSs by using a value of the configuration information or an index value of the value. An indication manner is not specifically limited in this embodiment of this application. If the network device does not send the information to the terminal device, or when a value of the indication information is a default value, the $i^{th}$ value indicates a quantity of additional DMRSs in the $i^{th}$ time unit by default. When the third indication information is carried in the DCI, the type of the information about the quantity of DMRSs is indicated by the network device by using the configuration information, which includes determining the type of the information about the quantity of DMRSs by using a value of the configuration information or an index value of the value.

With reference to the tenth aspect, in some implementations of the tenth aspect, the $i^{th}$ value indicates the quantity of additional DMRSs in the $i^{th}$ time unit. The method further includes:

The network device sends fourth indication information to the terminal device, where the fourth indication information indicates that no front-loaded DMRS is configured in the $i^{th}$ time unit.

In this technical solution, if the network device does not send the fourth indication information to the terminal device, or when a value of the fourth indication information is a default value, a front-loaded DMRS is configured in the $i^{th}$ time unit by default.

With reference to the tenth aspect, in some implementations of the tenth aspect, the $i^{th}$ value indicates a variation of the quantity of additional DMRSs in the $i^{th}$ time unit. The method further includes:

The network device sends fifth indication information to the terminal device, where the fifth indication information indicates whether a front-loaded DMRS is configured in the $i^{th}$ time unit.

With reference to the tenth aspect, in some implementations of the tenth aspect, the third indication information is carried in the DCI. The method further includes:

The network device indicates the quantity of additional DMRSs in the $i^{th}$ time unit by sending the third indication information, where the $i^{th}$ value indicates the quantity of additional DMRSs in the $i^{th}$ time unit; or the network device indicates a total quantity of DMRSs in the $i^{th}$ time unit by sending the third indication information, where the $i^{th}$ value indicates the total quantity of DMRSs in the $i^{th}$ time unit; or the network device indicates the quantity of additional DMRSs in the $i^{th}$ time unit by sending the third indication information and the RRC signaling, where the $i^{th}$ value indicates the variation of the quantity of additional DMRSs in the $i^{th}$ time unit, and the RRC signaling indicates the quantity of additional DMRSs in the $i^{th}$ time unit; or the network device indicates a total quantity of DMRSs in the $i^{th}$ time unit by sending the third indication information and the RRC signaling, where the $i^{th}$ value indicates a variation of the total quantity of DMRSs in the $i^{th}$ time unit, and the RRC signaling indicates the quantity of additional DMRSs in the $i^{th}$ time unit.

In this technical solution, when the third indication information is carried in the DCI, when the third indication information indicates information about a quantity of additional DMRSs in the N time units or information about a total quantity of DMRSs in the N time units, the terminal device or the network device configures the quantity of additional DMRSs or the total quantity of DMRSs in the N time units based on the third indication information. That is, the DCI covers a value of the quantity of additional DMRSs configured in the original RRC signaling. This implements dynamic adjustment of the quantity of DMRSs in the K time units.

When the third indication information indicates information about a variation of a quantity of additional DMRSs in the N time units or information about a variation of a total quantity of DMRSs in the N time units, the terminal device or the network device performs algebra calculation based on the third indication information with reference to a value of the quantity of additional DMRSs configured in the original RRC signaling, to configure the quantity of additional DMRSs or the total quantity of DMRSs in the N time units.

With reference to the tenth aspect, in some implementations of the tenth aspect, when only one front-loaded DMRS is configured in a $j^{th}$ time unit in the K time units, a start time domain symbol occupied by the front-loaded DMRS is a middle time domain symbol of the $j^{th}$ time unit. The $j^{th}$ time unit is any time unit other than a head time unit and a tail time unit in the K time units, where j is a positive integer greater than or equal to 1 and less than or equal to K.

In this technical solution, the "middle" time domain symbol refers to any possible time domain symbol in the middle third of the $j^{th}$ time unit. Ensuring that a DMRS is in a middle part of a time unit helps improve spectral efficiency and channel estimation accuracy of the system.

With reference to the tenth aspect, in some implementations of the tenth aspect, the start time domain symbol occupied by the front-loaded DMRS is configured by using RRC signaling or is predefined.

With reference to the tenth aspect, in some implementations of the tenth aspect, the time unit is any one of the following: a slot, a sub-slot, a frame, a subframe, or a time domain resource occupied by one time of data block transmission.

According to an eleventh aspect, a communication apparatus is provided, including:

a transceiver unit, configured to receive first scheduling information sent by a network device, where the first scheduling information is used to determine whether transmission in a first time unit meets a first condition; and a processing unit, configured to determine whether the first scheduling information is the same as second scheduling information of a second time unit, where when the first scheduling information is the same as the second scheduling information of the second time unit, transmission in the first time unit meets the first condition, or when the first scheduling information is different from the second scheduling information of the second time unit, transmission in the first time unit does not meet the first condition.

The second time unit is a time unit before the first time unit, a transmission direction in the first time unit is the same as a transmission direction in the second time unit, no transmission in an opposite direction exists between the second time unit and the first time unit, and the first condition includes at least one of same transmit power, same precoding, a same antenna port, and a same frequency domain resource.

When transmission in the first time unit meets the first condition, transmission in the first time unit is the same as transmission in the second time unit.

The transceiver unit is further configured to send uplink data in the first time unit and the second time unit, or receive downlink data in the first time unit and the second time unit.

With reference to the eleventh aspect, in some implementations of the eleventh aspect, the first scheduling information and the second scheduling information are carried in downlink control information DCI.

With reference to the eleventh aspect, in some implementations of the eleventh aspect, the transceiver unit is further configured to:

receive third scheduling information sent by the network device, where the third scheduling information indicates that a sending device meets a second condition within first duration. The second condition includes one or more of the following:

The sending device does not turn off a power amplifier, the sending device does not perform carrier frequency switching, or the sending device does not perform antenna switching.

With reference to the eleventh aspect, in some implementations of the eleventh aspect, the second condition is valid within the first duration, and the first duration is configured by the network device by using radio resource control RRC signaling, or the first duration is predefined.

With reference to the eleventh aspect, in some implementations of the eleventh aspect, before the transceiver unit receives the downlink data, the transceiver unit is further configured to:

report capability information to the network device, where the capability information indicates whether the communication apparatus can support joint channel estimation in a plurality of time units.

With reference to the eleventh aspect, in some implementations of the eleventh aspect, a quantity of time units included in the first time unit and a quantity of time units included in the second time unit may be the same or different.

With reference to the eleventh aspect, in some implementations of the eleventh aspect, the time unit is any one of the following: a slot, a sub-slot, a frame, a subframe, or a time domain resource occupied by one time of data block transmission.

According to a twelfth aspect, a communication apparatus is provided, including: a transceiver unit, configured to receive first indication information sent by a network device, where the first indication information indicates a quantity of time units between a third time unit and a fourth time unit, the third time unit belongs to a plurality of time units, the fourth time unit is a time unit in the plurality of time units that has a same quantity of configured demodulation reference signals DMRSs as the third time unit and that is closest to the third time unit, at least one fifth time unit is included between the third time unit and the fourth time unit, and a quantity of DMRSs configured in the fifth time unit is less than the quantity of DMRSs configured in the third time unit; and a processing unit, configured to determine, based on the first indication information, quantities of DMRSs configured in the plurality of time units.

With reference to the twelfth aspect, in some implementations of the twelfth aspect, the transceiver unit is further configured to:

receive second indication information sent by the network device, where the second indication information is used to determine that a quantity of the plurality of time units is K, and K is a positive integer greater than or equal to 2, where data blocks transmitted in all of the K time units are the same, and the second indication information is used to determine a quantity of times of repeated transmission of the data block; or data blocks transmitted in all of the K time units are different from each other, and the second indication information is used to determine a quantity of different data blocks in the K time units; or the K time units include a plurality of data blocks, some of the plurality of data blocks are the same and the others are different, and the second indication information is used to determine the quantity of the K time units.

With reference to the twelfth aspect, in some implementations of the twelfth aspect, the quantity of time units between the third time unit and the fourth time unit indicated by using the first indication information is greater than the quantity of the plurality of time units determined by using the second indication information minus 2. In this case, DMRSs in the K time units are configured in a dense-to-sparse manner.

With reference to the twelfth aspect, in some implementations of the twelfth aspect, before the transceiver unit receives data in the plurality of time units, the transceiver unit is further configured to:

report first capability information to the network device, where the first capability information indicates that the communication apparatus can support joint channel estimation in a maximum of M time units, and M is a positive integer greater than or equal to 2.

With reference to the twelfth aspect, in some implementations of the twelfth aspect, K is less than or equal to M.

With reference to the twelfth aspect, in some implementations of the twelfth aspect, the first indication information and the second indication information may be carried in radio resource control RRC signaling.

With reference to the twelfth aspect, in some implementations of the twelfth aspect, when only one front-loaded DMRS is configured in a $j^{th}$ time unit in the K time units, a start time domain symbol occupied by the front-loaded DMRS is a middle time domain symbol of the $j^{th}$ time unit. The $j^{th}$ time unit is any time unit other than a head time unit and a tail time unit in the K time units, where j is a positive integer greater than or equal to 1 and less than or equal to K.

With reference to the twelfth aspect, in some implementations of the twelfth aspect, the start time domain symbol occupied by the front-loaded DMRS is configured by using RRC signaling or is predefined.

With reference to the twelfth aspect, in some implementations of the twelfth aspect, a time unit in the plurality of time units is any one of the following: a slot, a sub-slot, a frame, a subframe, or a time domain resource occupied by one time of data block transmission.

According to a thirteenth aspect, a communication apparatus is provided, including:

a transceiver unit, configured to receive first downlink control information DCI sent by a network device, where the first DCI indicates a first DMRS configuration pattern, the first DMRS configuration pattern belongs to a DMRS configuration pattern set, and the DMRS configuration pattern set includes at least two different DMRS configuration patterns; and a processing unit, configured to determine quantities of DMRSs configured in K time units based on the first DCI, where quantities of DMRSs configured in at least two of the K time units are different, and K is a positive integer greater than or equal to 2.

With reference to the thirteenth aspect, in some implementations of the thirteenth aspect, K is predefined, or K is indicated by the network device by using additional indication information, or is determined by a quantity of pieces of value content in the first DMRS configuration pattern.

With reference to the thirteenth aspect, in some implementations of the thirteenth aspect, in an additional DMRS configuration pattern set, max Length can have only one value, that is, quantities of time domain symbols occupied by front-loaded DMRSs in all time units are the same. Certainly, in an additional DMRS configuration pattern set, max Length may have two values, that is, in each configuration solution, quantities of time domain symbols occupied by a front-loaded DMRS in time units are different.

With reference to the thirteenth aspect, in some implementations of the thirteenth aspect, the DMRS configuration pattern set is configured by using radio resource control RRC signaling, and the DMRS configuration pattern set is a predefined configuration pattern set.

With reference to the thirteenth aspect, in some implementations of the thirteenth aspect, the first DCI indicates an index value of the first DMRS configuration pattern. Before the transceiver unit receives the first DCI sent by the network device, the transceiver unit is configured to: receive media access control control element MAC CE signaling sent by the network device, where the MAC CE signaling is used to activate determining the first DMRS configuration pattern from the DMRS configuration pattern set by the communication apparatus based on the index value of the first DMRS configuration pattern.

With reference to the thirteenth aspect, in some implementations of the thirteenth aspect, when only one front-loaded DMRS is configured in a $j^{th}$ time unit in the K time units, a start time domain symbol occupied by the front-loaded DMRS is a middle time domain symbol of the $j^{th}$ time unit. The $j^{th}$ time unit is any time unit other than a head time unit and a tail time unit in the K time units, where j is a positive integer greater than or equal to 1 and less than or equal to K.

With reference to the thirteenth aspect, in some implementations of the thirteenth aspect, the start time domain symbol occupied by the front-loaded DMRS is configured by using RRC signaling or is predefined.

With reference to the thirteenth aspect, in some implementations of the thirteenth aspect, the time unit is any one of the following: a slot, a sub-slot, a frame, a subframe, or a time domain resource occupied by one time of data block transmission.

With reference to the thirteenth aspect, in some implementations of the thirteenth aspect, the DMRS configuration pattern set may further include any one of an additional DMRS quantity configuration set, an additional DMRS quantity variation configuration set, a total DMRS quantity configuration set, or a total DMRS quantity variation configuration set.

According to a fourteenth aspect, a communication apparatus is provided, including:

a transceiver unit, configured to receive first information sent by a network device, where the first information indicates to use same transmit power in K time units or perform joint channel estimation in K time units; and a processing unit, configured to determine, based on the first information, that a maximum of one additional demodulation reference signal DMRS is configured in each of the K time units, where K is a positive integer greater than or equal to 2.

With reference to the fourteenth aspect, in some implementations of the fourteenth aspect, K is greater than a first threshold.

The first threshold is predefined, or the first threshold is indicated by the network device by using second information. The second information and the first information are carried in same signaling, or the second information and the first information are carried in different signaling.

With reference to the fourteenth aspect, in some implementations of the fourteenth aspect, the first information is carried in downlink control information DCI or radio resource control RRC signaling.

With reference to the fourteenth aspect, in some implementations of the fourteenth aspect, a possible value of the first threshold may be 2, 4, 8, or the like, and the first threshold is greater than or equal to 2.

With reference to the fourteenth aspect, in some implementations of the fourteenth aspect, when only one front-loaded DMRS is configured in a $j^{th}$ time unit in the K time units, a start time domain symbol occupied by the front-loaded DMRS is a middle time domain symbol of the $j^{th}$ time unit. The $j^{th}$ time unit is any time unit other than a head time unit and a tail time unit in the K time units, where j is a positive integer greater than or equal to 1 and less than or equal to K.

With reference to the fourteenth aspect, in some implementations of the fourteenth aspect, the start time domain symbol occupied by the front-loaded DMRS is configured by using RRC signaling or is predefined.

With reference to the fourteenth aspect, in some implementations of the fourteenth aspect, the time unit is any one of the following: a slot, a sub-slot, a frame, a subframe, or a time domain resource occupied by one time of data block transmission.

According to a fifteenth aspect, a communication apparatus is provided, including:

a transceiver unit, configured to receive third indication information sent by a network device, where the third indication information includes N values, the N values are in a one-to-one correspondence with N time units, and an $i^{th}$ value in the N values indicates a quantity of demodulation reference signals DMRSs in an $i^{th}$ time unit in the N time units, where $1 \le i \le N$, and i and N are natural numbers; and a processing unit, configured to determine information about a quantity of DMRSs in each of the N time units based on the third indication information.

With reference to the fifteenth aspect, in some implementations of the fifteenth aspect, a quantity of time domain symbols occupied by a front-loaded DMRS is 1, and the $i^{th}$ value is determined by using 2 bits. Alternatively, a quantity of time domain symbols occupied by a front-loaded DMRS is 2, and the $i^{th}$ value is determined by using 1 bit.

With reference to the fifteenth aspect, in some implementations of the fifteenth aspect, the third indication information may be carried in radio resource control RRC signaling or downlink control information DCI.

With reference to the fifteenth aspect, in some implementations of the fifteenth aspect, the information about the quantity of DMRSs includes any one of the following types of information: a quantity of additional DMRSs, a total quantity of DMRSs, a variation of the quantity of additional DMRSs, and a variation of the total quantity of DMRSs. The total quantity of DMRSs is a sum of the quantity of additional DMRSs and a quantity of front-loaded DMRSs.

With reference to the fifteenth aspect, in some implementations of the fifteenth aspect, the transceiver unit is further configured to receive configuration information sent by the network device. The configuration information is used to determine a type of the information about the quantity of DMRSs.

With reference to the fifteenth aspect, in some implementations of the fifteenth aspect, the $i^{th}$ value indicates the quantity of additional DMRSs in the $i^{th}$ time unit. The transceiver unit is further configured to receive fourth indication information sent by the network device, where the fourth indication information indicates that no front-loaded DMRS is configured in the $i^{th}$ time unit.

With reference to the fifteenth aspect, in some implementations of the fifteenth aspect, the $i^{th}$ value indicates a variation of a quantity of additional DMRSs in the $i^{th}$ time unit. The transceiver unit is further configured to receive fifth indication information sent by the network device. The fifth indication information indicates whether a front-loaded DMRS is configured in the $i^{th}$ time unit.

With reference to the fifteenth aspect, in some implementations of the fifteenth aspect, the third indication information is carried in the downlink control information DCI.

The processing unit is configured to determine the quantity of additional DMRSs in the $i^{th}$ time unit based on the third indication information, where the $i^{th}$ value indicates the quantity of additional DMRSs in the $i^{th}$ time unit; or the processing unit is configured to determine a total quantity of DMRSs in the $i^{th}$ time unit based on the third indication information, where the $i^{th}$ value indicates the total quantity of DMRSs in the $i^{th}$ time unit; or the processing unit is configured to determine the quantity of additional DMRSs in the $i^{th}$ time unit based on the third indication information and the RRC signaling, where the $i^{th}$ value indicates the variation of the quantity of additional DMRSs in the $i^{th}$ time unit, and the RRC signaling indicates the quantity of additional DMRSs in the $i^{th}$ time unit; or the processing unit is configured to determine a total quantity of DMRSs in the $i^{th}$ time unit based on the third indication information and the RRC signaling, where the $i^{th}$ value indicates a variation of the total quantity of DMRSs in the $i^{th}$ time unit, and the RRC signaling indicates the quantity of additional DMRSs in the $i^{th}$ time unit.

With reference to the fifteenth aspect, in some implementations of the fifteenth aspect, when only one front-loaded DMRS is configured in a $i^{th}$ time unit in the K time units, a start time domain symbol occupied by the front-loaded DMRS is a middle time domain symbol of the $i^{th}$ time unit. The $j^{th}$ time unit is any time unit other than a head time unit and a tail time unit in the K time units, where j is a positive integer greater than or equal to 1 and less than or equal to K.

With reference to the fifteenth aspect, in some implementations of the fifteenth aspect, the start time domain symbol occupied by the front-loaded DMRS is configured by using RRC signaling or is predefined.

With reference to the fifteenth aspect, in some implementations of the fifteenth aspect, the time unit is any one of the following: a slot, a sub-slot, a frame, a subframe, or a time domain resource occupied by one time of data block transmission.

According to a sixteenth aspect, a communication apparatus is provided, including:

a processing unit, configured to determine first scheduling information, where the first scheduling information is used by a terminal device to determine whether transmission in a first time unit meets a first condition, where when the first scheduling information is the same as second scheduling information of a second time unit, transmission in the first time unit meets the first condition, or when the first scheduling information is different from second scheduling information of a second time unit, transmission in the first time unit does not meet the first condition;

the second time unit is a time unit before the first time unit, a transmission direction in the first time unit is the same as a transmission direction in the second time unit, no transmission in an opposite direction exists between the second time unit and the first time unit, and the first condition includes at least one of same transmit power, same precoding, a same antenna port, and a same frequency domain resource; and data transmission in the first time unit meets the first condition, and transmission in the first time unit is the same as transmission in the second time unit; and a transceiver unit, configured to send the first scheduling information to the terminal device.

The transceiver unit is further configured to send downlink data to the terminal device in the first time unit and the second time unit, or receive, in the first time unit and the second time unit, uplink data sent by the terminal device.

With reference to the sixteenth aspect, in some implementations of the sixteenth aspect, the first scheduling information and the second scheduling information are carried in downlink control information DCI.

With reference to the sixteenth aspect, in some implementations of the sixteenth aspect, the transceiver unit is further configured to:

send third scheduling information to the terminal device, where the third scheduling information indicates that a sending device meets a second condition within first duration. The second condition includes one or more of the following:

The sending device does not turn off a power amplifier, the sending device does not perform carrier frequency switching, or the sending device does not perform antenna switching.

With reference to the sixteenth aspect, in some implementations of the sixteenth aspect, the second condition is valid within the first duration, and the first duration is configured by the network device by using radio resource control RRC signaling, or the first duration is predefined.

With reference to the sixteenth aspect, in some implementations of the sixteenth aspect, before the transceiver unit sends the downlink data, the transceiver unit is further configured to receive capability information sent by the terminal device, where the capability information indicates whether the terminal device can support joint channel estimation in a plurality of time units.

With reference to the sixteenth aspect, in some implementations of the sixteenth aspect, a quantity of time units included in the first time unit and a quantity of time units included in the second time unit may be the same or different.

With reference to the sixteenth aspect, in some implementations of the sixteenth aspect, the time unit is any one of the following: a slot, a sub-slot, a frame, a subframe, or a time domain resource occupied by one time of data block transmission.

According to a seventeenth aspect, a communication apparatus is provided, including:

a processing unit, configured to determine first indication information sent by a network device, where the first indication information indicates a quantity of time units between a third time unit and a fourth time unit, the third time unit belongs to a plurality of time units, the fourth time unit is a time unit in the plurality of time units that has a same quantity of configured demodulation reference signals DMRSs as the third time unit and that is closest to the third time unit, at least one fifth time unit is included between the third time unit and the fourth time unit, and a quantity of DMRSs configured in the fifth time unit is less than the quantity of DMRSs configured in the third time unit; and a transceiver unit, configured to send the first indication information to a terminal device.

With reference to the seventeenth aspect, in some implementations of the seventeenth aspect, the transceiver unit is further configured to:

send second indication information to the terminal device, where the second indication information is used to determine that a quantity of the plurality of time units is K, and K is a positive integer greater than or equal to 2, where Data blocks transmitted in all of the K time units are different from each other, and the second indication information is used to determine a quantity of different data blocks in the K time units; or the K time units include a plurality of data blocks, some of the plurality of data blocks are the same and the others are different, and the second indication information is used to determine the quantity of the K time units.

With reference to the seventeenth aspect, in some implementations of the seventeenth aspect, the quantity of time units between the third time unit and the fourth time unit indicated by using the first indication information is greater than the quantity of the plurality of time units determined by using the second indication information minus 2. In this case, DMRSs in the K time units are configured in a dense-to-sparse manner.

With reference to the seventeenth aspect, in some implementations of the seventeenth aspect, before the transceiver unit sends downlink data in the plurality of time units, the transceiver unit is further configured to receive first capability information sent by the terminal device. The first capability information indicates that the terminal device can support joint channel estimation in a maximum of M time units, where M is a positive integer greater than or equal to 2.

With reference to the seventeenth aspect, in some implementations of the seventeenth aspect, K is less than or equal to M.

With reference to the seventeenth aspect, in some implementations of the seventeenth aspect, the first indication information and the second indication information may be carried in radio resource control RRC signaling.

With reference to the seventeenth aspect, in some implementations of the seventeenth aspect, when only one front-loaded DMRS is configured in a $j^{th}$ time unit in the K time units, a start time domain symbol occupied by the front-loaded DMRS is a middle time domain symbol of the $j^{th}$ time unit. The $j^{th}$ time unit is any time unit other than a head time unit and a tail time unit in the K time units, where j is a positive integer greater than or equal to 1 and less than or equal to K.

With reference to the seventeenth aspect, in some implementations of the seventeenth aspect, the start time domain symbol occupied by the front-loaded DMRS is configured by using RRC signaling or is predefined.

With reference to the seventeenth aspect, in some implementations of the seventeenth aspect, a time unit in the plurality of time units is any one of the following: a slot, a sub-slot, a frame, a subframe, or a time domain resource occupied by one time of data block transmission.

According to an eighteenth aspect, a communication apparatus is provided, including:

a processing unit, configured to determine first downlink control information DCI, where the first DCI indicates a first DMRS configuration pattern, the first DMRS configuration pattern belongs to a DMRS configuration pattern set, the DMRS configuration pattern set includes at least two different DMRS configuration patterns, the first DMRS configuration pattern is used to determine quantities of DMRSs configured in K time units, and quantities of DMRSs configured in at least two of the K time units are different, where K is a positive integer greater than or equal to 2; and a transceiver unit, configured to send the first DCI to a terminal device.

With reference to the eighteenth aspect, in some implementations of the eighteenth aspect, K is predefined, or K is indicated by using additional indication information, or is determined by a quantity of pieces of value content in the first DMRS configuration pattern.

With reference to the eighteenth aspect, in some implementations of the eighteenth aspect, the DMRS configuration pattern set is configured by using radio resource control RRC signaling, and the DMRS configuration pattern set is a predefined configuration pattern set.

With reference to the eighteenth aspect, in some implementations of the eighteenth aspect, the first DCI indicates an index value of the first DMRS configuration pattern. Before the transceiver unit is configured to send the first DCI to the terminal device, the transceiver unit is further configured to send media access control control element MAC CE signaling to the terminal device. The MAC CE signaling is used to activate determining the first DMRS configuration pattern from the DMRS configuration pattern set by the terminal device based on the index value of the first DMRS configuration pattern.

With reference to the eighteenth aspect, in some implementations of the eighteenth aspect, when only one front-loaded DMRS is configured in a $j^{th}$ time unit in the K time units, a start time domain symbol occupied by the front-loaded DMRS is a middle time domain symbol of the $j^{th}$ time unit. The $j^{th}$ time unit is any time unit other than a head time unit and a tail time unit in the K time units, where j is a positive integer greater than or equal to 1 and less than or equal to K.

With reference to the eighteenth aspect, in some implementations of the eighteenth aspect, the start time domain symbol occupied by the front-loaded DMRS is configured by using RRC signaling or is predefined.

With reference to the eighteenth aspect, in some implementations of the eighteenth aspect, the time unit is any one of the following: a slot, a sub-slot, a frame, a subframe, or a time domain resource occupied by one time of data block transmission.

According to a nineteenth aspect, a communication apparatus is provided, including:

a processing unit, configured to determine first information, where the first information indicates to use same transmit power in K time units or perform joint channel estimation in K time units, and a maximum of one additional demodulation reference signal DMRS is configured in each of the K time units, where K is a positive integer greater than or equal to 2; and a transceiver unit, configured to send the first information to a terminal device.

With reference to the nineteenth aspect, in some implementations of the nineteenth aspect, K is greater than a first threshold. The first threshold is predefined, or the first threshold is indicated by the communication apparatus by using second information. The second information and the first information are carried in same signaling, or the second information and the first information are carried in different signaling.

With reference to the nineteenth aspect, in some implementations of the nineteenth aspect, the first information is carried in downlink control information DCI or radio resource control RRC signaling.

With reference to the nineteenth aspect, in some implementations of the nineteenth aspect, a possible value of the first threshold may be 2, 4, 8, or the like, and the first threshold is greater than or equal to 2.

With reference to the nineteenth aspect, in some implementations of the nineteenth aspect, when only one front-loaded DMRS is configured in a $j^{th}$ time unit in the K time units, a start time domain symbol occupied by the front-loaded DMRS is a middle time domain symbol of the $j^{th}$ time unit. The $j^{th}$ time unit is any time unit other than a head time unit and a tail time unit in the K time units, where j is a positive integer greater than or equal to 1 and less than or equal to K.

With reference to the nineteenth aspect, in some implementations of the nineteenth aspect, the start time domain symbol occupied by the front-loaded DMRS is configured by using RRC signaling or is predefined.

With reference to the nineteenth aspect, in some implementations of the nineteenth aspect, the time unit is any one of the following: a slot, a sub-slot, a frame, a subframe, or a time domain resource occupied by one time of data block transmission.

According to a twentieth aspect, a communication apparatus is provided, including:

a processing unit, configured to determine third indication information, where the third indication information includes N values, the N values are in a one-to-one correspondence with N time units, and an $i^{th}$ value in the N values indicates a quantity of demodulation reference signals DMRSs in an $i^{th}$ time unit in the N time units, where $1 \leq i \leq N$, and i and N are positive integers; and a transceiver unit, configured to send the third indication information to a terminal device.

With reference to the twentieth aspect, in some implementations of the twentieth aspect, a quantity of time domain symbols occupied by a front-loaded DMRS is 1, and the $i^{th}$ value is determined by using 2 bits. Alternatively, a quantity of time domain symbols occupied by a front-loaded DMRS is 2, and the $i^{th}$ value is determined by using 1 bit.

With reference to the twentieth aspect, in some implementations of the twentieth aspect, the third indication information may be carried in radio resource control RRC signaling or downlink control information DCI.

With reference to the twentieth aspect, in some implementations of the twentieth aspect, the information about the quantity of DMRSs includes any one of the following types of information: a quantity of additional DMRSs, a total quantity of DMRSs, a variation of the quantity of additional DMRSs, and a variation of the total quantity of DMRSs. The total quantity of DMRSs is a sum of the quantity of additional DMRSs and a quantity of front-loaded DMRSs.

With reference to the twentieth aspect, in some implementations of the twentieth aspect, the transceiver unit is further configured to send configuration information to the terminal device, where the configuration information is used to determine a type of the information about the quantity of DMRSs.

With reference to the twentieth aspect, in some implementations of the twentieth aspect, the $i^{th}$ value indicates the quantity of additional DMRSs in the $i^{th}$ time unit. The transceiver unit is further configured to send fourth indication information to the terminal device, where the fourth indication information indicates that no front-loaded DMRS is configured in the $i^{th}$ time unit.

With reference to the twentieth aspect, in some implementations of the twentieth aspect, the $i^{th}$ value indicates a variation of a quantity of additional DMRSs in the $i^{th}$ time unit. The transceiver unit is further configured to send fifth indication information to the terminal device. The fifth indication information indicates whether a front-loaded DMRS is configured in the $i^{th}$ time unit.

With reference to the twentieth aspect, in some implementations of the twentieth aspect, the third indication information is carried in the DCI.

The third indication information indicates the terminal device to determine the quantity of additional DMRSs in the $i^{th}$ time unit, where the $i^{th}$ value indicates the quantity of additional DMRSs in the $i^{th}$ time unit; or the third indication information indicates the terminal device to determine a total quantity of DMRSs in the $i^{th}$ time unit, where the $i^{th}$ value indicates the total quantity of DMRSs in the $i^{th}$ time unit; or the third indication information and the RRC signaling indicate the terminal device to determine the quantity of additional DMRSs in the $i^{th}$ time unit, where the $i^{th}$ value indicates the variation of the quantity of additional DMRSs in the $i^{th}$ time unit, and the RRC signaling indicates the quantity of additional DMRSs in the $i^{th}$ time unit; or the third indication information and the RRC signaling indicate the terminal device to determine a total quantity of DMRSs in the $i^{th}$ time unit, where the $i^{th}$ value indicates a variation of the total quantity of DMRSs in the $i^{th}$ time unit, and the RRC signaling indicates the quantity of additional DMRSs in the $i^{th}$ time unit.

With reference to the twentieth aspect, in some implementations of the twentieth aspect, when only one front-loaded DMRS is configured in a $j^{th}$ time unit in the K time units, a start time domain symbol occupied by the front-loaded DMRS is a middle time domain symbol of the $j^{th}$ time unit. The $j^{th}$ time unit is any time unit other than a head time unit and a tail time unit in the K time units, where j is a positive integer greater than or equal to 1 and less than or equal to K.

With reference to the twentieth aspect, in some implementations of the twentieth aspect, the start time domain symbol occupied by the front-loaded DMRS is configured by using RRC signaling or is predefined.

With reference to the twentieth aspect, in some implementations of the twentieth aspect, the time unit is any one of the following: a slot, a sub-slot, a frame, a subframe, or a time domain resource occupied by one time of data block transmission.

According to a twenty-first aspect, a communication apparatus is provided. The communication apparatus includes a processor. The processor is coupled to a memory, the memory is configured to store a computer program or instructions, and the processor is configured to execute the computer program or the instructions in the memory, so that the method according to any one of the first aspect to the tenth aspect or the possible implementations of the first aspect to the tenth aspect is performed.

According to a twenty-second aspect, a computer-readable storage medium is provided. The computer-readable storage medium stores a computer program or instructions, and the computer program or the instructions are used to implement the method according to any one of the first aspect to the tenth aspect or the possible implementations of the first aspect to the tenth aspect.

According to a twenty-second aspect, a chip system is provided, and includes a processor configured to invoke a computer program from a memory and run the computer program, so that a communication device installed with the chip system performs the method according to any one of the first aspect to the tenth aspect or the possible implementations of the first aspect to the tenth aspect.

According to a twenty-third aspect, a computer program product is provided. The computer program product includes a computer program (which may also be referred to as code or an instruction). When the computer program is run, a computer is enabled to perform the method according to any one of the first aspect to the twentieth aspect and the possible implementations of the first aspect to the twentieth aspect.

According to a twenty-fourth aspect, a communication system is provided, and includes the foregoing network device and terminal device.

DESCRIPTION OF EMBODIMENTS

The following describes the technical solutions in this application with reference to the accompanying drawings.

The technical solutions in embodiments of this application may be used in various communication systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communication system, a future 5th generation (5G) system, or a new radio (NR) system.

Figure 1:
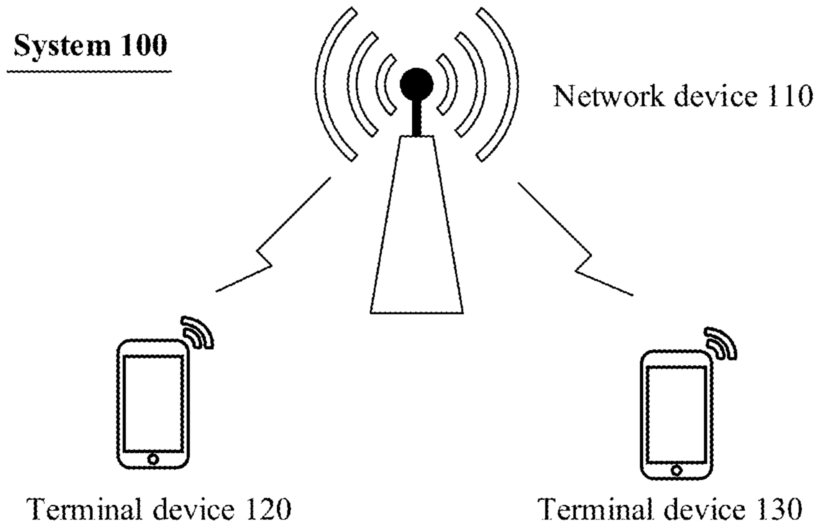
FIG. 1 shows an application scenario according to an embodiment of this application.

For ease of understanding of embodiments of this application, a communication system applicable to embodiments of this application is first described in detail with reference to FIG. 1. FIG. 1 is a schematic diagram of a communication system 100 applicable to a reference signal sending and receiving method in an embodiment of this application. As shown in FIG. 1, the communication system 100 may include a network device 110 and a terminal device 120. Optionally, the communication system may further include a terminal device 130.

It should be understood that the network device 110 may be any device having a wireless transceiver function or a chip that may be disposed on the device. The device includes but is not limited to a base station (for example, a NodeB, an evolved NodeB (eNodeB), or a network device (such as a transmission point (TP), a transmission reception point (TRP), a base station, or a small cell device) in a 5th generation (5G) communication system), a network device in a future communication system, an access node in a wireless fidelity (Wi-Fi) system, a wireless relay node, a wireless backhaul node, and the like.

The network device 110 may communicate with a plurality of terminal devices (for example, the terminal devices 120 and 130 shown in the figure).

It should be understood that the terminal device may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet (or pad), a computer having a wireless transceiver function, a virtual reality (VR) terminal device, an augmented reality (AR) terminal device, a wireless terminal in industrial control, a wireless terminal in a self-driving vehicle, a wireless terminal in telemedicine (remote medical), a wireless terminal in a smart grid, a wireless terminal in transportation safety, a wireless terminal in a smart city, a wireless terminal in a smart home, or the like. An application scenario is not specifically limited in embodiments of this application. In this application, the foregoing terminal device and a chip that can be disposed in the foregoing terminal device are collectively referred to as a terminal device.

In addition, the communication system 100 may alternatively be a public land mobile network (PLMN), a device-to-device (D2D) network, a machine-to-machine (M2M) network, or another network. FIG. 1 is only a simplified schematic diagram of an example for ease of understanding, and the communication system 100 may further include another network device and another terminal device that are not shown in FIG. 1.

For ease of understanding of embodiments of this application, the following briefly describes how the network device configures a quantity of additional DMRSs by using radio resource control (RRC) signaling.

To ensure that a receive end can accurately estimate a PUSCH or PDSCH channel, and correctly demodulate uplink data or downlink data, and to adapt to a plurality of channel fading characteristics, for example, different time-varying characteristics, that is, how fast or slow channel fading changes in time, different DMRS time-frequency resource patterns are configured in a current NR protocol. The DMRSs configured in the current NR protocol include a front-loaded DMRS and an additional DMRS. The current NR protocol defines values of related fields of the DMRS patterns in Table 1 based on distribution of the DMRSs in frequency domain and time domain, and notifies UE of the values by using RRC signaling.

TABLE 1

| Related fields of the DMRS Pattern (notifying by using RRC signaling) | | | |
|---|---|---|---|
| Field (field) | dmrs-type | max Length | dmrs-Additional Position |
| Configuration value (configure) | type1, type2 | len1<br>len2 | pos0, pos1, pos2, pos3,<br>pos0, pos1 |

It should be understood that Table 1 provides possible values of three fields configured by using the RRC signaling. In an actual situation, each time a field parameter is configured by using the RRC signaling, each field may have only one value. For example, dmrs-type is type2, max length is len2, and dmrs-Additional Position is pos3.

The field dmrs-type determines a pattern of the front-loaded DMRS in frequency domain.

When dmrs-type is configured as type1, there are two code division multiplexing (CDM) groups for each physical resource block (PRB) in frequency domain. Six subcarriers of each CDM group can support transmission of two layers by using an orthogonal cover code (OCC). Therefore, when dmrs-type is configured as type1, four layers can be supported on a single time domain symbol.

When dmrs-type is configured as type2, each PRB has three CDM groups in frequency domain, and four subcarriers in each CDM group support two layers by using an OCC. Therefore, when dmrs-type is configured as type2, a maximum of six layers can be supported on a single time domain symbol.

The parameter max Length is used to determine a quantity of symbols occupied by the front-loaded DMRS in time domain.

When max Length is configured as len1, the front-loaded DMRS occupies only one time domain symbol.

When max Length is configured as len2, the front-loaded DMRS may occupy one time domain symbol or may occupy two symbols. Specifically, a quantity of occupied time domain symbols needs to be separately indicated by using downlink control information (DCI). Therefore, multiplexing of doubled UEs can be supported by using a time-domain orthogonal cover code (OCC) between two time-domain symbols.

For example, when dmrs-type is configured as type1, and max Length=len1, transmission of a maximum of eight layers can be supported. When dmrs-type is configured as type2, and max Length=len2, transmission of a maximum of 12 layers can be supported.

The field dmrs-Additional Position is used to determine a maximum quantity of additional DMRSs that can be configured in one transmission time interval (transmission time interval, TTI).

When the field dmrs-Additional Position is configured as Pos0, no additional DMRS can be configured.

When the field dmrs-Additional Position is configured as Pos1, a maximum of one additional DMRS can be configured.

When the field dmrs-Additional Position is configured as Pos2, a maximum of two additional DMRSs can be configured.

When the field dmrs-Additional Position is configured as Pos3, a maximum of three additional DMRSs can be configured.

In the current NR protocol, a quantity of time domain symbols occupied by each additional DMRS is the same as the quantity of time domain symbols occupied by the front-loaded DMRS. When the front-loaded DMRS occupies one time domain symbol, if an additional DMRS is configured, each additional DMRS also occupies one time domain symbol. When the front-loaded DMRS occupies two consecutive time domain symbols, if an additional DMRS is configured, each additional DMRS also occupies two consecutive time domain symbols.

When the field max Length=len1, the DCI indication is consistent with the RRC signaling, that is, the front-loaded DMRS occupies only one time domain symbol, and a maximum of three additional DMRSs may be configured.

When the field max Length=len2, regardless of whether the DCI indicates that the front-loaded DMRS occupies one time domain symbol or two time domain symbols, a maximum of one additional DMRS may be configured.

The foregoing parameter for configuring the quantity of additional DMRSs is determined by using higher layer RRC signaling. However, a parameter configuration update of the RRC signaling needs to be performed by using a plurality of processes such as connection management, radio bearer control, and connection mobility. Therefore, an update delay of the parameter is long. In a period of time before the update, a same additional DMRS configuration is used for sending data in a plurality of time units, that is, a value of a maximum quantity of additional DMRSs in each time unit is the same, so that DMRS configuration is performed for each time unit.

A larger quantity of DMRSs that can be used indicates a more accurate channel state estimated based on the DMRSs. Based on the foregoing descriptions, this application provides a DMRS configuration method, used by a transmit end to perform joint sending based on configuration of a DMRS, and correspondingly, used by a receive end to perform joint channel estimation based on configuration of the DMRS.

When the transmit end can ensure that DMRSs in a plurality of time units maintain phase continuity, that is, no phase noise unknown to both the receive end and the transmit end is introduced, the receive end may perform joint channel estimation by using the DMRSs in the plurality of time units, to improve accuracy of channel estimation and data demodulation.

Specifically, uplink transmission is used as an example. A sending condition of the terminal device in the plurality of time units is limited in uplink signal sending, to ensure phase continuity of sending in the plurality of time units, and ensure to introduce no random phase unknown to the receive end and the transmit end. Therefore, a network device can perform joint channel estimation on received uplink signals in the plurality of time units. During downlink signal reception, a terminal device is notified, by using indication information, to perform joint channel estimation in a plurality of time units, and sending by the network device in different time units is also limited. The following describes in detail the technical solutions of an indication method of joint channel estimation provided in an embodiment of this application with reference to FIG. 2.

S210: A network device sends first scheduling information to a terminal device, where the first scheduling information is used by the terminal device to determine whether transmission in a first time unit meets a first condition.

When the first scheduling information is the same as second scheduling information of a second time unit, transmission in the first time unit meets the first condition, or when the first scheduling information is different from second scheduling information of a second time unit, transmission in the first time unit is not limited by the first condition.

The second time unit is a time unit before the first time unit. It may also be understood that a time domain sequence of the second time unit is before a time domain sequence of the first time unit. The first time unit and the second time unit may be consecutive time units, or may be inconsecutive time units. A transmission direction in the first time unit is the same as that in the second time unit, and transmission in opposite directions does not exist between the second time unit and the first time unit. For example, transmission in both the first time unit and the second time unit is uplink transmission, or transmission in both the first time unit and the second time unit is downlink transmission. For another example, the first time unit and the second time unit are inconsecutive. For example, when there is a time unit that is between the first time unit and the second time unit and in which no data is transmitted, and there is no transmission in opposite directions between the second time unit and the first time unit, a possibility of phase continuity of transmission between the first time unit and the second time unit is provided.

The first condition includes at least one of same transmit power, same precoding, a same antenna port, and a same frequency domain resource. Based on the first condition, when the terminal device sends data in the first time unit and the second time unit, phase continuity in different time units can be ensured.

When transmission in the first time unit meets the first condition, it indicates that transmission in the first time unit and transmission in the second time unit are in a same direction.

Correspondingly, the terminal device receives the first scheduling information, and the terminal device determines, based on the first scheduling information, whether transmission in the first time unit meets the first condition.

Case 1: When transmission in the first time unit and transmission in the second time unit are uplink sending:

The terminal device determines, based on the first scheduling information, whether transmission in the first time unit meets the first condition.

For example, when the first scheduling information corresponding to the first time unit is the same as the second scheduling information corresponding to the second time unit, the terminal device determines that transmission in the first time unit meets the first condition. In other words, transmission in the first time unit and transmission in the second time unit need to meet at least one of the same transmit power, the same precoding, the same antenna port, and the same frequency domain resource.

When receiving the uplink data, the network device can combine DMRSs that are in the first time unit and the second time unit and that meet phase continuity, to implement more accurate channel estimation and improve demodulation performance for uplink transmitted data.

Case 2: When transmission in the first time unit and transmission in the second time unit are downlink reception:

The terminal device determines, based on the first scheduling information, whether transmission in the first time unit meets the first condition.

For example, when the first scheduling information corresponding to the first time unit is the same as the second scheduling information corresponding to the second time unit, transmission in the first time unit meets the first condition, that is, the terminal device determines that transmission in the first time unit meets the first condition. In other words, data transmission in the first time unit and transmission in the second time unit meet at least one of the same transmit power, the same precoding, the same antenna port, and the same frequency domain resource.

When receiving the downlink data, the terminal device can combine DMRSs that are in the first time unit and the second time unit and that meet phase continuity, to implement more accurate channel estimation and improve demodulation performance for uplink transmitted data.

It should be understood that, assuming that the network device schedules N time units for transmission, the N time units are in a one-to-one correspondence with N pieces of scheduling information delivered by the network device. In other words, the first scheduling information is scheduling information corresponding to the first time unit, the second scheduling information is scheduling information corresponding to the second time unit, and the first scheduling information and the second scheduling information are a same type of scheduling information.

That the first scheduling information is the same as the second scheduling information may be understood that values of the first scheduling information and the second scheduling information are the same.

It should be further understood that transmission in the first time unit may include: The terminal device receives the downlink data in the first time unit, or the terminal device sends uplink data in the first time unit.

Optionally, the first scheduling information and the second scheduling information are carried in downlink control information DCI. To be specific, the first scheduling information and the second scheduling information are carried in two different pieces of DCI. Further, optionally, the first scheduling information may be a reused field defined in an existing protocol in the DCI, or may be a newly added field defined in an existing protocol, or may be a reserved field defined in an existing protocol. This is not specifically limited in this embodiment of this application.

For example, in this embodiment of this application, a value of 1 bit in the DCI is used to determine whether transmission in the first time unit meets the first condition.

If a value of a field corresponding to the first scheduling information carried in the DCI is the same as a value of a field corresponding to the second scheduling information in the DCI, transmission in the first time unit needs to meet the first condition, in other words, transmission in the first time unit and transmission in the second time unit maintain at least one of the same transmit power, the same precoding, the same antenna port, and the same frequency domain resource. If a value of a field corresponding to the first scheduling information is different from a value of a field corresponding to the second scheduling information, data transmission in the first time unit may meet the first condition, or may not meet the first condition, in other words, transmission in the first time unit and transmission in the second time unit do not need to maintain at least one of the same transmit power, the same precoding, the same antenna port, and the same frequency domain resource. For example, when the field corresponding to the first scheduling information and the field corresponding to the second scheduling information each are 1 bit, and the 1 bit is 0 or 1, transmission in the first time unit needs to meet the first condition.

S220: The network device sends third scheduling information to the terminal device, where the third scheduling information indicates that a sending device meets a second condition within first duration, and the second condition includes one or more of the following: The sending device does not turn off a power amplifier, the sending device does not perform carrier frequency switching, or the sending device does not perform antenna switching.

Specifically, when the terminal device sends uplink data in the first time unit and the second time unit, the terminal device is a sending device. The terminal device performs, within the first duration, at least one of the following: not turning off the power amplifier, not performing carrier switching, or not performing antenna switching. When the terminal device receives downlink data in the first time unit and the second time unit, the network device is a sending device. The network device performs, within the first duration, at least one of the following: not turning off the power amplifier, not performing carrier switching, or not performing antenna switching.

It should be understood that, when the first time unit and the second time unit are consecutive, when transmission in the first time unit meets the first condition, the terminal device may perform joint channel estimation on a DMRS received in the first time unit and a DMRS received in the second time unit. When the first time unit and the second time unit are inconsecutive, the terminal device further needs to indicate, by using the third scheduling information, whether the network device meets a second condition in a downlink sending process, that is, whether the network device performs an operation, for example, not turning off the power amplifier or not performing antenna switching, in inconsecutive time units. When the second condition and the first condition are met, for the inconsecutive first time unit and second time unit, the terminal device may still perform joint channel estimation on the DMRS received in the first time unit and the DMRS received in the second time unit.

The first condition and the second condition can limit joint channel estimation in a plurality of time units. Specifically, the following two cases may be included.

In a possible case, the first scheduling information of the first time unit is the same as the second scheduling information of the second time unit, that is, the first condition is met, joint channel estimation may be performed in the first time unit and the second time unit. If the third scheduling information corresponding to a time unit between the first time unit and the second time unit is the same as the first scheduling information of the first time unit, joint channel estimation may also be performed in the time unit and the first time unit. Therefore, joint channel estimation may be performed in the time unit, the first time unit, and the second time unit. By analogy, unified joint channel estimation may be performed in all time units that meet the first condition.

In another possible case, if the first scheduling information of the first time unit is the same as the first scheduling information of the second time unit, that is, the first condition is met, and when the first time unit and the second time unit are inconsecutive, the second condition is further met, joint channel estimation may be performed in the first time unit and the second time unit. If the third scheduling information corresponding to a time unit between the first time unit and the second time unit is the same as the first scheduling information of the first time unit, and when the second time unit and the first time unit are inconsecutive, the second condition is met, joint channel estimation may also be performed in the time unit and the first time unit. Therefore, joint channel estimation may be performed in the time unit, the first time unit, and the second time unit. By analogy, unified joint channel estimation may be performed in all time units that meet the first condition and the second condition.

In addition, a quantity of time units included in the first time unit and the second time unit may be the same or different. For example, the time unit is a slot, the first time unit may be a plurality of consecutive time units corresponding to repeated transmission, and the second time unit is a single time unit corresponding to non-repeated transmission. For example, the first scheduling information may be carried in one piece of DCI for scheduling four times of repeated transmission. Assuming that each time of repeated transmission occupies four slots, the first time unit includes four slots in which repeated transmission is performed. The second scheduling information is carried in one piece of DCI for scheduling non-repeated transmission. Assuming that the non-repeated transmission occupies one slot, the second time unit includes one slot. If the first condition and/or the second condition are/is met, joint channel estimation may be performed on DMRSs in the four slots included in the first time unit and the slot included in the second time unit, namely, five slots in total.

Optionally, the first duration may be any one of the following manners.

Manner 1: The first time period is duration including the first time unit and the second time unit, and the terminal device needs to meet the second condition in the duration when sending the uplink data, or the network device needs to meet the second condition in the duration when sending the downlink data.

Manner 2: When the first time unit and the second time unit are inconsecutive, for example, there are one or more time units between the first time unit and the second time unit, the first duration may be duration corresponding to the one or more time units between the first time unit and the second time unit, in this case, the first duration does not include the first time unit and the second time unit. In this case, when sending uplink data, the terminal device needs to meet the second condition in a time unit between the first time unit and the second time unit.

Manner 3: The first duration may be understood as a periodic time period.

The first duration may be a time period, for example, one millisecond or several milliseconds. Alternatively, the first duration may be one or more time units, for example, one or more slots or one or more time domain symbols. The first duration includes the first time unit and the second time unit.

It should be understood that the first duration may alternatively have another manner or another form. This is not specifically limited in embodiments of this application.

Optionally, the second condition is valid within the first duration. In this case, it may be understood that sending of the downlink data by the network device or sending of the uplink data by the terminal device may be limited in the first duration. If duration exceeds the first duration, sending of data by the network device or the terminal device is not limited by the second condition.

Optionally, the first duration is configured by the network device by using radio resource control RRC signaling, or the first duration is predefined.

For example, the network device configures a parameter by using the RRC signaling. A value of the parameter represents duration of the first duration, or it is understood that a value of the parameter is used to determine effective limiting duration of the second condition, or the first duration is predefined. In this case, the network device does not need to separately configure and send the third scheduling information.

S230: Before the terminal device receives the downlink data, the terminal device reports capability information to the network device, where the capability information indicates whether the terminal device can support joint channel estimation in a plurality of time units.

It should be understood that a quantity of time units in which the terminal device can support joint channel estimation is limited by a capability of the terminal device. Before receiving the downlink data, the terminal device needs to report, to the network device, whether the terminal device can support joint channel estimation. Alternatively, the terminal device needs to report, to the network device, a maximum quantity of time units in which the terminal device can support joint channel estimation.

It should be understood that the capability information may be a field, the field includes one or more bits, and different status values or different values of the field indicate different capability information. Specific indication includes the following possible manners.

Manner 1: The capability information is indication information of 1 bit, and a value of the 1 bit notifies the network device whether the terminal device can support joint channel estimation in a plurality of time units. For example, when the value of the 1 bit is 1, the terminal device can meet joint channel estimation in a plurality of time units. When the value of the 1 bit is 0, the terminal device cannot support joint channel estimation in a plurality of time units.

Manner 2: The capability information is one parameter configured by the terminal device, and the parameter includes a plurality of bits. Different values of the parameter indicate a maximum quantity of different time units in which the terminal device can support joint channel estimation. A value of the parameter may directly indicate a quantity of time units in which the terminal device can support joint channel estimation, that is, the value of the parameter is the same as the maximum quantity of time units in which the terminal device can support joint channel estimation. For example, if a value of the capability information is 6, it indicates that the terminal device can support joint channel estimation in a maximum of six time units. The value of the parameter may alternatively correspond to a quantity of time units based on a predefined relationship. For example, the predefined relationship is that the value of the parameter is half of the maximum quantity of time units in which the terminal device can support joint channel estimation. For example, if the value of the capability information is 3, it indicates that the terminal device can support joint channel estimation in six time units.

Manner 3: The capability information includes indication information of a plurality of bits, and the plurality of bits include a first bit part and a second bit part. A value of the first bit part indicates whether the network device and the terminal device can support joint channel estimation in a plurality of time units. A value of the second bit part indicates the maximum quantity of time units in which the terminal device can support joint channel estimation.

It should be understood that the capability information may alternatively be indicated in another manner. This is not specifically limited in embodiments of this application.

For the terminal device, when a quantity of time units in which joint channel estimation needs to be performed is less than the maximum quantity of time units in which the terminal device can support joint channel estimation, the terminal device may perform joint channel estimation. When a quantity of time units in which joint channel estimation needs to be performed is greater than the maximum quantity M of time units in which the terminal device can support joint channel estimation, the terminal device cannot perform joint channel estimation, or can perform joint channel estimation only in M adjacent time units. For example, when the capability information indicates that the terminal device can support joint channel estimation in a maximum of six time units, if a quantity of time units that meet the first condition and/or meet the second condition is 8, optionally, the terminal device cannot support performing joint channel estimation in the time units that meet the first condition and/or the second condition, or the terminal device can perform joint channel estimation in only six time units that meet the first condition and/or the second condition. For example, the terminal device may separately perform joint channel estimation in time units #1 to #6, perform joint channel estimation in time units #2 to #7, and perform joint channel estimation in time units #3 to #8.

Therefore, reporting the capability information by the terminal device helps the network device schedule a time domain resource for the terminal device based on the capability of the terminal device, to improve communication performance.

S240: The terminal device sends uplink data in the first time unit and the second time unit, or the terminal device receives downlink data in the first time unit and the second time unit.

When transmission in the first time unit meets the first condition, and both transmission in the first time unit and transmission in the second time unit are downlink reception, the terminal device determines that the first condition is met when the network device sends the downlink data, and the terminal device performs joint channel estimation in the first time unit and the second time unit based on the DMRS in the first time unit and the DMRS in the second time unit. Alternatively, when transmission in the first time unit meets the first condition, and both transmission in the first time unit and transmission in the second time unit are uplink sending, the terminal device determines that the first condition is met when the terminal device sends the uplink data, and correspondingly, the network device performs joint channel estimation based on the DMRS in the first time unit and the DMRS in the second time unit.

Optionally, the time unit may be a slot, a sub-slot, a frame, a subframe, or a time domain resource occupied by one time of transmission of a data block. This is not specifically limited in embodiments of this application.

Specifically, the technical solutions in embodiments of this application are further described in detail with reference to an example.

Transmission in the first time unit and transmission in the second time unit may include two cases: sending uplink data or receiving downlink data.

Case 1: For example, the terminal device sends uplink data. When the value of the second scheduling information corresponding to sending in the second time unit is 1, when the first time unit after the second time unit is also used for uplink sending, and there is no downlink reception between the second time unit and the first time unit, sending in the first time unit needs to meet the first condition. To be specific, when the value of the first scheduling information corresponding to sending in the first time is also 1, sending by the terminal device in the first time unit needs to be performed by using transmit power, precoding, an antenna port, frequency domain resource configuration, and the like in the second time unit, so that sending by the terminal device in the first time unit can maintain the phase continuity with sending by the terminal device in the second time unit. When receiving the uplink data, the network device can combine the DMRS that meets the phase continuity in the first time unit and the DMRS that meets the phase continuity in the second time unit, to implement more accurate channel estimation and improve demodulation performance of uplink transmitted data.

When the first time unit and the second time unit are inconsecutive, for example, the time unit is a slot, and each slot includes 14 time domain symbols, the terminal device performs PUSCH sending of 14 time domain symbols in the first time unit, and performs PUSCH sending of 12 time domain symbols in the second time unit, and a 13$^{th}$ time domain symbol and a 14$^{th}$ time domain symbol in the second time unit are not used to receive downlink data. For example, the 13$^{th}$ time domain symbol and the 14$^{th}$ time domain symbol in the second time unit may be idle uplink or flexible time domain symbols, or may be two uplink time domain symbols used to send a channel sounding reference signal. When the terminal device determines, based on the received first scheduling information, that sending in the first time unit needs to meet the first condition, when the first time unit and the second time unit are inconsecutive, the terminal device further needs to indicate that the terminal device needs to meet the second condition in inconsecutive time units. That is, operation behavior that destroys phase continuity of signal sending in the first time unit and the second time unit cannot occur. For example, the terminal device cannot turn off a power amplifier (cannot send a signal in a timely manner), or cannot perform antenna switching.

It should be understood that the terminal device needs to meet the second condition in consecutive time units. The second condition may be indicated by using the independent third scheduling information, or may be implicitly indicated by using the first scheduling information. In this case, the third scheduling information and the first scheduling information are carried in a same field. That is, when determining that sending in the first time unit needs to meet the first condition, the terminal device also needs to meet the second condition by default for a case in which the first time unit and the second time unit are inconsecutive.

Case 2: For example, the network device sends downlink data. When the value of the second scheduling information corresponding to sending in the second time unit is 0, when the first time unit after the second time unit is also used for downlink reception, and there is no uplink sending between the second time unit and the first time unit, sending in the first time unit needs to meet the first condition. To be specific, when the value of the first scheduling information corresponding to sending in the first time is also 0, sending by the terminal device in the first time unit needs to be performed by using transmit power, precoding, an antenna port, frequency domain resource configuration, and the like in the second time unit, so that sending by the network device in the first time unit can maintain the phase continuity with sending by the network device in the second time unit. When receiving the downlink data, the network device can combine the DMRS that meets the phase continuity in the first time unit and the DMRS that meets the phase continuity in the second time unit, to implement more accurate channel estimation and improve demodulation performance of uplink transmitted data.

When the first time unit and the second time unit are inconsecutive, for example, the time unit is a slot, and each slot includes 14 time domain symbols, the network device performs PDSCH sending of 14 time domain symbols in the first time unit, and performs PDSCH sending of 12 time domain symbols in the second time unit, and a 13$^{th}$ time domain symbol and a 14$^{th}$ time domain symbol in the second time unit are not used to send uplink data. For example, the 13$^{th}$ time domain symbol and the 14$^{th}$ time domain symbol in the second time unit may be idle downlink or flexible time domain symbols, or may be two downlink time domain symbols used to receive a channel sounding reference signal. When the terminal device determines, based on the received first scheduling information, that sending in the first time unit needs to meet the first condition, when the first time unit and the second time unit are inconsecutive, the terminal device further needs to be notified that the network device needs to meet the second condition in inconsecutive time units. That is, operation behavior that destroys phase continuity of signal sending in the first time unit and the second time unit cannot occur. For example, the network device cannot turn off a power amplifier (cannot send a signal in a timely manner), or cannot perform antenna switching.

It should be understood that the network device needs to meet the second condition in consecutive time units. The second condition may be indicated by using the independent third scheduling information, or may be implicitly indicated by using the first scheduling information. In this case, the third scheduling information and the first scheduling information are carried in a same field. That is, when determining that sending in the first time unit needs to meet the first condition, the terminal device also needs to meet the second condition by default for a case in which the first time unit and the second time unit are inconsecutive.

Joint channel estimation is performed on all DMRSs in a plurality of time units, so that accuracy of channel estimation can be improved, data demodulation performance can be improved, and a transmission capability can be improved.

Another possibility is provided.

Step S2101: A network device sends first information to a terminal device, and correspondingly, the terminal device receives the first information.

Specifically, the first information may indicate a first time period, or the first information may indicate that uplink sending by the terminal device meets phase continuity.

Step S2102: The terminal device meets the phase continuity in the first time period based on the first information, where the phase continuity includes at least one of same transmit power, a same modulation order, a same antenna port, and a same frequency domain resource. Meeting the phase continuity also understood as that the terminal device does not perform, in the first time period, an action of destroying the phase continuity, including: The terminal device does not change a working status of a power amplifier, does not switch an antenna port, does not change a modulation order, or does not change a frequency domain resource position.

Optionally, Manner 1: When the first information indicates the first time period, the terminal device receives the first information, and the terminal device meets the phase continuity in a time length of the first time period based on the first time period indicated by the first information. It may also be understood that, in this case, the first information explicitly indicates the first time period, and implicitly indicates that the terminal device meets the phase continuity. In other words, the terminal device needs to meet a time length of phase continuity in the first time period.

Optionally, the first information may be carried in RRC signaling or DCI.

Further, optionally, the first information may be a parameter field in RRC signaling or DCI, and the parameter field includes one or more bits. In an optional manner, different bit status values of the one or more bits correspond to different time lengths. The different time lengths are different values of the first time period. For example, the parameter field includes 1 bit, and two types of status values of the 1 bit correspond to two time lengths. When the bit status value is 0, the first time period is 5 ms, and when the bit status value is 1, the first time period is 10 ms. A correspondence between different bit status values of the one or more bits and different time lengths may be predefined, or may be configured by using higher layer signaling, for example, RRC signaling or MAC signaling. In another optional manner, the parameter field includes one or more bits, and status values of the one or more bits are values of time lengths. For example, the parameter field includes 3 bits. When the bit status value is 100, the first time period is 5 ms, and when the bit status value is 111, the first time period is 8 ms.

Optionally, Manner 2: When the first information indicates that uplink sending by the terminal device meets the phase continuity, the terminal device receives the first information, and the terminal device meets the phase continuity in the first time period. The first time period may be a predefined time length, or may be indicated by the network device by using signaling. The met phase continuity includes at least one of the same transmit power, a same modulation and coding scheme, the same antenna port, and the same frequency domain resource. In other words, the phase continuity includes at least one of not disabling the power amplifier, not switching the frequency domain resource, not switching the antenna port, and not changing the modulation order.

Optionally, the first information may be carried in RRC signaling or DCI.

Further, optionally, the first information may be carried in a parameter field in RRC signaling or DCI. The parameter field may include one or more bits, and different bit status values of the one or more bits correspond to whether uplink sending by the terminal device needs to meet the phase continuity. In an optional manner, the first information includes 1 bit, and when a bit status value of the 1 bit is 0, uplink sending by the terminal device does not need to meet the phase continuity, and when a bit status value of the 1 bit is 1, after the terminal device receives the first information, when performing uplink sending, the terminal device needs to ensure that uplink sending meets the phase continuity in the first time period. Optionally, the terminal device may ensure that uplink sending meets continuity in the first time period.

In the foregoing Manner 1 and Manner 2, when the first information is carried in the DCI, in an optional manner, the first information is carried in the first DCI, and the first DCI may be DCI that schedules uplink sending by the terminal device. That is, in this case, the first information is a parameter field in downlink control information that the network device schedules the terminal device to send in uplink. In this case, if the first information indicates the first time period, because the downlink control information that carries the first information also includes corresponding time domain resource information for performing uplink sending by the terminal device, the time domain resource information includes information about one or more time units, and an association relationship may exist between a start position of the first time period and the time domain resource information.

The start position of the first time period may be a start moment or an end moment of a $1^{st}$ time unit in a time domain sequence from front to back in time units corresponding to uplink sending scheduled by the first DCI.

Alternatively, the start position of the first time period may be a start moment or an end moment of $1^{st}$ uplink sending in a time domain sequence from front to back in uplink sending scheduled by the first DCI.

Alternatively, the start position of the first time period may be a start moment or an end moment of a last time unit in a time domain sequence from front to back in time units corresponding to uplink sending scheduled by the first DCI Alternatively, the start position of the first time period may be a start moment or an end moment of last uplink sending in a time domain sequence from front to back in uplink sending scheduled by the first DCI.

Alternatively, the start position of the first time period may be an end moment of each of a plurality of times of uplink sending in a plurality of time units scheduled by the first DCI, that is, the terminal device still meets the phase continuity in a 1st time period after each time of uplink transmit ends.

Further, when the terminal device does not perform uplink sending in the first time period, the terminal device does not need to perform uplink sending, and does not need to adjust the power amplifier, the transmit power, the modulation scheme, or the antenna port. When the terminal device performs uplink sending in the first time period, uplink sending by the terminal device in the first time period meets the phase continuity, or when the first time period includes at least two time units used for uplink sending, uplink sending in the at least two time units meets the phase continuity. The met phase continuity includes at least one of the same transmit power, the same modulation scheme, the same antenna port, and the same frequency domain resource. In other words, the phase continuity includes at least one of not disabling the power amplifier, not switching the frequency domain resource, not switching the antenna port, and not changing the modulation order. Uplink transmission in the first time period may be one time of transmission of a single-slot transmission block TB, or a plurality of times of a single-slot transmission block TBs, or one time of transmission of a transmission block over multiple slots TBoMS, or a plurality of times of transmission of a transmission block over multiple slots TBoMS.

Figure 13:
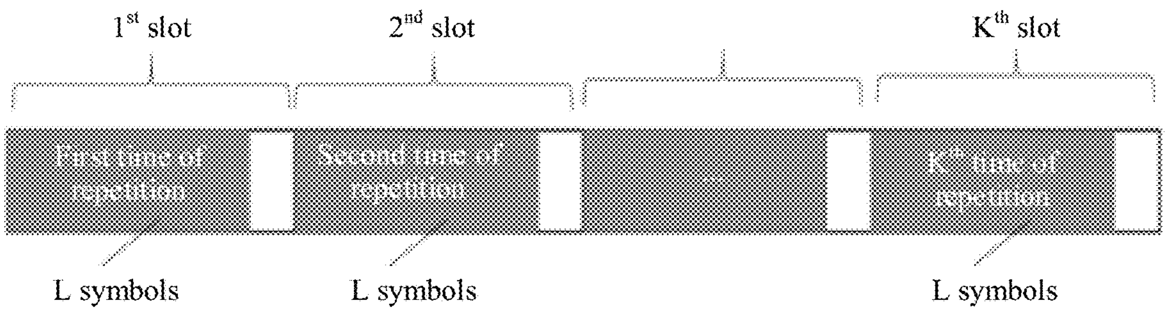
FIG. 13 is a schematic diagram of transmission of a PUSCH repetition type A according to an embodiment of this application.

For example, as shown in FIG. 13, the first DCI schedules K times of sending of a repetition type A on a physical uplink shared data channel PUSCH, the K times of sending on the PUSCH occupies K slots, a quantity of time domain symbols occupied by each repeated sending on the PUSCH is L, and a start position for each time of repeated sending is S=0 (where the start position S=0 indicates starting from a 1st time domain symbol of the slot). When L<14, as shown in the following figure, the K times of repeated sending is performed, where 14-L time domain symbols are inconsecutive between any two times of repeated sending, and are not used for repeated sending. When a value of the first time period is greater than or equal to a time length of the 14-L time domain symbols, the terminal device still meets the phase continuity on the 14-L time domain symbols on which each time of repeated transmit ends, that is, the terminal device does not change a working status of the power amplifier (for example, the terminal device does not turn off the power amplifier, or the terminal device does not adjust a power amplifier level of the power amplifier), the terminal device does not switch the antenna port, the terminal device does not perform downlink data receiving, the terminal device does not change the transmit power, or the like.

Figure 14:
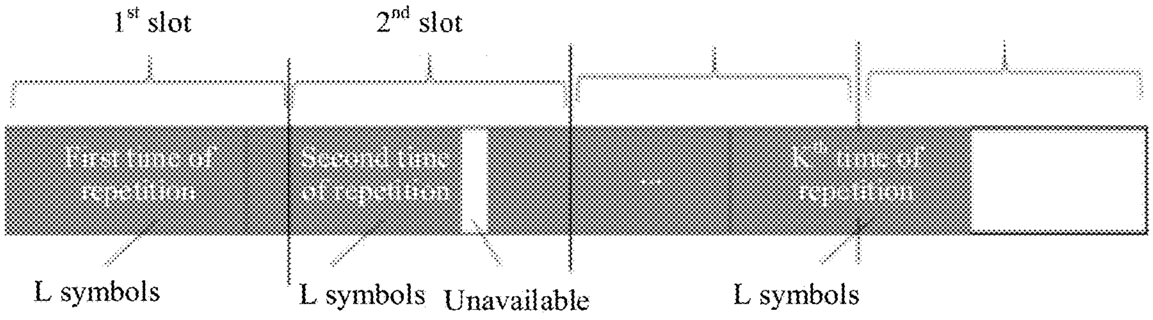
FIG. 14 is a schematic diagram of transmission of a PUSCH repetition type B according to an embodiment of this application.

For example, the first DCI schedules K times of sending of a repetition type B on a physical uplink shared data channel PUSCH, sending on the PUSCH occupies K slots, and a quantity of time domain symbols occupied by repeated sending on the PUSCH is L. When a start position S for each time of repeated sending occupies S×L consecutive time domain symbols in total, if some time domain symbols are unavailable, as shown in FIG. 14, some time domain symbols are interrupted and unavailable in a second time of repeated sending, so that when the second time of repeated sending and a third time of repeated sending are inconsecutive, the terminal device still meets the phase continuity in a first time period (greater than or equal to a time length or a quantity of the foregoing unavailable time domain symbols) after an end moment of the second time of repeated sending, that is, the terminal device does not change a working status of the power amplifier (for example, the terminal device does not turn off the power amplifier, or the terminal device does not adjust a power amplifier level of the power amplifier), the terminal device does not switch the antenna port, the terminal device does not perform downlink data receiving, the terminal device does not change the transmit power, or the like.

Figure 15:
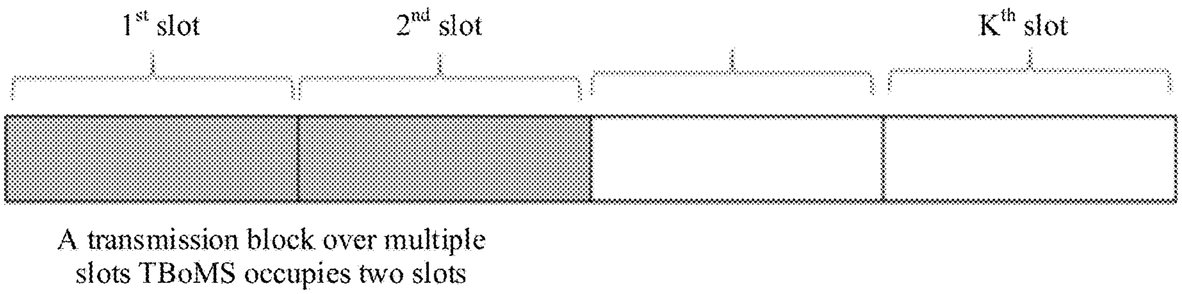
FIG. 15 is a schematic diagram of a transmission block over multiple slots according to an embodiment of this application.

For example, when the first DCI schedules sending of a transmission block over multiple slots (TBoMS) in K time units, the terminal device still meets the phase continuity in a first time period after an end moment of sending of the multi-slot transport block, as shown in FIG. 15, the first DCI schedules sending of a transmission block over multiple slots. For example, the TBoMS occupies two slots. In this case, the terminal still meets the phase continuity in a first time period after sending of the TBoMS ends. That is, the terminal device does not change a working status of the power amplifier (for example, the terminal device does not turn off the power amplifier, or the terminal device does not adjust a power amplifier level of the power amplifier), the terminal device does not switch the antenna port, the terminal device does not perform downlink data receiving, the terminal device does not change the transmit power, or the like. The transmission block over multiple slots TBoMS is used to calculate a size of a transport block based on time-frequency resources of a plurality of slots, and one transmission block (TB) is carried in a plurality of slots.

In an optional embodiment, the method further includes step S2103: The network device sends second information to the terminal device, and correspondingly, the terminal device receives the second information.

Specifically, the second information indicates that uplink sending by the terminal device can meet the phase continuity, or the second information indicates the terminal device to monitor the first information.

Manner 1: The network device indicates, by using the second information, that uplink sending by the terminal device can meet the phase continuity. It may also be understood that the second information indicates that the terminal device can enable a function of meeting the phase continuity in uplink sending. That is, in this case, the second information may be used as a function switch. In this case, after the terminal device receives the second information, if the terminal device also receives the first information, the terminal device performs the corresponding behavior in steps S2101 and S2102. If the terminal device does not receive the second information, or the second indication information indicates that the phase continuity function is disabled, the terminal device fails to enable a capability of meeting the phase continuity in uplink sending. In this case, even if the terminal device receives the first information, the terminal device cannot perform corresponding behavior of meeting the phase continuity in uplink sending.

Manner 2: The second information indicates that the terminal device may start to monitor the first information. In this case, similar to Manner 1, the terminal device receives the second information and performs behavior of starting to monitor the first information. If the terminal device also receives the first information, the terminal device performs the corresponding behavior in steps S2101 and S2102. If the terminal device does not receive the second information, the terminal device does not start to monitor the first information. In this case, even if the network device sends the first information, the terminal device cannot identify content indicated by the first information, and therefore does not need to perform corresponding behavior of meeting the phase continuity in uplink sending.

In Manner 1 and Manner 2, the second information may include one or more bits, and different status values of the one or more bits indicate different indication content. For example, the first information includes 1 bit. When a value of the 1 bit is 1, the second information indicates that uplink sending by the terminal device can meet the phase continuity, or the second information indicates that the terminal device can start to monitor the first information. When a value of the 1 bit is 0, the second information indicates that uplink sending by the terminal device does not need to meet the phase continuity, or the second information indicates that the terminal device does not need to monitor the first information.

Optionally, the second information may be carried in RRC signaling. When the RRC signaling indicates that uplink sending by the terminal device does not need to meet the phase continuity, or when the RRC signaling indicates that the terminal device does not need to monitor the first information, the terminal device does not need to perform the corresponding behavior in S2101 and S2102. When the RRC signaling indicates that uplink sending by the terminal device may meet the phase continuity, or when the RRC signaling indicates that the terminal device starts to monitor the first information, further optionally, the first information may be carried in DCI. That is, in this case, the RRC signaling and the DCI jointly indicate that uplink sending by the terminal device meets the phase continuity. When the second information indicated by the RRC signaling indicates that the terminal does not enable the function of meeting the phase continuity in uplink sending, the terminal device does not need to monitor and receive the first information. This reduces energy consumption of the terminal device for monitoring and receiving the first information, and meets a dynamic indication of flexible phase continuity based on a joint indication of the RRC and the DCI. In the foregoing Manner 1, when the second information indicates that the terminal enables the function of meeting the phase continuity in uplink sending, in an optional embodiment, the method may further include Step S2104: The network device sends third information to the terminal device, and correspondingly, the terminal device receives the third information.

Specifically, the third information is used to activate or deactivate monitoring the first information by the terminal device. Optionally, the second information is carried in RRC signaling, the third information is carried in a media access control control element MAC CE, and the first information is carried in DCI. An update time period of the MAC CE that is sent in uplink is greater an than update time period of the DCI, and is less than an update time period of the RRC signaling. In this case, whether uplink sending by the terminal device needs to meet the phase continuity is jointly indicated the RRC signaling, the MAC CE, and the DCI. Compared with indicating, by the RRC and the DCI jointly, whether uplink sending by the terminal device needs to meet the phase continuity, this is more dynamic and flexible. For example, when the second information carried in the RRC signaling indicates that the terminal can enable a function in which joint channel estimation meets the phase continuity of uplink sending, the terminal device keeps monitoring and receiving the first information. The terminal device does not stop monitoring and receiving the first information until the second information updated and the RRC signaling indicates that the terminal device cannot enable the function that joint channel estimation meets the phase continuity of uplink sending. Therefore, in a long time period of updating the RRC signaling, the terminal device needs to keep monitoring and receiving the first information. This causes high energy consumption. Therefore, by introducing the MAC CE signaling, even if the second information is not updated in time by using the RRC signaling, a function of monitoring and receiving the first information by the terminal device may be activated or deactivated by using the MAC CE signaling that is quickly updated. This implements flexible configuration of whether to monitor the first information in one switching time length of the RRC signaling. In uplink sending, for example, in one switching time length of the RRC signaling, the network device may activate, by using one MCA CE, monitoring of the first information by the terminal device. In this case, the terminal device monitors the first information. When monitoring the first information by the terminal device is activated, if the terminal device receives a new MAC CE indicating to deactivate monitoring the first information by the terminal device, the terminal device no longer monitors the first information.

In an optional embodiment, when the first information indicates the first time period, and the first information is carried in the first DCI, the first information may further indicate a time offset (English: time offset). The time offset and the first time period are used together to determine a time interval in which the terminal device needs to meet the phase continuity. The time interval may also be understood as a time window. A start moment of the time offset may be a start moment or an end moment of a 1$^{st}$ time unit in a time domain sequence from front to back in uplink sending scheduled by the first DCI. Alternatively, a start moment of the time offset may be a start moment or an end moment of 1$^{st}$ uplink sending in a time domain sequence from front to back in uplink sending scheduled by the first DCI. This is not limited in this application. It should be noted that, in the foregoing descriptions, the time offset is a value indicated by the network device by using the first information. Alternatively, the time offset may be a predefined value. In this case, the network device and the terminal device may determine the time offset without signaling interaction, to determine the time window that meets the phase continuity.

Figure 3:
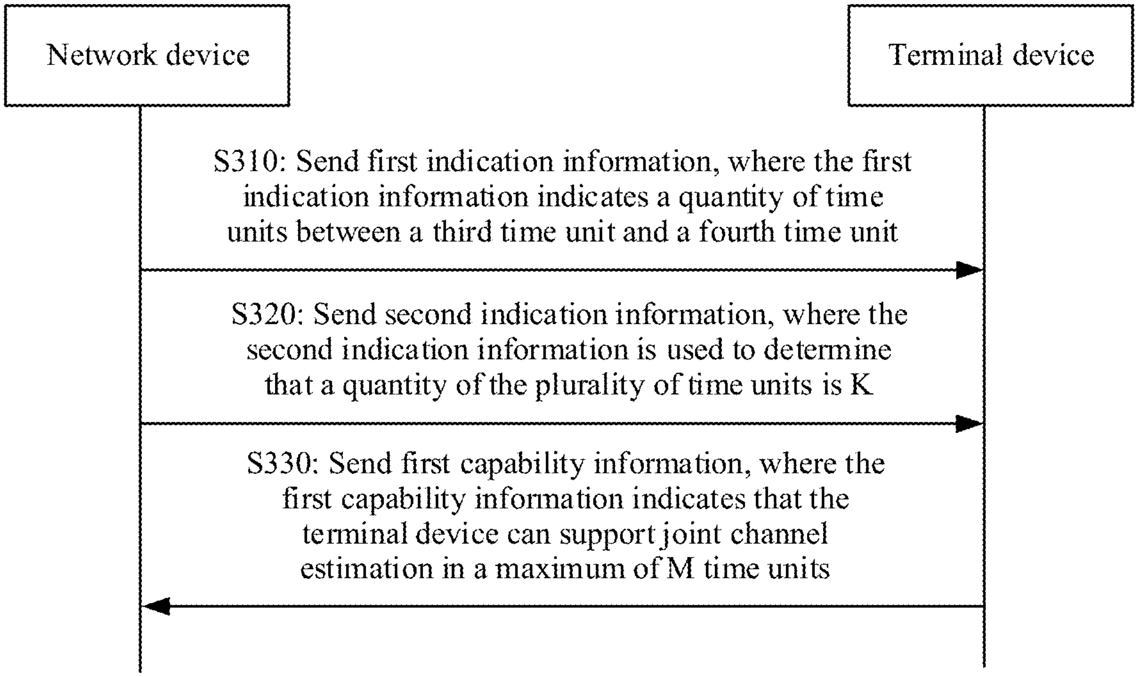
FIG. 3 is another schematic diagram of a communication process according to an embodiment of this application.

The foregoing briefly describes a scheduling method of the phase continuity or a limiting condition of joint channel estimation. With reference to FIG. 3, the following describes in detail a technical solution for flexibly and jointly configuring a quantity of DMRSs in the K time units according to an embodiment of this application.

S310: The network device sends first indication information to the terminal device. The first indication information indicates a quantity of time units between a third time unit and a fourth time unit, the third time unit belongs to a plurality of time units, and the fourth time unit is a time unit in the plurality of time units that has a same quantity of configured demodulation reference signals DMRSs as the third time unit and that is closest to the third time unit. At least one fifth time unit is included between the third time unit and the fourth time unit, and a quantity of DMRSs configured in the fifth time unit is less than the quantity of DMRSs configured in the third time unit.

It should be understood that the quantity of configured DMRSs mentioned in this embodiment of this application is a quantity of DMRSs, and is different from a quantity of time domain symbols occupied by a DMRS. Details are not described below.

For example, if a value of the first indication information is 2, it indicates that an interval between the third time unit and the fourth time unit is two time units, that i s, in this case, there are two fifth time units. DMRS configuration is performed in the third time unit and the fourth time unit based on a value pos3 of dmrs-Additional Position. There may be the following three DMRS configuration manners in the two fifth time units:

Manner 1: No DMRS is configured. That is, neither a front-loaded DMRS nor an additional DMRS is configured.

Manner 2: Only one DMRS is configured, where the DMRS is a front-loaded DMRS. That is, in this case, no additional DMRS is configured.

Manner 3: Two DMRSs are configured. That is, one front-loaded DMRS and one additional DMRS are configured.

For example, a total quantity of front-loaded DMRSs and additional DMRSs in each of the third time unit and the fourth time unit is 4, and a total quantity of DMRSs in the two fifth time units is less than or equal to 2, and is less than a quantity of DMRSs configured in the third time unit and a quantity of DMRSs configured in the fourth time unit. The quantity of DMRSs configured in the fifth time unit may be predefined or indicated by the network device by using independent signaling. An indication manner of the quantity of DMRSs configured in the fifth time unit and a carrying position of indication information of the quantity of DMRSs configured in the fifth time unit are not specifically limited in this embodiment of this application.

S320: The network device sends second indication information to the terminal device, where the second indication information is used to determine that a quantity of the plurality of time units is K.

It should be understood that the second indication information indicates a quantity of time units in which a quantity of DMRSs is jointly configured.

The quantity of time units in which the quantity of DMRSs is jointly configured may be determined in the following manners.

Manner 1: When data blocks transmitted in all of the plurality of time units are not completely the same, not completely the same may be understood as that data blocks transmitted in the plurality of time units are different from each other, or may be understood as that some data blocks transmitted in the plurality of time units are the same, and the other data blocks transmitted in the plurality of time units are different. The quantity of time units in which the quantity of DMRSs is jointly configured may be determined based on a value of the second indication information, or the quantity of time units in which DMRSs are jointly configured is determined based on an index value corresponding to a value of the second indication information. For example, if the value of the second indication information is 4, or the index value corresponding to the value of the second indication information is 4, it indicates that the terminal device determines joint configuration of a quantity of DMRSs in four time units.

Manner 2: When a same data block is transmitted in the plurality of time units, a quantity of times of repeated transmission of the transport block is used to determine the quantity of the plurality of time units.

It should be understood that, when the same data block is transmitted in the plurality of time units, the second indication information may or may not be sent. If the second indication information is sent, the second indication information indicates whether the function of joint channel estimation is enabled. During repeated transmission, when the second indication information indicates that joint channel estimation is enabled, a quantity of time units in which DMRSs need to be jointly configured is equal to the configured quantity of times of repeated transmission, and the quantity of times of repeated transmission is configured by using RRC signaling. For example, the second indication information may have two values. A first value of the second indication information indicates that the terminal device enables joint channel estimation in a plurality of time units, and a second value indicates that the terminal device disables joint channel estimation in a plurality of time units.

It should be understood that, alternatively, it may be determined, by using an index value corresponding to the second indication information, whether to enable joint channel estimation. A correspondence between the value of the second indication information and whether joint channel estimation is enabled is merely used as an example. A determining manner and the correspondence are not specifically limited in this embodiment of this application.

A relationship between the quantity of time units between the third time unit and the fourth time unit indicated by the first indication information and the quantity of the plurality of time units determined by the second indication information may have the following several cases.

Case 1: The quantity of time units between the third time unit and the fourth time unit indicated by using the first indication information is equal to the quantity of the plurality of time units determined by using the second indication information minus 2. In this case, DMRSs in the K time units are configured in a dense-sparse-dense manner:

In other words, the third time unit and the fourth time unit are head and tail time units in the K time units determined by using the second indication information. In this case, a large quantity of DMRS are configured in the third time unit and the fourth time unit, and a small quantity of DMRSs are configured in the fifth time unit between the third time unit and the fourth time unit. The DMRS in the fifth time unit may be configured in the foregoing several manners. Details are not described herein. To be specific, it is ensured that the quantity of DMRSs in the fifth time unit is less than the quantity of DMRSs configured in the third time unit and the quantity of DMRSs configured in the fourth time unit.

For example, if the quantity of time units between the third time unit and the fourth time unit indicated by the first indication information is 4, and the quantity of the plurality of time units indicated by the second indication information is 6, for time units #1 to #6, a large quantity of DMRSs are configured in the time units #1 and #6. For example, DMRSs may be configured based on a configured value Pos3 of a quantity of additional DMRSs. However, a small quantity of DMRSs are configured in the middle four time units, namely, in the time units #2 to #5.

Case 2: The quantity of time units between the third time unit and the fourth time unit indicated by using the first indication information is greater than the quantity of the plurality of time units determined by using the second indication information minus 2. In this case, DMRSs in the K time units are configured in a dense-to-sparse manner.

In other words, the third time unit is a head time unit in the K time units determined by using the second indication information. The fourth time unit is not in the K time units.

In this case, a large quantity of time units are configured in the third time unit, and a small quantity of DMRSs are configured in another time unit. The DMRS in the time unit between the third time unit and the fourth time unit may be configured in the foregoing several manners. Details are not described herein. To be specific, it is ensured that the quantity of DMRSs in the time unit between the third time unit and the fourth time unit is less than the quantity of DMRSs configured in the third time unit.

For example, if the quantity of time units between the third time unit and the fourth time unit indicated by the first indication information is 5, and the quantity of the plurality of time units indicated by the second indication information is 6, for time units #1 to #6, a large quantity of DMRSs are configured in the time unit #1. For example, DMRSs may be configured based on a configured value Pos3 of a quantity of additional DMRSs. However, a small quantity of DMRSs are configured in the subsequent five time units, namely, in the time units #2 to #6.

In addition, for example, one time unit is one slot. When a small quantity of DMRSs are configured in slots #2 to #6, more DMRSs or even more than four DMRSs may be configured in the slot 1. That is, a quantity of additional DMRSs configured in the slot 1 may exceed 3, provided that total overheads of DMRSs in the six slots are not excessively large. It may be understood that all DMRSs that can be configured in the slots #2 to #6 are uniformly configured in the slot 1. Therefore, after the terminal device or the network device receives the DMRSs in the slot 1, a plurality of DMRSs centralized in one slot can be used to perform quick and accurate channel estimation. This reduces a delay, and improves efficiency of demodulating data at a receive end.

Case 3: The quantity of time units between the third time unit and the fourth time unit indicated by the first indication information is less than the quantity of the plurality of time units determined by using the second indication information minus 2.

In other words, the third time unit and the fourth time unit are any two time units in the K time units determined by using the second indication information. In this case, a large quantity of time units are configured in the third time unit and the fourth time unit, and a small quantity of DMRSs are configured in another time unit. The DMRS in the time unit between the third time unit and the fourth time unit may be configured in the foregoing several manners. Details are not described herein. To be specific, it is ensured that the quantity of DMRSs in the time unit between the third time unit and the fourth time unit is less than the quantity of DMRSs configured in the third time unit and the quantity of DMRSs configured in the fourth time unit.

For example, if the quantity of time units between the third time unit and the fourth time unit indicated by the first indication information is 2, and the quantity of the plurality of time units indicated by the second indication information is 6, for time units #1 to #6, a large quantity of DMRSs are configured in the time units #1 and #4. For example, DMRSs may be configured based on a configured value Pos3 of a quantity of additional DMRSs. However, a small quantity of DMRSs are configured in the other four time units, namely, in the time units #2, #3, and #5 and #6.

The following uses an example in which one time unit is one slot. FIG. 3 shows several cases in which a quantity of additional DMRSs in four slots is configured according to an embodiment of this application.

As shown in Table 2, it is assumed that a quantity 1d of time domain symbols scheduled for each time of PUSCH or PDSCH transmission is 14, a parameter dmrs-Additional Position configured in RRC signaling is Pos2, max Length=len1, and PUSCH transmission is performed in a type A manner. In this case, a maximum of two additional DMRSs may be configured in each time unit based on a mapping relationship specified in a current protocol. A time domain symbol occupied by a front-loaded DMRS is $l_0$, time domain symbols occupied by two additional DMRSs are 7 and 11, and each DMRS occupies one time domain symbol.

TABLE 2

| PUSCH single-symbol DMRS position 1 | | | | | | | | |
|---|---|---|---|---|---|---|---|---|
| | DMRS positions | | | | | | | |
| ld in | PUSCH mapping type A dmrs-Additional Position | | | | PUSCH mapping type B dmrs-Additional Position | | | |
| symbols | 0 | 1 | 2 | 3 | 0 | 1 | 2 | 3 |
| <4 | — | — | — | — | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, 4 | $l_0$, 4 | $l_0$, 4 |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, 7 | $l_0$, 7 | $l_0$, 7 | $l_0$ | $l_0$, 6 | $l_0$, 3, 6 | $l_0$, 3, 6 |
| 9 | $l_0$ | $l_0$, 7 | $l_0$, 7 | $l_0$, 7 | $l_0$ | $l_0$, 6 | $l_0$, 3, 6 | $l_0$, 3, 6 |
| 10 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 11 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 12 | $l_0$ | $l_0$, 9 | $l_0$, 6, 9 | $l_0$, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |

In this case, the quantity of time units determined by using the second indication information configured by the network device is 4, it indicates that the terminal device jointly configures additional DMRSs in four time units, namely, in four slots.

Figure 4:
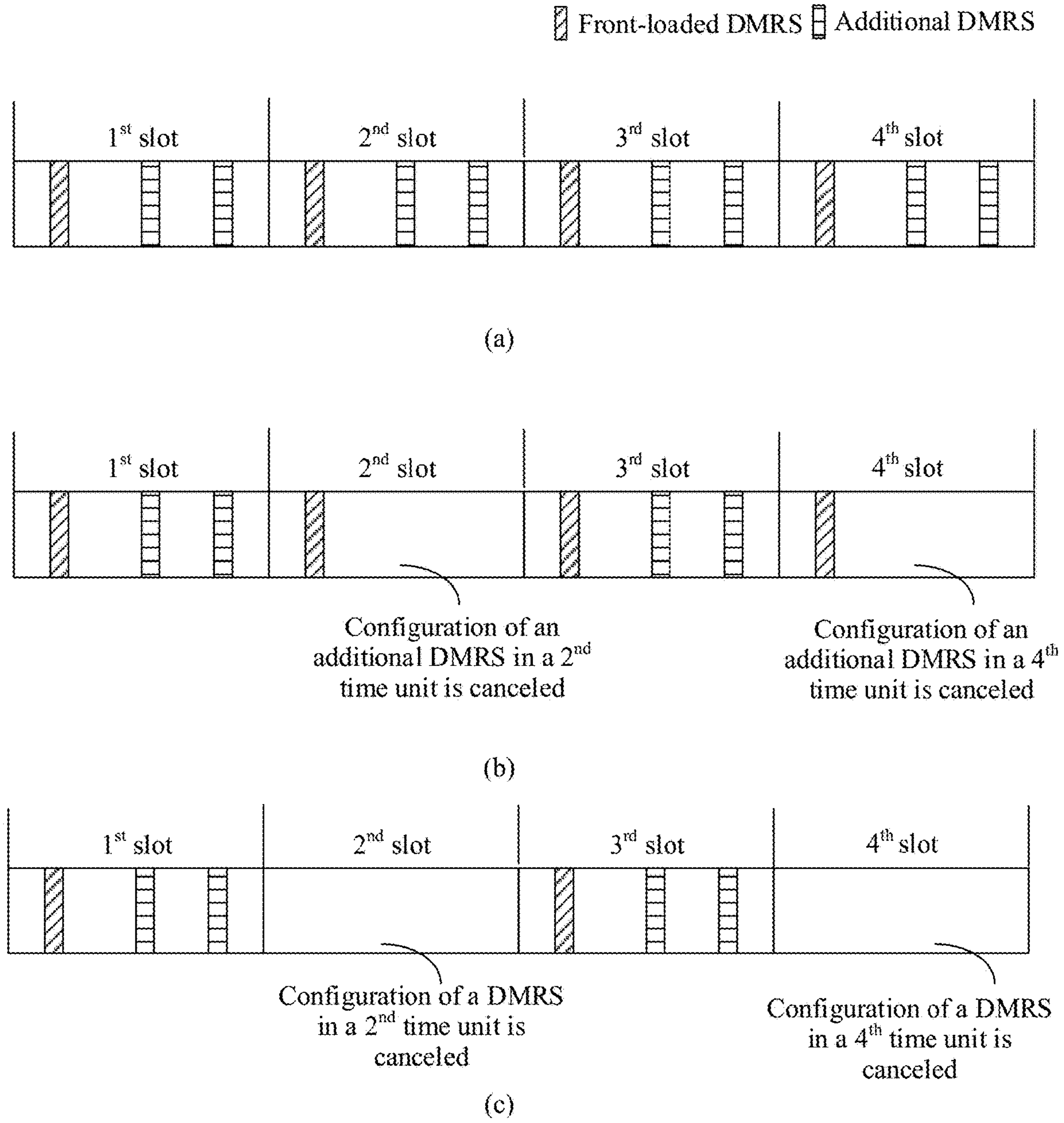
FIG. 4 is a schematic diagram of a resource pattern of a DMRS according to an embodiment of this application.

As shown in (a) in FIG. 4, RRC signaling indicates the terminal to use same DMRS configuration information in the K time units, a DMRS is configured in each of the four slots, and a same quantity of additional DMRSs is configured in the four slots.

It is assumed that the first indication information indicates that a DMRS is configured an interval of one time unit, that is, a quantity of time intervals between slots in which a same quantity of DMRSs are configured is 1. As shown in (b) in FIG. 4, configuration of additional DMRSs in a $2^{nd}$ slot and a $4^{th}$ slot is canceled, and only front-loaded DMRSs are configured in the $2^{nd}$ slot and the $4^{th}$ slot.

In this case, if the first indication information indicates that a DMRS is configured an interval of one time unit, that is, a quantity of time intervals between slots in which a same quantity of DMRSs are configured is 1. In this case, there is still another configuration manner. As shown in (c) in FIG. 4, configuration of all DMRSs in a $2^{nd}$ slot and a $4^{th}$ slot is canceled, that is, neither front-loaded DMRSs nor additional DMRSs are configured in the $2^{nd}$ slot and the $4^{th}$ slot.

It should be understood that a minimum DMRS configuration density is used in an interval time unit, that is, there is also a case in which a front-loaded DMRS is only configured in the $2^{nd}$ slot, and neither a front-loaded DMRS nor an additional DMRS is configured in the 4th slot. A specific configuration manner to be used may be predefined, or may be determined by using additional indication information. This embodiment of this application does not specifically limit determining of the configuration manner.

S330: Optionally, before the terminal device receives data in the plurality of time units, the terminal device reports first capability information to the network device. The first capability information indicates that the terminal device can support joint channel estimation in a maximum of M time units, and M is a positive integer greater than or equal to 2.

It should be understood that the quantity of time units in which joint channel estimation can be supported by the terminal device is limited, and depends on a capability of the terminal device. Before the network device indicates the quantity of time units for joint channel estimation to the terminal device, the terminal device actively reports capability information of the terminal device to the network device. For example, the terminal device configures a parameter by using RRC signaling. A value of the parameter is 4, it indicates that the terminal device can support joint channel estimation in a maximum of four slots, or may indicate that the terminal device can support joint channel estimation in a maximum of four sub-slots. This is not specifically limited in this embodiment of this application.

Optionally, K is less than or equal to M.

It should be understood that the terminal device does not expect that the quantity of time units for joint channel estimation indicated in the indication information delivered by the network device is equal to the quantity of time units in which joint channel estimation can be supported by the terminal device. For example, when a same data block is transmitted in the plurality of time units, the network device determines the quantity of time units for joint channel estimation by configuring a quantity of times of repeated transmission of the data block. In this case, the determined quantity of time units may be different from the quantity of time units in which joint channel estimation can be supported by the terminal device. Alternatively, when data blocks transmitted in the plurality of time units are not completely the same, the quantity of time units determined by the network device by sending the second indication information may be different from the quantity of time units in which joint channel estimation can be supported by the terminal device.

It should be understood that, when the quantity of time units for joint channel estimation indicated by the network device is less than or equal to the quantity of time units in which joint channel estimation can be supported by the terminal device, the quantity of time units for joint channel estimation should be subject to the quantity of time units for joint channel estimation indicated by the network device. When the quantity of time units for joint channel estimation indicated by the network device is greater than the quantity of time units in which joint channel estimation can be supported by the terminal device, the quantity of time units for joint channel estimation should be subject to the quantity of time units in which joint channel estimation can be supported by the terminal device.

Specifically, when the quantity of time units for joint channel estimation indicated by the network device is greater than the quantity of time units in which joint channel estimation can be supported by the terminal device, for example, the quantity of time units for joint channel estimation indicated by the network device is eight slots, and the quantity of time units in which joint channel estimation can be supported by the terminal device is four slots, the terminal device performs an operation related to joint channel estimation in the following two manners:

Manner 1: The terminal device performs "interruption" processing on joint channel estimation of eight slots. To be specific, the terminal device first performs an operation of joint channel estimation in slots #1 to #4, and then performs an operation of joint channel estimation in slots #5 to #8. For example, the terminal device receives downlink data. The terminal device performs joint channel estimation by using DMRSs configured in the slots #1 to #4, completes demodulation of data received in the slots #1 to #4 based on an estimated channel, then performs joint channel estimation by using DMRSs configured in the slots #5 to #8, and completes demodulation of data received in the slots #5 to #8 based on an estimated channel.

Manner 2: The terminal device performs "sliding" processing on joint channel estimation of eight slots. To be specific, the terminal device first performs an operation of joint channel estimation in slots #1 to #4. DMRS information stored in the slot #1 is deleted while DMRS information is stored in a slot #5, and DMRS information stored in the slot #1 is deleted, and the terminal device performs an operation of joint channel estimation in four slots, namely, the slots #5, #2, #3, and #4. Then, DMRS information stored in the slot 2 is deleted while DMRS information is stored in a slot #6, and the terminal device performs an operation of joint channel estimation in four slots, namely, the slots #5, #6, #3, and #4. The rest can be deduced by analogy.

A joint channel estimation manner used by the terminal device may be predefined, or may be indicated by using additional indication information, or may be another method other than the foregoing two manners. This is not specifically limited in this embodiment of this application. A carrying position of the indication information is not specifically limited.

In this case, the terminal device may determine, based on the indication information, that a value of the quantity of time units for joint channel estimation, that is, jointly configuration of a quantity of DMRSs, is K, or may determine an interval between time units in which a large quantity of DMRSs are configured.

Optionally, the first indication information and the second indication information may be carried in radio resource control RRC signaling, and a carrying position of the first indication information or the second indication information is not specifically limited in this embodiment.

Optionally, when only one front-loaded DMRS is configured in a $j^{th}$ time unit in the K time units, a start time domain symbol occupied by the front-loaded DMRS is a middle time domain symbol in the $j^{th}$ time unit. The $j^{th}$ time unit is any time unit other than the head time unit and the tail time unit in the K time units, where j is a positive integer greater than or equal to 1 and less than or equal to K.

It should be understood that the "middle" time domain symbol refers to any possible time domain symbol in a middle third of a time unit. This embodiment of this application does not limit the "middle" time domain symbol as a middlemost time domain symbol.

For example, if the $j^{th}$ time unit includes m time domain symbols, a start time domain symbol occupied by the front-loaded DMRS is an $(m/2)^{th}$ time domain symbol in the $j^{th}$ time unit. When a calculation result of m/2 is not an integer, rounding up or rounding down may be performed. A rounding manner may be predefined or determined by using additional indication information. This is not specifically limited in this embodiment of this application.

For example, one time unit is one time of data block transmission on a PUSCH. The PUSCH currently scheduled by the network device occupies 14 time domain symbols, that is, a quantity of time domain symbols occupied by the $j^{th}$ time unit is 14. In this case, the start time domain symbol occupied by the front-loaded DMRS may be a $7^{th}$ time domain symbol, or may be a $6^{th}$ time domain symbol or an $8^{th}$ time domain symbol. In other words, it is ensured that the start time domain symbol occupied by the front-loaded DMRS is a middle time domain symbol. A position of the middle time domain symbol is not specifically limited in this embodiment of this application.

Optionally, the start time domain symbol occupied by the front-loaded DMRS is configured by using the RRC signaling. The network device sends additional indication information to the terminal device, where the information is used to determine the start time domain symbol occupied by the front-loaded DMRS.

It should be understood that the start time domain symbol occupied by the front-loaded DMRS may also be predefined. In this case, no additional indication information is required.

Optionally, the time unit mentioned in this embodiment of this application may be a slot or a sub-slot, or may be a time domain resource occupied by one time of data block transmission. A meaning of the time unit is not specifically limited in this embodiment of this application.

When the terminal devices jointly estimate channel quality of a PDSCH, after the terminal receives the indication information, the terminal device demodulates, based on a DMRS in each of the K time units, the downlink data sent by the network device.

When the network device jointly estimates the channel quality of the PUSCH, after receiving the indication information, when sending uplink data in each of the K time units, the terminal device configures the DMRS in a manner determined by the indication information, and the network device demodulates the uplink data sent by the terminal device.

It should be understood that the descriptions in S310, S320, and S330 in this embodiment of this application does not indicate a time sequence of steps, but are only used to distinguish different steps by numbering.

It should be understood that the indication information may further indicate joint configuration of the total quantity of DMRSs in the K time units, and the total quantity of DMRSs is a sum of a quantity of front-loaded DMRSs and a quantity of additional DMRSs. The indication information may indicate joint configuration of a variation of the quantity of additional DMRSs in the K time units. The variation of the quantity of additional DMRSs is based on a value of a dmrs-Additional Position field configured in the RRC signaling. The indication information may further indicate a variation of the total quantity of DMRSs in the K time units, or may further indicate the quantity of front-loaded DMRSs, or a variation of the front-loaded DMRS, or the like. This embodiment of this application does not specifically limit a type of information about a quantity of DMRSs that can be indicated by the RRC signaling.

The foregoing describes in detail the solution for flexibly and jointly configuring the quantity of DMRSs in the K time units by using higher layer signaling provided in this application. After the foregoing steps, the network device or the terminal device may determine joint configuration of the quantity of DMRSs in the K time units by using the foregoing indication information, to improve spectral efficiency of a system, so as to properly allocate DMRS overheads.

Figure 5:
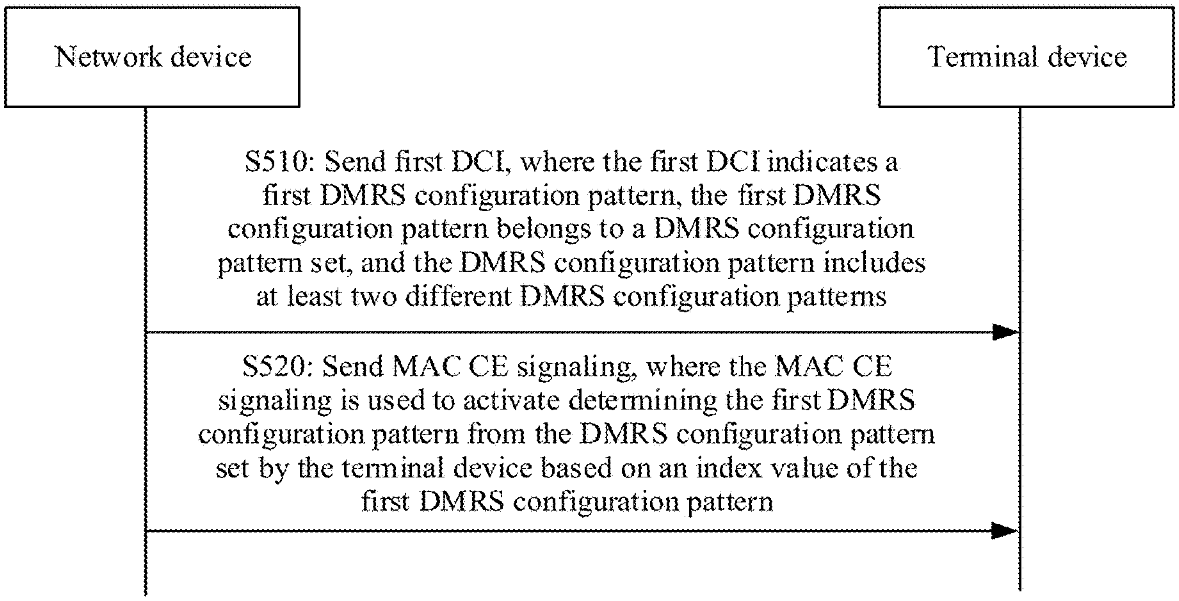
FIG. 5 is another schematic diagram of a communication process according to an embodiment of this application.

With reference to FIG. 5, the following describes in detail a technical solution for flexibly and jointly configuring a quantity of DMRSs in the K time units according to another embodiment of this application.

S510: The network device sends first downlink control information DCI to the terminal device. The first DCI indicates a first DMRS configuration pattern, the first DMRS configuration pattern belongs to a DMRS configuration pattern set, the first DMRS pattern indicates the quantity of DMRSs configured in the K time units, and quantities of DMRSs configured in at least two of the K time units are different, where K is a positive integer greater than or equal to 2.

A value of K may be determined in the following several cases.

Case 1: The value of K is specified in a protocol. For example, in a future protocol, in a period of time or several time units that are scheduled by the network device, a quantity of time units corresponding to each DMRS configuration pattern is K.

Case 2: The value of K is indicated by the network device by using additional indication information. To be specific, the network device indicates the first DMRS configuration pattern by using the first DCI, and then notifies, by using the additional indication information, the terminal device of a quantity of time units corresponding to the first DMRS configuration pattern. A value of or an index value corresponding to the indication information is used to determine the value of K. The indication information may be located in RRC signaling or DCI. An indication manner and a carrying position of the indication information are not specifically limited in this embodiment of this application.

Optionally, when a same transport block is transmitted in a plurality of time units, the additional indication information is used to determine a quantity of times of repeated transmission of the data block.

It should be understood that the indication information indicates whether a function of joint channel estimation is enabled. During repeated transmission, when the indication information indicates that joint channel estimation is enabled, a quantity of time units in which DMRSs need to be jointly configured is equal to the configured quantity of times of repeated transmission, and the quantity of times of repeated transmission is configured by using the RRC signaling. For example, the indication information may have two values. A first value of the second indication information indicates that the terminal device enables joint channel estimation in the plurality of time units, and a second value indicates that the terminal device disables joint channel estimation in the plurality of time units.

It should be further understood that whether to enable joint channel estimation may alternatively be determined by using the index value corresponding to the indication information. A correspondence between the value of the indication information and whether joint channel estimation is enabled is merely used as an example. A determining manner and the correspondence are not specifically limited in this embodiment of this application.

Optionally, when transport blocks that are not completely the same are transmitted in a plurality of time units, the indication information is used to determine a quantity of different data blocks in the K time units. It should be understood that the transport blocks that are not completely the same may be understood as data blocks transmitted in all of the K time units are different from each other, or some of the data blocks transmitted in the K time units are the same, and some of the data blocks transmitted in the K time units different.

Case 3: The value of K is determined based on a quantity of pieces of value content in the first DMRS configuration pattern. To be specific, the terminal device may determine, based on the first DMRS configuration pattern indexed by the first DCI, a corresponding quantity of dmrs-Additional Position parameters in the first DMRS pattern, and each dmrs-Additional Position parameter corresponds to one time unit. For example, when the value content in the first DMRS configuration pattern is {Pos2, Pos0, Pos2, Pos0}, that is, includes four values, the first DMRS configuration pattern implicitly indicates performing joint DMRS configuration in K=4 time units. That is, a maximum of 2, 0, 2, and 0 additional DMRSs can be configured in a 1st to 4th time units respectively.

For example, if the DMRS configuration pattern set includes the following three types of DMRS configuration patterns:

Type 1: A configuration parameter dmrs-Additional Position of the RRC signaling is Pos2.

Type 2: A configuration parameter dmrs-Additional Position of the RRC signaling is Pos2-Pos0 . . . -Pos0.

Type 3: A configuration parameter dmrs-Additional Position of the RRC signaling is Pos2-Pos0- . . . -Pos0-Pos2.

When a first DMRS indicated and indexed by the terminal device by using the first DCI is a first pattern, with reference to the predefined value of K, or the value of K indicated by the network device by using the additional indication information, or the value of K determined based on the quantity of pieces of value content in the first DMRS configuration pattern, the terminal device finally determines that a quantity of additional DMRSs is uniformly configured in each of the K time units.

When a first DMRS indicated and indexed by the terminal device by using the first DCI is a second pattern, with reference to the predefined value of K, or the value of K indicated by the network device by using the fourth indication information, or the value of K determined based on the quantity of pieces of value content in the first DMRS configuration pattern, the terminal device finally determines that a large quantity of DMRSs are configured in a 1st time unit of the K time units, and a small quantity of DMRSs are configured in a subsequent time unit, namely, a DMRS configuration pattern of a "dense-to-sparse" type.

When a first DMRS indicated and indexed by the terminal device by using the first DCI is a first pattern, with reference to the predefined value of K, or the value of K indicated by the network device by using the fourth indication information, or the value of K determined based on the quantity of pieces of value content in the first DMRS configuration pattern, the terminal device finally determines that a large quantity of DMRSs are configured in a head time unit and a tail time unit of the K time units, and a small quantity of DMRSs are configured in a middle time unit, namely, a DMRS configuration pattern of a "dense-sparse-dense" type.

It should be understood that the foregoing three types of the DMRS configuration pattern are merely used as examples, and the type of the DMRS configuration pattern is not specifically limited in this embodiment of this application.

In this case, it should be understood that the terminal device does not expect that the value of K determined by the first DMRS indicated by the first DCI is equal to the predefined value of K or the value of K indicated by the network device by using the additional indication information.

It should be understood that the DMRS configuration pattern set includes at least two different DMRS configuration patterns.

Assuming that the DMRS configuration pattern set includes L DMRS configuration patterns, where L is a positive integer greater than or equal to 2, distribution of the L DMRS configuration patterns may be as follows:

Optionally, the L DMRS configuration patterns include L DMRS configuration patterns in $K_1$ time units, that is, there may be L DMRS configuration patterns in $L_1$ time units.

Optionally, the L DMRS configuration patterns include $L_1$ DMRS configuration patterns in $K_1$ time units, $L_2$ DMRS patterns in $K_2$ time units, . . . , and $L_n$ DMRS patterns in $K_n$ time units, where $L_1+L_2+ \ldots +L_n=L$, and $K_1, K_2, \ldots K_n$ are not equal to each other.

It should be understood that the DMRS configuration pattern set may be a configuration set of a quantity of DMRSs. For example, the first DCI may be used to index a configuration solution of a quantity of additional DMRSs in the K time units, or the first DCI may be used to index a configuration solution of a variation of a quantity of additional DMRSs in the K time units, or a configuration solution of a total quantity of DMRSs in the K time units, or a configuration solution of a variation of a total quantity of DMRSs in the K time units, or a configuration solution of a quantity of front-loaded DMRSs, or a configuration solution of a variation in a front-loaded DMRS, or the like. Content that can be indexed by using the first DCI is not specifically limited in this embodiment of this application.

The following uses a case in which one time unit is one slot and an additional DMRS quantity configuration pattern in each slot as examples to describe in detail a case in which the RRC signaling includes a plurality of different configuration patterns of a quantity of additional DMRSs in this embodiment of this application.

Case 1:

When a configuration parameter max Length of the RRC signaling is len1, that is, a possible value of a quantity of additional DMRSs in one slot is {0, 1, 2, 3}, in this case, if a configuration parameter dmrs-Additional Position-multiSlot of the RRC signaling is {Pos s1, Pos s2, . . . , Pos sK}, a possible value of a quantity of additional DMRSs in each of the K slots is {0, 1, 2, 3}, and the RRC signaling may include 4^K different configuration solutions of the quantity of additional DMRSs.

For example, when K=2, that is, dmrs-Additional Position-multiSlot={Pos s1, Pos s2}, if a possible value of a quantity of additional DMRSs in one slot is {0, 1, 2, 3}, and a possible value of a quantity of additional DMRSs in another slot is {0, 1, 2. 3}, two slots may have a maximum of 4^2, namely, 16, configuration solutions.

When K=4, that is, dmrs-Additional Position-multiSlot={Pos s1, Pos s2, Pos s3, Pos s3}, four slots may have a maximum of 4^4, namely, 256, configuration solutions.

When K=8, that is, dmrs-Additional Position-multiSlot={Pos s1, Pos s2, Pos s3, Pos s3, Pos s5, Pos s6, Pos s7, Pos s8}, eight slots may have a maximum of 4^8, namely, 65536, configuration solutions.

In addition, in addition to the foregoing configuration solutions, a configuration solution may be further included: In any one or more of the K slots, a quantity of DMRSs in the one or more slots is another value other than a value {0, 1, 2, 3} of a quantity of additional DMRSs. That is, neither a front-loaded DMRS nor an additional DMRS is configured.

A configuration solution set of the quantity of additional DMRSs configured by using the RRC signaling may include the foregoing combinations.

Case 2:

When a configuration parameter max Length of the RRC signaling is len2, that is, a possible value of a quantity of additional DMRSs in one slot is {0, 1}, in this case, if a configuration parameter dmrs-Additional Position-multiSlot of the RRC signaling is {Pos s1, Pos s2, . . . , Pos sK}, a possible value of a quantity of additional DMRSs in each of the K slots is {0, 1}, and the RRC signaling may include 2^K different configuration solutions of the quantity of additional DMRSs.

When a configuration parameter max Length of the RRC signaling is Len1, that is, a possible value of a quantity of additional DMRSs in one slot is {0, 1, 2, 3}, in this case, if a configuration parameter dmrs-Additional Position-multiSlot of the RRC signaling is {Pos s1, Pos s2, . . . , Pos sK}, a possible value of a quantity of additional DMRSs in each of the K slots is {0, 1, 2, 3}, and the RRC signaling may include 2^K different configuration solutions of the quantity of additional DMRSs.

For example, when K=2, that is, dmrs-Additional Position-multiSlot={Pos s1, Pos s2}, if a possible value of a quantity of additional DMRSs in one slot is {0, 1}, and a possible value of a quantity of additional DMRSs in another slot is {0, 1}, two slots may have a maximum of 2^2, namely, 4, configuration solutions.

When K=4, that is, dmrs-Additional Position-multiSlot={Pos s1, Pos s2, Pos s3, Pos s3}, four slots may have a maximum of 2^4, namely, 16, configuration solutions.

When K=8, that is, dmrs-Additional Position-multiSlot={Pos s1, Pos s2, Pos s3, Pos s3, Pos s5, Pos s6, Pos s7, Pos s8}, eight slots may have a maximum of 2^8 configuration solutions.

In addition, in addition to the foregoing configuration solutions, a configuration solution may be further included: In any one or more of the K slots, a quantity of DMRSs in the one or more slots is another value other than a value {0, 1} of a quantity of additional DMRSs. That is, neither a front-loaded DMRS nor an additional DMRS is configured.

The plurality of configuration solutions of additional DMRSs configured by using the RRC signaling may include the foregoing combinations.

Optionally, in the L configuration solutions of the quantity of additional DMRSs, max Length can have only one value. To be specific, quantities of time domain symbols occupied by front-loaded DMRSs in all slots in the L configuration solutions are the same. Certainly, in the L configuration solutions of the quantity of additional DMRSs, max Length may have two values. To be specific, in each configuration solution, quantities of time domain symbols occupied by front-loaded DMRSs in the K slots are different. A value of max Length is not specifically limited in this embodiment of this application.

Optionally, the DMRS configuration pattern set is configured by using the RRC signaling. In this case, the network device needs to send the RRC signaling to the terminal device.

Optionally, the DMRS configuration pattern set is a predefined configuration pattern set. For example, before the network device and the terminal device are used, a plurality of configuration solution sets of the quantity of additional DMRSs predefined by the network device are embedded in the terminal device. In this case, the network device may not send the RRC signaling to the terminal device. This reduces signaling overheads on the network device side.

S520: The first DCI indicates an index value of the first DMRS configuration pattern. The network device sends MAC CE signaling to the terminal device, where the MAC CE signaling is used to activate determining the first DMRS configuration pattern from the DMRS configuration pattern set by the terminal device based on the index value of the first DCI.

It should be understood that if the network device does not send trigger signaling, namely, the MAC CE signaling, to the terminal device, that is, there is no MAC CE signaling to activate determining the first DMRS pattern by the terminal device based on the first DCI, the terminal device still configures a DMRS in each time unit based on the values of the parameters such as dmrs-Additional Position and max Length that are configured by using the RRC signaling, and performs uplink sending or downlink receiving.

For example, the terminal device may index a DMRS configuration pattern based on a value of a bit included in the first DCI. Table 3 provides a correspondence between a value of 5 bits of the first DCI and the quantity of additional DMRSs in the K slots when the first DCI includes the 5 bits and a value of max Length is len1.

TABLE 3

Correspondence between the first DCI and the quantity of DMRSs in the K slots

| Index values of 5 bits | Front-loaded DMRS | Candidate values of additional DMRSs Dmrs-Additional Position | Quantity of slots |
|---|---|---|---|
| 00000 | {1, 0} | {Pos0, Pos0} | K = 2 |
| 00001 | {1, 1} | {Pos1, Pos0} | K = 2 |
| 00010 | {1, 1} | {Pos2, Pos0} | K = 2 |
| 00011 | {1, 1} | {Pos3, Pos0} | K = 2 |
| 00100 | {1, 1} | {Pos3, Pos1} | K = 2 |
| 00101 | {1, 0, 0} | {Pos0, Pos0, Pos0} | K = 3 |
| 00110 | {1, 0, 1} | {Pos0, Pos0, Pos0} | K = 3 |
| 01000 | {1, 0, 1} | {Pos1, Pos0, Pos0} | K = 3 |
| 01001 | {1, 0, 1} | {Pos1, Pos0, Pos1} | K = 3 |
| 01010 | {1, 1, 1} | {Pos1, Pos0, Pos0} | K = 3 |
| 01011 | {1, 1, 1} | {Pos1, Pos0, Pos1} | K = 3 |
| 01100 | {1, 1, 1} | {Pos2, Pos0, Pos1} | K = 3 |
| 01101 | {1, 1, 1} | {Pos3, Pos0, Pos1} | K = 3 |
| 01110 | {1, 0, 1, 0} | {Pos0, Pos0, Pos0, Pos0} | K = 4 |
| 01111 | {1, 0, 0, 0} | {Pos0, Pos0, Pos0, Pos0} | K = 4 |
| 10000 | {1, 1, 1, 1} | {Pos0, Pos0, Pos0, Pos0} | K = 4 |
| 10001 | {1, 1, 1, 1} | {Pos1, Pos0, Pos0, Pos0} | K = 4 |
| 10010 | {1, 1, 1, 1} | {Pos1, Pos0, Pos1, Pos0} | K = 4 |
| 10011 | {1, 1, 1, 1} | {Pos1, Pos0, Pos0, Pos1} | K = 4 |
| 10100 | {1, 1, 1, 1} | {Pos2, Pos0, Pos1, Pos0} | K = 4 |
| 10101 | {1, 1, 1, 1} | {Pos3, Pos0, Pos0, Pos1} | K = 4 |
| . . . | . . . | . . . | . . . |

It can be learned from Table 3 that, for example, when the value of the 5 bits in the first DCI is 00000, in a DMRS quantity configuration pattern corresponding to an index value of the 5 bits, two values of dmrs-Additional Position are configured in the RRC signaling. That is, the configuration pattern indicated by the first DCI currently is joint configuration in two slots, a quantity of front-loaded DMRSs in a $1^{st}$ slot is 1, a quantity of additional DMRSs in the $1^{st}$ slot is 0, a quantity of front-loaded DMRSs in a $2^{nd}$ slot is 0, and a quantity of additional DMRSs in the $2^{nd}$ slot is also 0.

When the value of the 5 bits in the first DCI is 01011, in a DMRS quantity configuration pattern corresponding to an index value of the first DCI, three values of dmrs-Additional Position are configured in the RRC signaling. That is, the configuration pattern indicated by the first DCI currently is joint configuration in three slots, a quantity of front-loaded DMRSs in a $1^{st}$ slot is 1, a quantity of additional DMRSs in the $1^{st}$ slot is 1, a quantity of front-loaded DMRSs in a $2^{nd}$ slot is 1, a quantity of additional DMRSs in the $2^{nd}$ slot is 0, a quantity of front-loaded DMRSs in a $3^{rd}$ slot is 1, and a quantity of additional DMRSs in the $3^{rd}$ slot is 0.

Similarly, Table 4 provides a correspondence between a value of 5 bits of the first DCI and the quantity of additional DMRSs in the K slots when the first DCI includes the 5 bits and a value of max Length is len2.

TABLE 4

Correspondence between the first DCI and the quantity of DMRSs in the K slots

| Index values of 5 bits | Front-loaded DMRS | Candidate values of additional DMRSs Dmrs-Additional Position | K slots |
|---|---|---|---|
| 00000 | {1, 0} | {Pos0, Pos0} | K = 2 |
| 00001 | {1, 1} | {Pos1, Pos0} | K = 2 |
| 00010 | {1, 0, 0} | {Pos0, Pos0, Pos0} | K = 3 |
| 00011 | {1, 0, 1} | {Pos0, Pos0, Pos0} | K = 3 |
| 00100 | {1, 0, 1} | {Pos1, Pos0, Pos0} | K = 3 |
| 00101 | {1, 0, 1} | {Pos1, Pos0, Pos1} | K = 3 |
| 00110 | {1, 1, 1} | {Pos1, Pos0, Pos0} | K = 3 |
| 00111 | {1, 1, 1} | {Pos1, Pos0, Pos1} | K = 3 |
| 01000 | {1, 0, 1, 0} | {Pos0, Pos0, Pos0, Pos0} | K = 4 |
| 01001 | {1, 0, 0, 0} | {Pos0, Pos0, Pos0, Pos0} | K = 4 |
| 01010 | {1, 1, 1, 1} | {Pos0, Pos0, Pos0, Pos0} | K = 4 |
| 01011 | {1, 1, 1, 1} | {Pos1, Pos0, Pos0, Pos0} | K = 4 |
| 01110 | {1, 1, 1, 1} | {Pos1, Pos0, Pos1, Pos0} | K = 4 |
| 01111 | {1, 1, 1, 1} | {Pos1, Pos0, Pos0, Pos1} | K = 4 |
| . . . | . . . | . . . | . . . |

It can be learned from Table 4 that, for example, when the value of the 5 bits in the first DCI is 00110, in a DMRS quantity configuration pattern corresponding to an index value of the first DCI, three values of dmrs-Additional Position are configured in the RRC signaling. That is, the configuration pattern indicated by the first DCI currently is joint configuration in three slots, a quantity of front-loaded DMRSs in a $1^{st}$ slot is 1, a quantity of additional DMRSs in the $1^{st}$ slot is 1, a quantity of front-loaded DMRSs in a $2^{nd}$ slot is 1, a quantity of additional DMRSs in the $2^{nd}$ slot is 0, a quantity of front-loaded DMRSs in a $3^{rd}$ slot is 1, and a quantity of additional DMRSs in the $3^{rd}$ slot is 0.

When the value of the 5 bits in the first DCI is 01110, in a DMRS quantity configuration pattern indicated by the first DCI, three values of dmrs-Additional Position are configured in the RRC signaling. That is, the configuration pattern indicated by the first DCI currently is joint configuration in three slots, a quantity of front-loaded DMRSs in a $1^{st}$ slot is 1, a quantity of additional DMRSs in the $1^{st}$ slot is 1, a quantity of front-loaded DMRSs in a $2^{nd}$ slot is 1, a quantity of additional DMRSs in the $2^{nd}$ slot is 0, a quantity of front-loaded DMRSs in a $3^{rd}$ slot is 1, a quantity of additional DMRSs in the $3^{rd}$ slot is 1, a quantity of front-loaded DMRSs in a $4^{th}$ slot is 1, and a quantity of additional DMRSs in the $4^{th}$ slot is 1.

Optionally, when only one front-loaded DMRS is configured in a $j^{th}$ time unit in the K time units, a start time domain symbol occupied by the front-loaded DMRS is a middle time domain symbol in the $j^{th}$ time unit. The $j^{th}$ time unit is any time unit other than the head time unit and the tail time unit in the K time units, where j is a positive integer greater than or equal to 1 and less than or equal to K.

For example, in Table 4, when the value the 5 bits of the first DCI is 00110, in a DMRS quantity configuration pattern corresponding to an index value of the first DCI, three values of dmrs-Additional Position are configured in the RRC signaling. That is, the configuration pattern indicated by the first DCI currently is joint configuration in three slots, and only one front-loaded DMRS is configured in a $2^{nd}$ slot. In this case, a start time domain symbol occupied by the front-loaded DMRS in the slot is a middle time domain symbol in the $2^{nd}$ slot.

It should be understood that the "middle" time domain symbol refers to any possible time domain symbol in a middle third of a time unit. This embodiment of this application does not limit the "middle" time domain symbol as a middlemost time domain symbol.

For example, when a $2^{nd}$ slot occupies 14 time domain symbols, that is, a quantity of time domain symbols occupied by the $j^{th}$ time unit is 14. In this case, the start time domain symbol occupied by the front-loaded DMRS may be a $7^{th}$ time domain symbol, or may be a $6^{th}$ time domain symbol or an $8^{th}$ time domain symbol. In other words, it is ensured that the start time domain symbol occupied by the front-loaded DMRS is a middle time domain symbol. A position of the middle time domain symbol is not specifically limited in this embodiment of this application.

Optionally, the start time domain symbol occupied by the front-loaded DMRS is configured by using the RRC signaling. The network device needs to send the RRC signaling to the terminal device, to determine the start time domain symbol occupied by the front-loaded DMRS.

Optionally, the start time domain symbol occupied by the front-loaded DMRS is predefined. In this case, the network device does not need to send, to the terminal device, the RRC signaling used to configure the start time domain symbol occupied by the front-loaded DMRS.

It should be understood that the correspondences between the value of the bits and the quantity of additional DMRSs in Table 3 and Table 4 are merely used as examples. A correspondence between a value of M bits in the first DCI and an additional DMRS quantity configuration pattern in the K time units is not specifically limited in this embodiment of this application.

It should be understood that a quantity of DMRSs that can be actually configured in each time unit is limited by a quantity of time domain symbols occupied by a PUSCH or a PDSCH in each time unit. Therefore, in this embodiment of this application, the technical solution of determining information about a quantity of DMRSs in a time unit by using a bit value is provided relative to a maximum quantity of DMRSs that may be configured in the time unit.

It should be understood that the descriptions in S510, and S520 in this embodiment of this application does not indicate a time sequence of steps, but are only used to distinguish different steps by numbering.

It should be understood that the time unit mentioned in this embodiment of this application may be a slot or a sub-slot, or may be a time domain resource occupied by one time of data block transmission. This is not specifically limited in this embodiment of this application.

When the terminal devices jointly estimate channel quality of a PDSCH, after the terminal receives the first DCI, the terminal device demodulates, based on a DMRS in each of the K time units, the downlink data sent by the network device.

When the network device jointly estimates the channel quality of the PUSCH, after receiving the first DCI, when sending uplink data in each of the K time units, the terminal device configures the DMRS in the foregoing manner, and the network device demodulates the uplink data sent by the terminal device.

The foregoing describes in detail the technical solution of flexibly configuring, with reference to the first DCI and the higher layer signaling, the configuration solution of the quantity of additional DMRSs in the K time units provided in this application. After the foregoing steps, the terminal device may determine a type of DMRS quantity configuration in the K time units based on the first DCI. The quantity of additional DMRSs in the K time units can be flexibly configured, so that DMRS overheads can be properly allocated.

Figure 6:
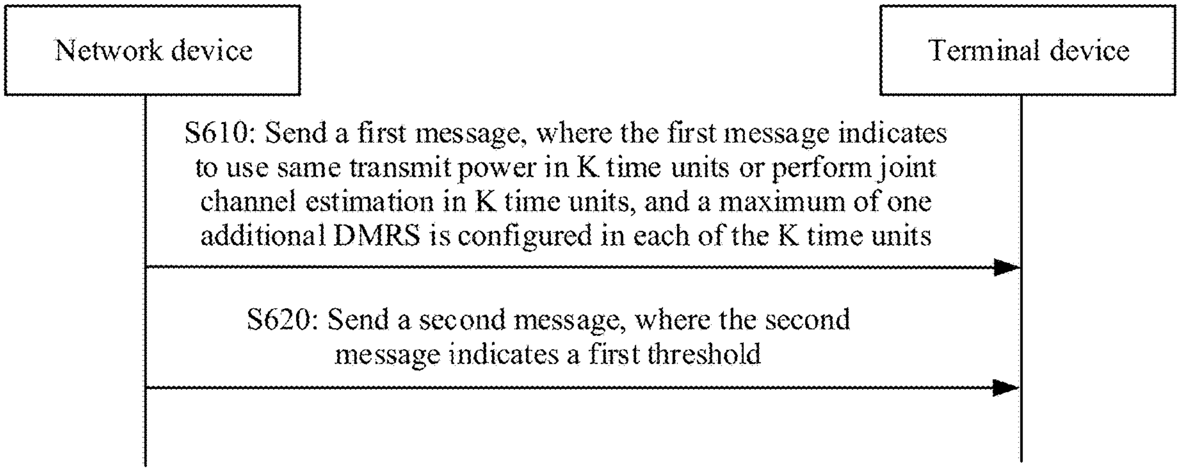
FIG. 6 is another schematic diagram of a communication process according to an embodiment of this application.

With reference to FIG. 6, the following describes in detail a technical solution for flexibly adjusting DMRS quantity configuration in the K time units according to another embodiment of this application.

S610: The network device sends first information to the terminal device.

The first information indicates to use same transmit power in the K time units or perform joint channel estimation in the K time units, and a maximum of one additional demodulation reference signal DMRS is configured in each of the K time units indicated by the first information, where K is a positive integer greater than or equal to 2.

It should be understood that, when the terminal device receives a joint indication of performing joint channel estimation in the K time units, a maximum of one additional DMRS is configured in each of the K time units, that is, a candidate value of the additional DMRS can only be {0, 1}. During joint channel estimation, more DMRSs are available compared with a quantity of DMRSs in a single time unit. Therefore, two or three additional DMRSs do not need to be configured in each time unit. This reduces DMRS overheads.

Optionally, K is greater than a first threshold.

Optionally, the network device further configures a first threshold. When joint channel estimation is performed in the K time units, when K is greater than the first threshold, a maximum of one additional DMRS is configured in each of the K time units. That is, a candidate value of the additional DMRS can only be {0, 1}. During joint channel estimation, more DMRSs are available compared with a quantity of DMRSs in a single time unit. Therefore, two or three additional DMRSs do not need to be configured in each time unit. This reduces DMRS overheads.

Optionally, the first threshold may be predefined.

Optionally, the first threshold is indicated by the network device by using second information.

The first information and the second information may be carried in same signaling or different signaling, for example, RRC signaling or DCI. This is not specifically limited in this embodiment of this application.

It should be understood that, when the first threshold is equal to K, a maximum of one additional demodulation reference signal DMRS is configured in each of the K time units.

Optionally, a possible value of the first threshold may be 2, 4, 8, or the like, and the first threshold is greater than or equal to 2.

Optionally, when only one front-loaded DMRS is configured in a $j^{th}$ time unit in the K time units, a start time domain symbol occupied by the front-loaded DMRS is a middle time domain symbol in the $j^{th}$ time unit. The $j^{th}$ time unit is any time unit other than the head time unit and the tail time unit in the K time units, where j is a positive integer greater than or equal to 1 and less than or equal to K.

It should be understood that the "middle" time domain symbol refers to any possible time domain symbol in a middle third of a time unit. This embodiment of this application does not limit the "middle" time domain symbol as a middlemost time domain symbol.

For example, one time unit is one time of data block transmission on a PUSCH. The PUSCH currently scheduled by the network device occupies 14 time domain symbols, that is, a quantity of time domain symbols occupied by the $j^{th}$ time unit is 14. In this case, the start time domain symbol occupied by the front-loaded DMRS may be a $7^{th}$ time domain symbol, or may be a $6^{th}$ time domain symbol or an $8^{th}$ time domain symbol. In other words, it is ensured that the start time domain symbol occupied by the front-loaded DMRS is a middle time domain symbol. A position of the middle time domain symbol is not specifically limited in this embodiment of this application.

Optionally, the start time domain symbol occupied by the front-loaded DMRS is configured by using the RRC signaling. The network device needs to send the RRC signaling to the terminal device, to determine the start time domain symbol occupied by the front-loaded DMRS.

Optionally, the start time domain symbol occupied by the front-loaded DMRS is predefined. In this case, the network device does not need to send, to the terminal device, the RRC signaling used to configure the start time domain symbol occupied by the front-loaded DMRS.

It should be understood that the time unit in this step may be a slot, a sub-slot, or a time domain resource occupied by one time of data block transmission. A meaning of the time unit is not specifically limited in this embodiment of this application.

It should be understood that a quantity of DMRSs that can be actually configured in each time unit is limited by a quantity of time domain symbols occupied by a PUSCH or a PDSCH in each time unit. Therefore, in this embodiment of this application, the technical solution of determining a quantity of DMRSs in a time unit by using the first information is provided relative to a maximum quantity of DMRSs that may be configured in the time unit.

When the terminal devices jointly estimate channel quality of the PDSCH, after the terminal receives the first information, the terminal device demodulates, based on a DMRS in each of N time units, downlink data sent by the network device.

When the network device jointly estimates the channel quality of the PUSCH, after receiving the first information, when sending uplink data in each of the K time units, the terminal device configures a quantity of DMRSs in the foregoing manner, and the network device demodulates the uplink data sent by the terminal device.

The foregoing describes in detail the technical solution for flexibly configuring the quantity of DMRSs in the K time units provided in this application. After the foregoing steps, the network device or the terminal device may indicate quantity configuration of DMRSs in the K time units by using the first information. This reduces total DMRS overheads, ensures sufficient accuracy of channel estimation, and improves transmission efficiency and performance.

Figure 7:
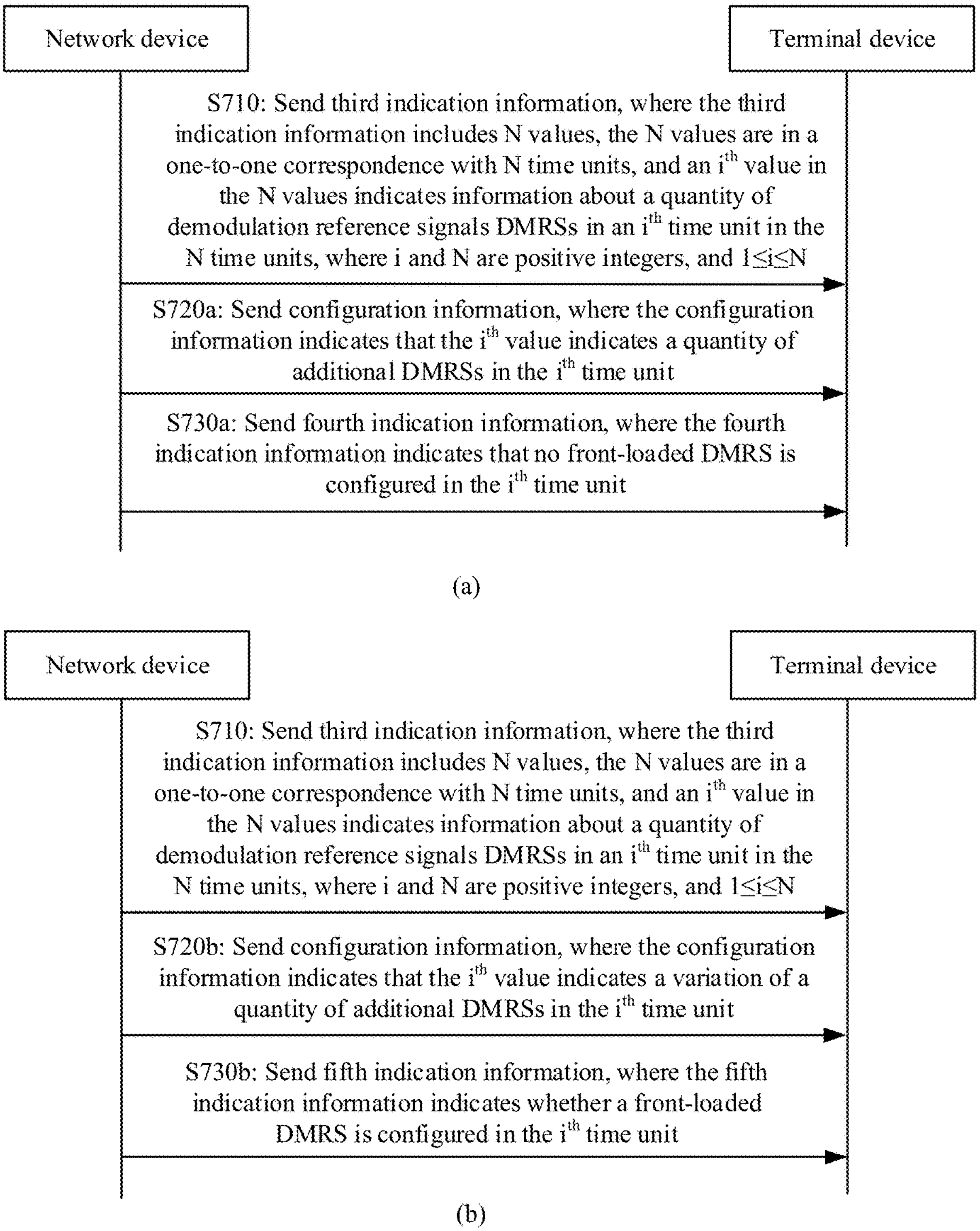
FIG. 7 is another schematic diagram of a communication process according to an embodiment of this application.

With reference to FIG. 7, the following describes in detail a technical solution for flexibly configuring a quantity of DMRSs in the N time units according to an embodiment of this application.

S710: The network device sends third indication information to the terminal device, where the third indication information is used to determine information about a quantity of DMRSs in each of the N time units. The third indication information includes N values, and the N values are in a one-to-one correspondence with the N time units. An $i^{th}$ value is corresponding to information about a quantity of DMRSs in an $i^{th}$ time unit in the N time units, where i and N are positive integers, and $1 \le i \le N$.

Optionally, when a parameter max Length configured in RRC signaling is len2, the $i^{th}$ value is determined by using 1 bit. When a value of max Length is len1, the $i^{th}$ value is determined by using 2 bits.

It should be understood that, when a parameter max Length configured in RRC signaling is len2, the $i^{th}$ value is determined by using at least 1 bit. When a value of max Length is len1, the $i^{th}$ value is determined by at least 2 bits. A quantity of bits used to determine the $i^{th}$ value is not specifically limited in this embodiment of this application.

It should be understood that a carrying position of the third indication information includes the following two manners.

Manner 1: The third indication information is carried in the RRC signaling. For example, the third indication information includes N values, which are {Pos s1, Pos s2, Pos s3, . . . , and Pos sN}. Each value corresponds to a position of an additional DMRS in each of the N time units, and a value of Pos si corresponds to the information about the quantity of DMRSs in the $i^{th}$ time unit in the N time units.

The network device or the terminal device may flexibly configure the quantity of DMRSs in the N time units by using the third indication information. During joint channel estimation, sufficient accuracy of channel estimation can be ensured. In addition, low total DMRS overheads can be ensured. This helps improve transmission efficiency and performance.

Manner 2: The third indication information is carried in DCI, the third indication information includes N groups of bits, the N groups of bits are in a one-to-one correspondence with the N time units, and the $i^{th}$ value in the N values corresponds to an $i^{th}$ group of bits in the N groups of bits. That is, the $i^{th}$ value is determined by using the $i^{th}$ group of bits.

The network device or the terminal device may indicate configuration of the quantity of DMRSs in the N time units by using the third indication information carried in the DCI. This implements dynamic adjustment of the quantity of configured DMRSs and reduces a delay.

Optionally, the information about the quantity of DMRSs includes any one of the following types of information: a quantity of additional DMRSs, a total quantity of DMRSs, a variation of the quantity of additional DMRSs, and a variation of the total quantity of DMRSs. The total quantity of DMRSs is a sum of the quantity of additional DMRSs and a quantity of front-loaded DMRSs, and a type of the information about the quantity of DMRSs is predefined, or a type of the information about the quantity of DMRSs is indicated by the network device by using configuration information.

S720: The network device sends the configuration information to the terminal device, where the configuration information is used to determine the type of the information about the quantity of DMRSs.

When the third indication information is carried in the RRC signaling, the type of the information about the quantity of DMRSs is indicated by the network device by using the configuration information, which includes determining the type of the information about the quantity of DMRSs by using a value of the configuration information or an index value of the value. An indication manner is not specifically limited in this embodiment of this application. If the network device does not send the information to the terminal device, or when the value of the indication information is a default value, the $i^{th}$ value indicates the quantity of additional DMRSs in the $i^{th}$ time unit by default. In this case, S720 is an optional step.

When the third indication information is carried in the DCI, the type of the information about the quantity of DMRSs is indicated by the network device by using the configuration information, which includes determining the type of the information about the quantity of DMRSs by using a value of the configuration information or an index value of the value. An indication manner is not specifically limited in this embodiment of this application. In this case, S720 is an optional step.

Optionally, that the $i^{th}$ value indicates the quantity of additional DMRSs in the $i^{th}$ time unit in the N time units includes two possible cases.

Case 1: In this case, when the $i^{th}$ value is determined by using 1 bit, a candidate value of the 1 bit is {0, 1}, which indicates that a quantity of additional DMRSs in the $i^{th}$ time unit is {0, 1}.

If a front-loaded DMRS is configured in the $i^{th}$ time unit, a maximum allowed value of a total quantity of DMRSs in the $i^{th}$ time unit is {1, 2}, or if no front-loaded DMRS is configured in the $i^{th}$ time unit, a maximum allowed value of a total quantity of DMRSs in the $i^{th}$ time unit is {0, 1}.

Case 2: In this case, when the $i^{th}$ value is determined by using 2 bits, a candidate value of the 2 bit is {00, 01, 10, 11}, which indicate that a quantity of additional DMRSs in the $i^{th}$ time unit is {0, 1, 2, 3}.

If a front-loaded DMRS is configured in the $i^{th}$ time unit, a maximum allowed value of a total quantity of DMRSs in the $i^{th}$ time unit is {1, 2, 3, 4}, or if no front-loaded DMRS is configured in the $i^{th}$ time unit, a maximum allowed value of a total quantity of DMRSs in the $i^{th}$ time unit is {0, 1, 2, 3}.

It should be understood that the correspondence between the value of the bit and the quantity of DMRSs is merely used as an example, and the correspondence is not specifically limited in this embodiment of this application.

When the $i^{th}$ value indicates the quantity of additional DMRSs in the $i^{th}$ time unit in the N time units, the following step is included.

S730*a*: The network device sends fourth indication information to the terminal device, where the fourth indication information indicates that no front-loaded DMRS is configured in the $i^{th}$ time unit.

In this case, if the network device does not send the fourth indication information to the terminal device, or when a value of the fourth indication information is a default value, a front-loaded DMRS is configured in the $i^{th}$ time unit by default.

Optionally, the $i^{th}$ value may further indicate the total quantity of DMRSs in the $i^{th}$ time unit includes two possible cases.

It should be understood that the total quantity of DMRSs is a sum of a quantity of front-loaded DMRSs and a quantity of additional DMRSs.

Case 1: When the $i^{th}$ value is indicated by using 1 bit, a value of the 1 bit is {0, 1}, which indicates that the total quantity of DMRSs in the $i^{th}$ time unit is {0, 1}.

In this case, when the total quantity of DMRSs in the $i^{th}$ time unit is 2, additional indication information needs to be used for indication. For example, the indication information may be indicated by using the RRC signaling, or may be indicated by using the DCI including using a newly added field in the DCI or reusing a redundant field in the DCI. Reusing the redundant field in the DCI can reduce signaling overheads. A carrying position of the indication information is not specifically limited in this application.

Case 2: When the $i^{th}$ value is indicated by using 2 bits, a value of the 2 bits is {00, 01, 10, 11}, which indicates that the total quantity of DMRSs in the $i^{th}$ time unit is {0, 1, 2, 3}.

In this case, when the total quantity of DMRSs in the $i^{th}$ time unit is 4, additional indication information needs to be used for indication. The indication information may reuse a redundant field in the RRC signaling, or may reuse a redundant field in the DCI. Reusing the redundant field in the DCI can reduce signaling overheads. A carrying position of the indication information is not specifically limited in this application.

It should be understood that the correspondence between the value of the bit and the quantity of DMRSs is merely used as an example, and the correspondence is not specifically limited in this embodiment of this application.

Optionally, the $i^{th}$ value indicates a variation of additional DMRSs in the $i^{th}$ time unit.

The variation of the quantity of additional DMRSs is relative to a value of dmrs-Additional Position configured by using higher layer signaling, and the $i^{th}$ value indicates the variation of the additional DMRSs in the $i^{th}$ time unit that is obtained by performing a corresponding algebraic calculation with reference to the quantity of additional DMRSs in the $i^{th}$ time unit based on dmrs-Additional Position. Specifically, the following two cases may be included.

It should be understood that the $i^{th}$ value indicates the variation of the additional DMRSs in the $i^{th}$ time unit that is obtained by performing an addition calculation or a subtraction calculation with reference to the quantity of additional DMRSs in the $i^{th}$ time unit based on the value of dmrs-Additional Position configured by using the higher layer signaling.

Case 1: When the $i^{th}$ value is determined by using 1 bit, a possible value of the 1 bit is {0, 1}. It is assumed that {0, 1} corresponds to {quantity of additional DMRSs−2, quantity of additional DMRSs−1}.

Case 2: When the $i^{th}$ value is determined by using 2 bits, a possible value of the 2 bits is {00, 01, 10, 11}. It is assumed that {00, 01, 10, 11} corresponds to {quantity of additional DMRSs−2, quantity of additional DMRSs−1, quantity of additional DMRSs unchanged, quantity of additional DMRSs+1}.

In this case, a front-loaded DMRS is configured in the $i^{th}$ time unit. If a calculation result of the quantity of additional DMRSs is less than 0, it indicates that only the front-loaded DMRS is configured in the $i^{th}$ time unit, and the quantity of additional DMRSs is 0. If a calculation result of the quantity of additional DMRSs is greater than 0, the calculation result is the quantity of additional DMRSs.

In this case, no front-loaded DMRS is configured in the $i^{th}$ time unit. If a calculation result of the quantity of additional DMRSs is less than 0, it indicates that neither a front-loaded DMRS nor an additional DMRS is configured in the $i^{th}$ time unit. If a calculation result of the quantity of additional DMRSs is greater than 0, a calculation result is the total quantity of DMRSs.

When the $i^{th}$ value indicates the variation of the quantity of additional DMRSs in the $i^{th}$ time unit in the N time units, the following step is included.

S730*b*: The network device sends fifth indication information to the terminal device, where the fifth indication information indicates whether a front-loaded DMRS is configured in the $i^{th}$ time unit.

It should be understood that the $i^{th}$ value may further indicate the variation of the quantity of additional DMRSs in the $i^{th}$ time unit in the N time units that is obtained by performing a multiplication or division calculation with reference to the quantity of additional DMRSs in the $i^{th}$ time unit based on the value of dmrs-Additional Position configured by using the higher layer signaling. The following briefly explains two possible calculation results.

A possible calculation result is as follows: If the indication result of the $i^{th}$ value is that the quantity of additional DMRSs is a decimal, rounding up or rounding down may be performed. Rounding up or rounding down may be predefined or may be indicated by using additional signaling. This is not specifically limited in this embodiment of this application.

Another possible calculation result: If the indication result of the $i^{th}$ value is that the quantity of additional DMRSs in the $i^{th}$ time unit is greater than 1 (the DMRS occupies two consecutive time domain symbols) or greater than 3 (the DMRS occupies one time domain symbol), a maximum quantity of additional DMRSs that can be actually configured in the $i^{th}$ time unit is still 1 or 3.

It should be understood that the variation of the quantity of additional DMRSs is relative to a quantity of additional DMRSs configured by using the RRC signaling. The quantity of additional DMRSs configured by using the RRC signaling is not specifically limited in this embodiment of this application.

It should be understood that the correspondence between the value of the bit and the variation of the quantity of additional DMRS is merely used as an example, and the correspondence is not specifically limited in this embodiment of this application.

Optionally, the $i^{th}$ value indicates a variation of the total quantity of DMRSs in the $i^{th}$ time unit.

The variation of the total quantity of DMRSs is relative to a value of dmrs-Additional Position that is configured by using higher layer signaling, and the $i^{th}$ value indicates the variation of the total quantity of DMRSs in the $i^{th}$ time unit that is obtained by performing a corresponding algebraic calculation with reference to the total quantity of DMRSs in the $i^{th}$ time unit based on dmrs-Additional Position. Specifically, the following two cases may be included.

It should be understood that the $i^{th}$ value indicates the variation of the total quantity of DMRSs in the $i^{th}$ time unit that is obtained by performing an addition calculation or a subtraction calculation with reference to the total quantity of DMRSs in the $i^{th}$ time unit based on the value of dmrs-Additional Position configured by using the higher layer signaling.

Case 1: When the $i^{th}$ value is determined by using 1 bit, a possible value of the 1 bit is {0, 1}. It is assumed that {0, 1} corresponds to {total quantity of DMRSs−2, total quantity of additional DMRSs−1}.

Case 2: When the $i^{th}$ value is determined by using 2 bits, a possible value of the 2 bits is {00, 01, 10, 11}. It is assumed that {00, 01, 10, 11} corresponds to {total quantity of DMRSs−2, total quantity of DMRSs−1, total quantity of DMRSs unchanged, total quantity of DMRSs+1}.

In this case, if a calculation result of the total quantity of DMRSs is less than 0, it indicates that neither a front-loaded DMRS nor a quantity of additional DMRSs is configured in the $i^{th}$ time unit. If a calculation result of the total quantity of DMRSs is greater than 0, the calculation result is the total quantity of DMRSs.

If a calculation result of the total quantity of DMRSs is greater than 0, for example, 1, it may be understood that one front-loaded DMRS is configured in the $i^{th}$ time unit. If a calculation result of the total quantity of DMRSs is 2, it may be understood that one front-loaded DMRS and one additional DMRS are configured in the $i^{th}$ time unit. If a calculation result of the total quantity of DMRSs is 3, it may be understood that one front-loaded DMRS and two additional DMRSs are configured in the $i^{th}$ time unit, and so on.

It should be understood that the $i^{th}$ value may further indicate the variation of the total quantity of DMRSs in the $i^{th}$ time unit that is obtained by performing a multiplication or division calculation with reference to the quantity of additional DMRSs in the $i^{th}$ time unit based on the value of dmrs-Additional Position configured by using the higher layer signaling. The following briefly explains two possible calculation results.

A possible calculation result is as follows: If the indication result of the $i^{th}$ value is that the total quantity of DMRSs is a decimal, rounding up or rounding down may be performed. Rounding up or rounding down may be predefined or may be indicated by using additional signaling. This is not specifically limited in this embodiment of this application.

Another possible calculation result: If the indication result of the $i^{th}$ value is that the total quantity of DMRSs in the $i^{th}$ time unit is greater than 2 (the DMRS occupies two consecutive time domain symbols) or greater than 4 (the DMRS occupies one time domain symbol), a maximum total quantity of DMRSs that can be actually configured in the $i^{th}$ time unit is still 2 or 4.

It should be understood that the correspondence between the value of the bit and the variation of the quantity of DMRS is merely used as an example, and the correspondence is not specifically limited in this embodiment of this application.

It should be understood that the variation of the total quantity of DMRSs is relative to a quantity of additional DMRSs configured by using the RRC signaling. The quantity of additional DMRSs configured by using the RRC signaling is not specifically limited in this embodiment of this application.

It should be understood that when the third indication information is carried in the DCI,

- when the third indication information indicates information about a quantity of additional DMRSs in the N time units or information about the total quantity of DMRSs in the N time units, the terminal device or the network device configures the quantity of additional DMRSs or the total quantity of DMRSs in the N time units based on the third indication information. That is, the DCI covers a value of the quantity of additional DMRSs configured in the original RRC signaling; or
- when the third indication information indicates information about a variation of a quantity of additional DMRSs in the N time units or information about a variation of the total quantity of DMRSs in the N time units, the terminal device or the network device performs algebra calculation based on the third indication information with reference to a value of the quantity of additional DMRSs configured in the original RRC signaling, to configure the quantity of additional DMRSs or the total quantity of DMRSs in the N time units.

Optionally, when only one front-loaded DMRS is configured in the $j^{th}$ time unit in the K time units, a start time domain symbol occupied by the front-loaded DMRS is a middle time domain symbol in the $j^{th}$ time unit. The $j^{th}$ time unit is any time unit other than the head time unit and the tail time unit in the K time units, where j is a positive integer greater than or equal to 1 and less than or equal to K.

It should be understood that the "middle" time domain symbol refers to any possible time domain symbol in a middle third of a time unit. This embodiment of this application does not limit the "middle" time domain symbol as a middlemost time domain symbol.

For example, one time unit is one time of data block transmission on a PUSCH. The PUSCH currently scheduled by the network device occupies 14 time domain symbols, that is, a quantity of time domain symbols occupied by the $j^{th}$ time unit is 14. In this case, the start time domain symbol occupied by the front-loaded DMRS may be a $7^{th}$ time domain symbol, or may be a $6^{th}$ time domain symbol or an $8^{th}$ time domain symbol. In other words, it is ensured that the start time domain symbol occupied by the front-loaded DMRS is a middle time domain symbol. A position of the middle time domain symbol is not specifically limited in this embodiment of this application.

Optionally, the start time domain symbol occupied by the front-loaded DMRS is configured by using the RRC signaling. The network device needs to send the RRC signaling to the terminal device, to determine the start time domain symbol occupied by the front-loaded DMRS.

Optionally, the start time domain symbol occupied by the front-loaded DMRS is predefined. In this case, the network device does not need to send, to the terminal device, the RRC signaling used to configure the start time domain symbol occupied by the front-loaded DMRS.

It should be understood that the time unit in this step may be a slot, a sub-slot, or a time domain resource occupied by one time of data block transmission. This is not specifically limited in this embodiment of this application.

It should be understood that a quantity of DMRSs that can be actually configured in each time unit is limited by a quantity of time domain symbols occupied by a PUSCH or a PDSCH in each time unit. Therefore, in this embodiment of this application, the technical solution of determining a quantity of DMRSs in each time unit by using the third indication information is provided relative to a maximum quantity of DMRSs that may be configured in the time unit.

It should be understood that the fourth indication information and the fifth indication information may be indicated by using the RRC signaling, or may be indicated by using the DCI, including using a newly added field in the DCI or reusing a redundant field in the DCI. Reusing the redundant field in the DCI can reduce signaling overheads. Carrying positions of the fourth indication information and the fifth indication information are not specifically limited in this embodiment of this application.

When the terminal devices jointly estimate channel quality of the PDSCH, after the terminal receives the indication information, the terminal device demodulates, based on a quantity of DMRSs in each of the N time units, downlink data sent by the network device.

When the network device jointly estimates the channel quality of the PUSCH, after receiving the indication information, when sending uplink data in each of the K time units, the terminal device configures a quantity of DMRSs in a manner indicated by the indication information, and the network device demodulates the uplink data sent by the terminal device.

The foregoing describes in detail the solution for flexibly configuring the quantity of DMRSs in each of the N time units provided in this application. After the foregoing steps, the network device or the terminal device may flexibly configure the quantity of DMRSs in the N time units by using the foregoing indication information. During joint channel estimation, sufficient accuracy of channel estimation can be ensured. In addition, low total DMRS overheads can be ensured. This helps improve transmission efficiency and performance.

Figure 8:
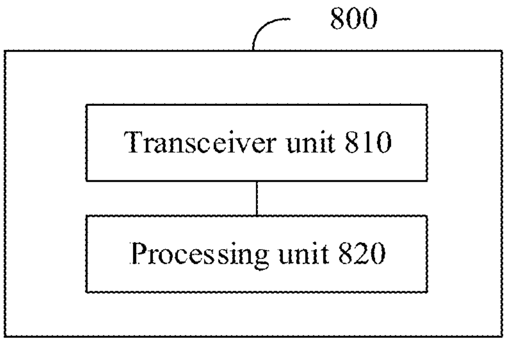
FIG. 8 is a schematic block diagram of a communication apparatus according to an embodiment of this application.

FIG. 8 is a schematic block diagram of a communication apparatus according to an embodiment of this application.

The communication apparatus 800 includes a transceiver unit 810 and a processing unit 820. The transceiver unit 810 may communicate with the outside, and the processing unit 820 is configured to perform data processing. The transceiver unit 810 may also be referred to as a communication interface or a communication unit.

Optionally, the communication apparatus may further include a storage unit. The storage unit may be configured to store instructions and/or data. The processing unit 820 may read the instructions and/or the data in the storage unit.

The communication apparatus 800 may be configured to perform actions performed by the terminal device in the foregoing method embodiments. In this case, the communication apparatus 800 may be the terminal device or a component that can be configured in the terminal device, the transceiver unit 810 is configured to perform receiving/sending-related operations on a terminal device side in the foregoing method embodiments, and the processing unit 820 is configured to perform processing-related operations on the terminal device side in the foregoing method embodiments.

Figure 2:
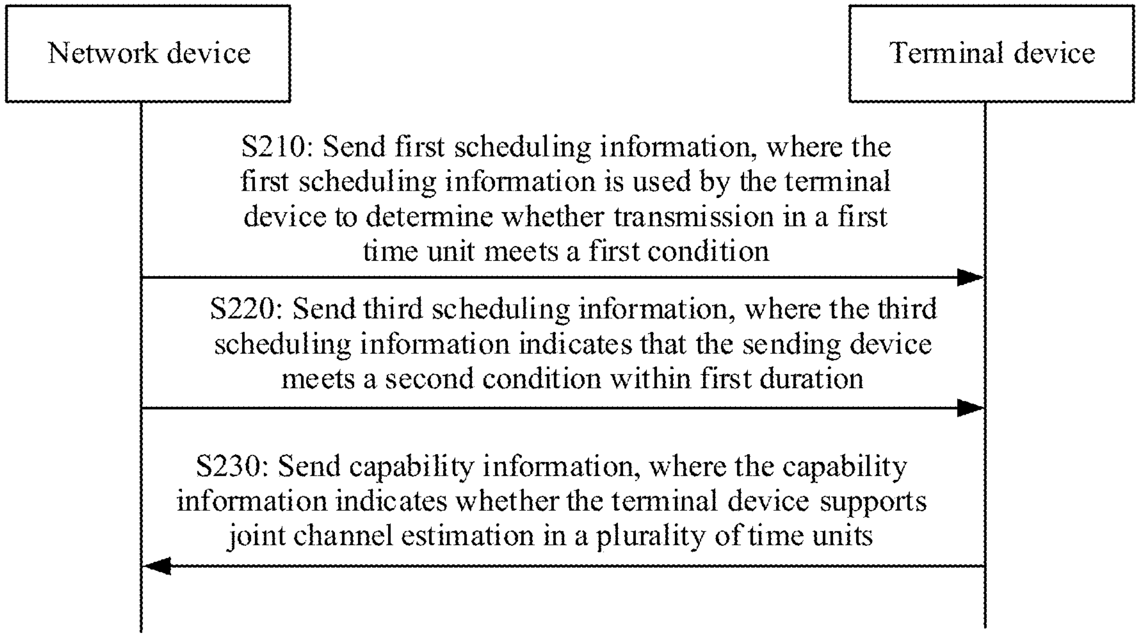
FIG. 2 is a schematic diagram of a communication process according to an embodiment of this application.

In a design, the communication apparatus 800 is configured to perform an action of the terminal device in the embodiment shown in FIG. 2. Optionally, modules in the communication apparatus 800 may be implemented by using software. As shown in FIG. 8, the communication apparatus 800 includes:

- a transceiver unit 810, configured to receive first scheduling information sent by a network device, where the first scheduling information is used to determine whether transmission in a first time unit meets a first condition; and
- a processing unit 820, configured to determine whether the first scheduling information is the same as second scheduling information of a second time unit, where when the first scheduling information is the same as the second scheduling information of the second unit time unit, transmission in the first time unit meets the first condition, or when the first scheduling information is different from the second scheduling information of the second time unit, transmission in the first time unit does not meet the first condition.

The second time unit is a time unit before the first time unit, a transmission direction in the first time unit is the same as a transmission direction in the second time unit, and no transmission in an opposite direction exists between the second time unit and the first time unit. The first condition includes at least one of same transmit power, same precoding, a same antenna port, and a same frequency domain resource.

When transmission in the first time unit meets the first condition, transmission in the first time unit is the same as transmission in the second time unit.

The transceiver unit 810 is further configured to send uplink data in the first time unit and the second time unit, or receive downlink data in the first time unit and the second time unit.

Optionally, the first scheduling information and the second scheduling information are carried in downlink control information DCI.

Optionally, the transceiver unit 810 is further configured receive third scheduling information sent by the network device, where the third scheduling information indicates that a sending device meets a second condition within first duration, and the second condition includes one or more of the following:

The sending device does not turn off a power amplifier, the sending device does not perform carrier frequency switching, or the sending device does not perform antenna switching.

Optionally, the second condition is valid within the first duration, and the first duration is configured by the network device by using radio resource control RRC signaling, or the first duration is predefined.

Optionally, before the transceiver unit 810 receives the data, the transceiver unit 810 is further configured to report capability information to the network device, where the capability information indicates whether the communication apparatus can support joint channel estimation in a plurality of time units.

In a design, the communication apparatus 800 is configured to perform an action of the terminal device in the embodiment shown in FIG. 3. Optionally, modules in the communication apparatus 800 may be implemented by using software. As shown in FIG. 8, the terminal device 800 includes:

- a transceiver unit 810, configured to receive first indication information sent by a network device, where the first indication information indicates a quantity of time units between a third time unit and a fourth time unit, the third time unit belongs to a plurality of time units, the fourth time unit is a time unit in the plurality of time units that has a same quantity of configured demodulation reference signals DMRSs as the third time unit and that is closest to the third time unit, at least one fifth time unit is included between the third time unit and the fourth time unit, and a quantity of DMRSs configured in the fifth time unit is less than the quantity of DMRSs configured in the third time unit; and a processing unit 820, configured to determine, based on the first indication information, quantities of demodulation reference signals DMRSs configured in the plurality of time units.

Optionally, the transceiver unit 810 is further configured to receive second indication information sent by the network device, where the second indication information is used to determine that a quantity of the plurality of time units is K, and K is a positive integer greater than or equal to 2, where

- data blocks transmitted in all of the K time units are the same, and the second indication information is used to determine a quantity of times of repeated transmission of the data block; or
- data blocks transmitted in all of the K time units are different from each other, and the second indication information is used to determine a quantity of different data blocks in the K time units; or
- the K time units include a plurality of data blocks, some of the plurality of data blocks are the same and the others are different, and the second indication information is used to determine the quantity of the K time units.

Optionally, before the transceiver unit 810 receives the data in the plurality of time units, the transceiver unit 810 is further configured to report first capability information to the network device. The first capability information indicates that the terminal device can support joint channel estimation in a maximum of M time units, and M is a positive integer greater than or equal to 2.

Optionally, K is less than or equal to M.

Optionally, when only one front-loaded DMRS is configured in a $j^{th}$ time unit in the K time units, a start time domain symbol occupied by the front-loaded DMRS is a middle time domain symbol in the $j^{th}$ time unit. The $j^{th}$ time unit is any time unit other than a head time unit and a tail time unit in the K time units, where j is a positive integer greater than 1 and less than K.

Optionally, the start time domain symbol occupied by the front-loaded DMRS is configured by using the radio resource control RRC signaling. Alternatively, the start time domain symbol occupied by the front-loaded DMRS is predefined.

Optionally, a time unit in the plurality of time units is any one of the following: a slot, a sub-slot, a frame, a subframe, or a time domain resource occupied by one time of data block transmission.

Optionally, the first indication information and the second indication information may be carried in the radio resource control RRC signaling.

Optionally, configuration information about a quantity of DMRSs includes any one of configuration information about a quantity of additional DMRSs, configuration information about a total quantity of DMRSs, configuration information about a variation of a quantity of additional DMRSs, or configuration information about a variation of a total quantity of DMRSs.

In a design, the communication apparatus 800 is configured to perform an action of the terminal device in the embodiment shown in FIG. 5. Optionally, modules in the communication apparatus 800 may be implemented by using software. As shown in FIG. 8, the terminal device 800 includes:

- a transceiver unit 810, configured to receive first downlink control information DCI sent by a network device, where the first DCI indicates a first DMRS configuration pattern, the first DMRS configuration pattern belongs to a DMRS configuration pattern set, and the DMRS configuration pattern set includes at least two different DMRS configuration patterns; and a processing unit 820, configured to determine, based on the first DMRS configuration pattern, quantities of DMRSs configured in K time units, where quantities of DMRSs configured in at least two of the K time units are different, and K is a positive integer greater than or equal to 2.

Optionally, K is predefined, or K is indicated by the network device by using additional indication information, or K is determined by a quantity of pieces of value content in the first DMRS configuration pattern.

Optionally, data blocks transmitted in all of the K time units are the same, and the additional indication information is used to determine a quantity of times of repeated transmission of the data block; or

- data blocks transmitted in all of the K time units are different from each other, and the additional indication information is used to determine a quantity of different data blocks in the K time units; or
- some of data blocks transmitted in each of the K time units are the same, some of the data blocks transmitted in each of the K time units are different, and the additional indication information is used to determine a quantity of different data blocks in the K time units.

Optionally, the DMRS configuration pattern set is configured by using radio resource control RRC signaling or is a predefined configuration pattern set.

Optionally, the first DCI indicates an index value of the first DMRS configuration pattern. The transceiver unit 810 is further configured to receive media access control control element MAC CE signaling sent by the network device, where the MAC CE signaling is used to activate determining the first DMRS configuration pattern from the DMRS configuration pattern set by the communication apparatus based on the index value of the first DMRS configuration pattern.

Optionally, when only one front-loaded DMRS is configured in a $j^{th}$ time unit in the K time units, a start time domain symbol occupied by the front-loaded DMRS is a middle time domain symbol in the $j^{th}$ time unit. The $j^{th}$ time unit is any time unit other than a head time unit and a tail time unit in the K time units, where j is a positive integer greater than 1 and less than K.

Optionally, the start time domain symbol occupied by the front-loaded DMRS is configured by using the radio resource control RRC signaling. Alternatively, the start time domain symbol occupied by the front-loaded DMRS is predefined.

Optionally, a time unit in the K time units is any one of the following: a slot, a sub-slot, a frame, a subframe, or a time domain resource occupied by one time of data block transmission.

Optionally, the first DMRS configuration pattern includes any one of a configuration pattern of a quantity of additional DMRSs, a configuration pattern of a total quantity of DMRSs, a configuration pattern of a variation of a quantity of additional DMRSs, or a configuration pattern of a variation of a total quantity of DMRSs.

In a design, the communication apparatus 800 is configured to perform an action of the terminal device in the embodiment shown in FIG. 6. Optionally, modules in the communication apparatus 800 may be implemented by using software. As shown in FIG. 8, the terminal device 800 includes:

- a transceiver unit 810, configured to receive first information sent by a network device, where the first information indicates to use same transmit power in K time units or perform joint channel estimation in K time units; and a processing unit 820, configured to determine, based on the first information, that a maximum of one additional demodulation reference signal DMRS is configured in each of the K time units, where K is a positive integer greater than or equal to 2.

Optionally, K is greater than a first threshold.

Optionally, the first threshold is predefined, or is indicated by using second information.

Optionally, the first message and the second message may be carried in same signaling, or may be carried in different signaling.

Optionally, the first information is carried in DCI or RRC signaling.

Optionally, when only one front-loaded DMRS is configured in a $j^{th}$ time unit in the K time units, a start time domain symbol occupied by the front-loaded DMRS is a middle time domain symbol in the $j^{th}$ time unit. The $j^{th}$ time unit is any time unit other than a head time unit and a tail time unit in the K time units, where j is a positive integer greater than 1 and less than K.

Optionally, the start time domain symbol occupied by the front-loaded DMRS is configured by using the radio resource control RRC signaling. Alternatively, the start time domain symbol occupied by the front-loaded DMRS is predefined.

Optionally, a time unit in the K time units is any one of the following: a slot, a sub-slot, a frame, a subframe, or a time domain resource occupied by one time of data block transmission.

In a design, the communication apparatus 800 is configured to perform an action of the terminal device in the embodiment shown in FIG. 7. Optionally, modules in the communication apparatus 800 may be implemented by using software. As shown in FIG. 8, the terminal device 800 includes:

a transceiver unit 810, configured to receive third indication information sent by a network device, where the third indication information includes N values, the N values are in a one-to-one correspondence with N time units, and an $i^{th}$ value in the N parameters indicates a quantity of demodulation reference signals DMRSs in an $i^{th}$ time unit in the N time units, where i and N are positive integers, and $1 \le i \le N$; and a processing unit 820, configured to determine information about a quantity of DMRSs in each of the N time units based on the third indication information.

Optionally, the third indication information includes N groups of bits, the N groups of bits are in a one-to-one correspondence with the N time units, and an $i^{th}$ value in the N parameters corresponds to an $i^{th}$ group of bits in the N groups of bits.

Optionally, a quantity of time domain symbols occupied by a front-loaded DMRS is 1, and the $i^{th}$ value is determined by using 2 bits; or a quantity of time domain symbols occupied by a front-loaded DMRS is 2, and the $i^{th}$ value is determined by using 1 bit.

Optionally, the information about the quantity of DMRSs includes any one of the following types of information: a quantity of additional DMRSs, a total quantity of DMRSs, a variation of the quantity of additional DMRSs, and a variation of the total quantity of DMRSs. The total quantity of DMRSs is a sum of the quantity of additional DMRSs and a quantity of front-loaded DMRSs.

Optionally, the third indication information may be carried in radio resource control RRC signaling or downlink control information DCI.

When the third indication information is carried in the DCI, the transceiver unit 810 is further configured to receive configuration information sent by the network device, where the configuration information indicates a type of the information about the quantity of DMRSs.

Optionally, the third indication information is carried in the RRC signaling, and a type of the information about the quantity of DMRSs is predefined. Alternatively, the transceiver unit 810 is further configured to receive configuration information sent by the network device, where the configuration information indicates a type of the information about the quantity of DMRSs.

Optionally, the $i^{th}$ value indicates the quantity of additional DMRSs in the $i^{th}$ time unit, and the transceiver unit 810 is further configured to receive fourth indication information sent by the network device, where the fourth indication information indicates that no front-loaded DMRS is configured in the $i^{th}$ time unit.

Optionally, the $i^{th}$ value indicates a variation of the quantity of additional DMRSs in the $i^{th}$ time unit, and the transceiver unit 810 is further configured to receive fifth indication information sent by the network device, where the fifth indication information indicates whether a front-loaded DMRS is configured in the $i^{th}$ time unit.

Optionally, the third indication information is carried in the DCI, and the processing unit 820 is configured to the quantity of additional DMRSs in the $i^{th}$ time unit based on the third indication information, where the $i^{th}$ value indicates the quantity of additional DMRSs in the $i^{th}$ time unit.

Alternatively, the processing unit 820 is configured to determine a total quantity of DMRSs in the $i^{th}$ time unit based on the third indication information, where the $i^{th}$ value indicates the total quantity of DMRSs in the $i^{th}$ time unit.

The processing unit 820 is configured to determine the quantity of additional DMRSs in the $i^{th}$ time unit based on the third indication information and the RRC signaling, where the $i^{th}$ value indicates the variation of the quantity of additional DMRSs in the $i^{th}$ time unit, and the RRC signaling indicates the quantity of additional DMRSs in the $i^{th}$ time unit.

The processing unit 820 is configured to determine a total quantity of DMRSs in the $i^{th}$ time unit based on the third indication information and the RRC signaling, where the $i^{th}$ value indicates a variation of the total quantity of DMRSs in the $i^{th}$ time unit, and the RRC signaling indicates the quantity of additional DMRSs in the $i^{th}$ time unit.

Optionally, when only one front-loaded DMRS is configured in a $j^{th}$ time unit in N time units, a start time domain symbol occupied by the front-loaded DMRS is a middle time domain symbol in the $j^{th}$ time unit. The $j^{th}$ time unit is any time unit other than a head time unit and a tail time unit in the N time units, where j is a positive integer greater than 1 and less than N.

Optionally, the start time domain symbol occupied by the front-loaded DMRS is configured by using the radio resource control RRC signaling. Alternatively, the start time domain symbol occupied by the front-loaded DMRS is predefined.

Optionally, a time unit in the N time units is any one of the following: a slot, a sub-slot, a frame, a subframe, or a time domain resource occupied by one time of data block transmission.

It should be understood that the terminal device 800 in this embodiment of this application may correspond to the terminal device in the foregoing method embodiments. The foregoing and another management operations and/or functions of units in the terminal device 800 are intended to implement a corresponding step of the foregoing method, and therefore beneficial effect of the foregoing method embodiment may also be implemented.

The processing unit 820 in FIG. 8 may be implemented by a processor or a processor-related circuit. The transceiver unit 810 may be implemented by using a transceiver or a transceiver-related circuit. The transceiver unit 810 may also be referred to as a communication unit or a communication interface. The storage unit may be implemented by a memory.

It should be understood that the network device 800 in this embodiment of this application may correspond to the terminal device in the foregoing method embodiments, and the foregoing and another management operations and/or functions of units in the terminal device 800 are intended to implement a corresponding step of the foregoing method, and therefore beneficial effect of the foregoing method embodiment may also be implemented.

Figure 9:
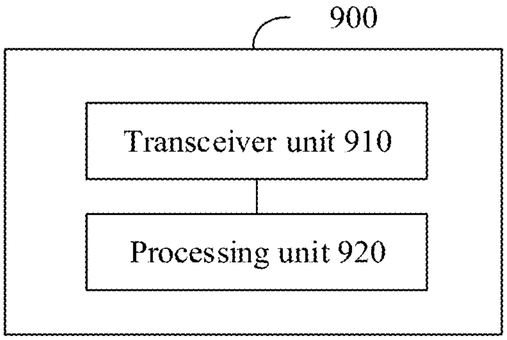
FIG. 9 is another schematic block diagram of a communication apparatus according to an embodiment of this application.

FIG. 9 is a schematic block diagram of a communication apparatus according to an embodiment of this application. The communication apparatus 900 includes a transceiver unit 910 and a processing unit 920. The transceiver unit 910 may communicate with the outside, and the processing unit 920 is configured to perform data processing. The transceiver unit 910 may also be referred to as a communication interface or a communication unit.

Optionally, the communication apparatus 900 may further include a storage unit. The storage unit may be configured to store instructions and/or data. The processing unit 920 may read the instructions and/or the data in the storage unit.

The communication apparatus 900 may be configured to perform actions performed by the network device in the foregoing method embodiments. In this case, the communication apparatus 900 may be the network device or a component that can be configured in the network device, the transceiver unit 910 is configured to perform receiving/sending-related operations on a terminal device side in the foregoing method embodiments, and the processing unit 920 is configured to perform processing-related operations on the terminal device side in the foregoing method embodiments.

In a design, the communication apparatus 900 is configured to perform an action of the network device in the embodiment shown in FIG. 2. Optionally, modules in the communication apparatus 900 may be implemented by using software. As shown in FIG. 9, the communication apparatus 900 includes:

- a processing unit 920, configured to determine first scheduling information, where the first scheduling information is used by the terminal device to determine whether transmission in the first time unit meets a first condition, and when the first scheduling information is the same as second scheduling information of a second time unit, transmission in the first time unit meets the first condition, or when the first scheduling information is different from second scheduling information of a second time unit, transmission in the first time unit does not meet the first condition;
- the second time unit is a time unit before the first time unit, a transmission direction in the first time unit is the same as a transmission direction in the second time unit, no transmission in an opposite direction exists between the second time unit and the first time unit, and the first condition includes at least one of same transmit power, same precoding, a same antenna port, and a same frequency domain resource; and
- when transmission in the first time unit meets the first condition, transmission in the first time unit is the same as transmission in the second time unit; and
- a transceiver unit 910, configured to send the first scheduling information to the terminal device, where the transceiver unit 910 is further configured to send downlink data to the terminal device in the first time unit and the second time unit, or receive, in the first time unit and the second time unit, uplink data sent by the terminal device.

Optionally, the first scheduling information and the second scheduling information are carried in downlink control information DCI.

Optionally, the transceiver unit 910 is further configured to send third scheduling information to the terminal device, where the third scheduling information indicates that a sending device meets a second condition within first duration, and the second condition includes one or more of the following:

The sending device does not turn off a power amplifier, the sending device does not perform carrier frequency switching, or the sending device does not perform antenna switching.

Optionally, the second condition is valid within the first duration, and the first duration is configured by using radio resource control RRC signaling, or the first duration is predefined.

Optionally, when the transceiver unit 910 sends the downlink data, the transceiver unit 910 is further configured to receive capability information sent by the terminal device, where the capability information indicates whether the terminal device can support joint channel estimation in a plurality of time units.

In a design, the communication apparatus 900 is configured to perform an action of the network device in the embodiment shown in FIG. 3. Optionally, modules in the communication apparatus 900 may be implemented by using software. As shown in FIG. 9, the terminal device 900 includes:

- a processing unit 920, configured to determine first indication information, where the first indication information indicates a quantity of time units between a third time unit and a fourth time unit, the third time unit belongs to a plurality of time units, the fourth time unit is a time unit in the plurality of time units that has a same quantity of configured demodulation reference signals DMRSs as the third time unit and that is closest to the third time unit, at least one fifth time unit is included between the third time unit and the fourth time unit, and a quantity of DMRSs configured in the fifth time unit is less than the quantity of DMRSs configured in the third time unit; and a transceiver unit 910, configured to send the first indication information to the terminal device.

Optionally, the transceiver unit 910 is further configured to send second indication information to the terminal device, where the second indication information is used to determine that a quantity of the plurality of time units is K, and K is a positive integer greater than or equal to 2, where

- data blocks transmitted in all of the K time units are the same, and the second indication information is used to determine a quantity of times of repeated transmission of the data block; or
- data blocks transmitted in all of the K time units are different from each other, and the second indication information is used to determine a quantity of different data blocks in the K time units; or
- the K time units include a plurality of data blocks, some of the plurality of data blocks are the same and the others are different, and the second indication information is used to determine the quantity of the K time units.

Optionally, before the transceiver unit 910 sends downlink data in the plurality of time units, the transceiver unit 910 is further configured to receive first capability information sent by the terminal device. The first capability information indicates that the terminal device can support joint channel estimation in a maximum of M time units, and M is a positive integer greater than or equal to 2.

Optionally, K is less than or equal to M.

Optionally, when only one front-loaded DMRS is configured in a $j^{th}$ time unit in the K time units, a start time domain symbol occupied by the front-loaded DMRS is a middle time domain symbol in the $j^{th}$ time unit. The $j^{th}$ time unit is any time unit other than a head time unit and a tail time unit in the K time units, where j is a positive integer greater than 1 and less than K.

Optionally, the start time domain symbol occupied by the front-loaded DMRS is configured by using the radio resource control RRC signaling. Alternatively, the start time domain symbol occupied by the front-loaded DMRS is predefined.

Optionally, a time unit in the plurality of time units is any one of the following: a slot, a sub-slot, a frame, a subframe, or a time domain resource occupied by one time of data block transmission.

Optionally, the first indication information and the second indication information may be carried in the radio resource control RRC signaling.

Optionally, configuration information about a quantity of DMRSs includes any one of configuration information about a quantity of additional DMRSs, configuration information about a total quantity of DMRSs, configuration information about a variation of a quantity of additional DMRSs, or configuration information about a variation of a total quantity of DMRSs.

In a design, the communication apparatus 900 is configured to perform an action of the network device in the embodiment shown in FIG. 5. Optionally, modules in the communication apparatus 900 may be implemented by using software. As shown in FIG. 9, the terminal device 900 includes:

a processing unit 920, configured to determine first downlink control information DCI, where the first DCI indicates a first DMRS configuration pattern, the first DMRS configuration pattern belongs to a DMRS configuration pattern set, the DMRS configuration pattern set includes at least two different DMRS configuration patterns, the first DMRS configuration pattern is used to determine quantities of DMRSs configured in K time units, and quantities of DMRSs configured in at least two of the K time units are different, where K is a positive integer greater than or equal to 2; and a transceiver unit 910, configured to send the first DCI to the terminal device.

Optionally, K is predefined, or K is indicated by the network device by using additional indication information, or K is determined by a quantity of pieces of value content in the first DMRS configuration pattern.

Optionally, data blocks transmitted in all of the K time units are the same, and the additional indication information is used to determine a quantity of times of repeated transmission of the data block; or data blocks transmitted in the K time units are not completely the same, and the additional indication information is used to determine a quantity of different data blocks in the K time units.

Not completely the same may be understood as that the data blocks transmitted in the plurality of time units are different from each other, or may be understood as that some data blocks transmitted in the plurality of time units are the same, and the other data blocks transmitted in the plurality of time units are different.

Optionally, the DMRS configuration pattern set is configured by using radio resource control RRC signaling or is a predefined configuration pattern set.

Optionally, the first DCI indicates an index value of the first DMRS configuration pattern. Before the transceiver unit 910 sends the first DCI to the terminal device, the transceiver unit 910 is further configured to send media access control control element MAC CE signaling to the terminal device. The MAC CE signaling is used to activate determining the first DMRS configuration pattern from the DMRS configuration pattern set by the terminal device based on the index value of the first DMRS configuration pattern.

Optionally, when only one front-loaded DMRS is configured in a $j^{th}$ time unit in the K time units, a start time domain symbol occupied by the front-loaded DMRS is a middle time domain symbol in the $j^{th}$ time unit. The $j^{th}$ time unit is any time unit other than a head time unit and a tail time unit in the K time units, where j is a positive integer greater than 1 and less than K.

Optionally, the start time domain symbol occupied by the front-loaded DMRS is configured by using radio resource control RRC signaling; or the start time domain symbol occupied by the front-loaded DMRS is predefined.

Optionally, a time unit in the K time units is any one of the following: a slot, a sub-slot, a frame, a subframe, or a time domain resource occupied by one time of data block transmission.

Optionally, the first DMRS configuration pattern includes any one of a configuration pattern of a quantity of additional DMRSs, a configuration pattern of a total quantity of DMRSs, a configuration pattern of a variation of a quantity of additional DMRSs, or a configuration pattern of a variation of a total quantity of DMRSs.

In a design, the communication apparatus 900 is configured to perform an action of the network device in the embodiment shown in FIG. 6. Optionally, modules in the communication apparatus 900 may be implemented by using software. As shown in FIG. 9, the terminal device 900 includes:

a processing unit 920, configured to determine first information, where the first information indicates to use same transmit power in K time units or perform joint channel estimation in K time units, and a maximum of one additional demodulation reference signal DMRS is configured in each of the K time units, where K is a positive integer greater than or equal to 2; and a transceiver unit 910, configured to send the first information to the terminal device.

Optionally, K is greater than a first threshold, and the first threshold is predefined, or the first threshold is indicated by the communication apparatus by using second information. Optionally, the first message and the second message may be carried in same signaling, or may be carried in different signaling.

Optionally, the first information may be carried in DCI or RRC signaling.

Optionally, when only one front-loaded DMRS is configured in a $j^{th}$ time unit in the K time units, a start time domain symbol occupied by the front-loaded DMRS is a middle time domain symbol in the $j^{th}$ time unit. The $j^{th}$ time unit is any time unit other than a head time unit and a tail time unit in the K time units, where j is a positive integer greater than 1 and less than K.

Optionally, the start time domain symbol occupied by the front-loaded DMRS is configured by using radio resource control RRC signaling; or the start time domain symbol occupied by the front-loaded DMRS is predefined.

Optionally, a time unit in the K time units is any one of the following: a slot, a sub-slot, a frame, a subframe, or a time domain resource occupied by one time of data block transmission.

In a design, the communication apparatus 900 is configured to perform an action of the network device in the embodiment shown in FIG. 7. Optionally, modules in the communication apparatus 900 may be implemented by using software. As shown in FIG. 9, the terminal device 900 includes:

a processing unit 920, configured to determine third indication information, where the third indication information includes N values, the N values are in a one-to-one correspondence with N time units, and an $i^{th}$ value in the N values indicates information about a quantity of demodulation reference signals DMRSs in an $i^{th}$ time unit in the N time units, where i and N are positive integers, and 1≤i≤N; and a transceiver unit 910, configured to send the third indication information to the terminal device.

Optionally, the third indication information includes N groups of bits, the N groups of bits are in a one-to-one correspondence with the N time units, and an $i^{th}$ value in the N values corresponds to an $i^{th}$ group of bits in the N groups of bits.

Optionally, a quantity of time domain symbols occupied by a front-loaded DMRS is 1, and the $i^{th}$ value is determined by using 2 bits; or a quantity of time domain symbols occupied by a front-loaded DMRS is 2, and the $i^{th}$ value is determined by using 1 bit.

Optionally, the third indication information may be carried in radio resource control RRC signaling or downlink control information DCI.

Optionally, the information about the quantity of DMRSs includes any one of the following types of information: a quantity of additional DMRSs, a total quantity of DMRSs, a variation of the quantity of additional DMRSs, and a variation of the total quantity of DMRSs. The total quantity of DMRSs is a sum of the quantity of additional DMRSs and a quantity of front-loaded DMRSs.

Optionally, the third indication information is carried in the DCI, and the transceiver unit 910 is further configured to send configuration information to the terminal device, where the configuration information indicates a type of the information about the quantity of DMRSs.

Optionally, the third indication information is carried in the RRC signaling, and a type of the information about the quantity of DMRSs is predefined. Alternatively, the transceiver unit 910 is further configured to send configuration information to the terminal device, where the configuration information indicates a type of the information about the quantity of DMRSs.

Optionally, the $i^{th}$ value indicates the quantity of additional DMRSs in the $i^{th}$ time unit, and the transceiver unit 910 is further configured to send fourth indication information to the terminal device, where the fourth indication information indicates that no front-loaded DMRS is configured in the $i^{th}$ time unit.

Optionally, the $i^{th}$ value indicates a variation of the quantity of additional DMRSs in the $i^{th}$ time unit, and the transceiver unit 910 is further configured to send fifth indication information to the terminal device, where the fifth indication information indicates whether a front-loaded DMRS is configured in the $i^{th}$ time unit.

Optionally, the third indication information indicates the terminal device to determine the quantity of additional DMRSs in the $i^{th}$ time unit, where the $i^{th}$ value indicates the quantity of additional DMRSs in the $i^{th}$ time unit; or the third indication information indicates the terminal device to determine a total quantity of DMRSs in the $i^{th}$ time unit, where the $i^{th}$ value indicates the total quantity of DMRSs in the $i^{th}$ time unit; or the third indication information and the RRC signaling indicate the terminal device to determine the variation of the quantity of additional DMRSs in the $i^{th}$ time unit, where the $i^{th}$ value indicates the variation of the quantity of additional DMRSs in the $i^{th}$ time unit, and the RRC signaling indicates the quantity of additional DMRSs in the $i^{th}$ time unit; or the third indication information and the RRC signaling indicate the terminal device to determine a variation of a total quantity of DMRSs in the $i^{th}$ time unit, where the $i^{th}$ value indicates a variation of the total quantity of DMRSs in the $i^{th}$ time unit, and the RRC signaling indicates the quantity of additional DMRSs in the $i^{th}$ time unit.

Optionally, when only one front-loaded DMRS is configured in a $j^{th}$ time unit in N time units, a start time domain symbol occupied by the front-loaded DMRS is a middle time domain symbol in the $j^{th}$ time unit. The $j^{th}$ time unit is any time unit other than a head time unit and a tail time unit in the N time units, where j is a positive integer greater than 1 and less than N.

Optionally, the start time domain symbol occupied by the front-loaded DMRS is configured by using the radio resource control RRC signaling. Alternatively, the start time domain symbol occupied by the front-loaded DMRS is predefined.

Optionally, a time unit in the N time units is any one of the following: a slot, a sub-slot, a frame, a subframe, or a time domain resource occupied by one time of data block transmission.

The processing unit 920 in FIG. 9 may be implemented by a processor or a processor-related circuit. The transceiver unit 910 may be implemented by using a transceiver or a transceiver-related circuit. The transceiver unit 910 may also be referred to as a communication unit or a communication interface. The storage unit may be implemented by a memory.

It should be understood that the network device 900 in this embodiment of this application may correspond to the network device in the foregoing method embodiments, and the foregoing and another management operations and/or functions of units in the network device 900 are intended to implement a corresponding step of the foregoing method, and therefore beneficial effect of the foregoing method embodiment may also be implemented.

Figure 10:
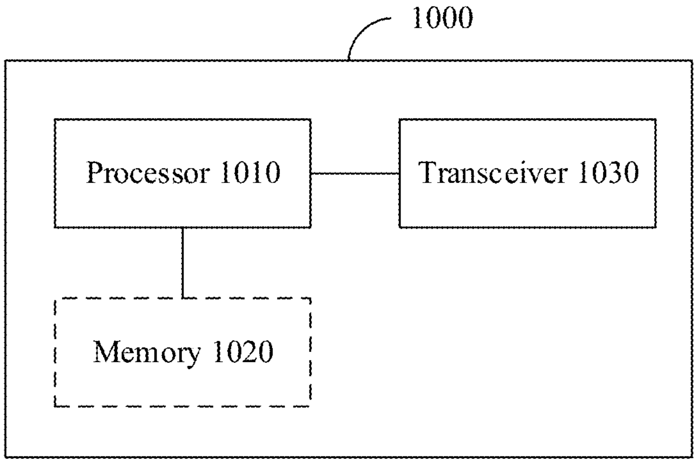
FIG. 10 is another schematic block diagram of a communication apparatus according to an embodiment of this application.

As shown in FIG. 10, an embodiment of this application further provides a communication apparatus 1000. The communication apparatus 1000 includes a processor 1010. The processor 1010 is coupled to a memory 1020. The memory 1020 is configured to store a computer program or instructions and/or data. The processor 1010 is configured to execute the computer program or the instructions and/or the data stored in the memory 1020, so that the method in the foregoing method embodiment is executed.

Optionally, the communication apparatus 1000 includes one or more processors 1010.

Optionally, as shown in FIG. 10, the communication apparatus 1000 may further include the memory 1020.

Optionally, the communication apparatus 1000 includes one or more memories 1020.

Optionally, the memory 1020 may be integrated with the processor 1010, or separately disposed.

Optionally, as shown in FIG. 10, the communication apparatus 1000 may further include a transceiver 1030, and the transceiver 1030 is configured to receive and/or send a signal. For example, the processor 1010 is configured to control the transceiver 1030 to receive and/or send a signal.

In a solution, the communication apparatus 1000 is configured to perform operations performed by the terminal device in the foregoing method embodiments.

For example, the processor 1010 is configured to perform processing-related operations performed by the terminal device in the foregoing method embodiments, and the transceiver 1030 is configured to perform receiving/sending-related operations performed by the terminal device in the foregoing method embodiments.

In another solution, the communication apparatus 1000 is configured to perform the operations performed by the network device in the foregoing method embodiments.

For example, the processor 1010 is configured to perform a processing-related operation performed by the network device in the foregoing method embodiments, and the transceiver 1030 is configured to perform a receiving/sending-related operation performed by the network device in the foregoing method embodiments.

Figure 11:
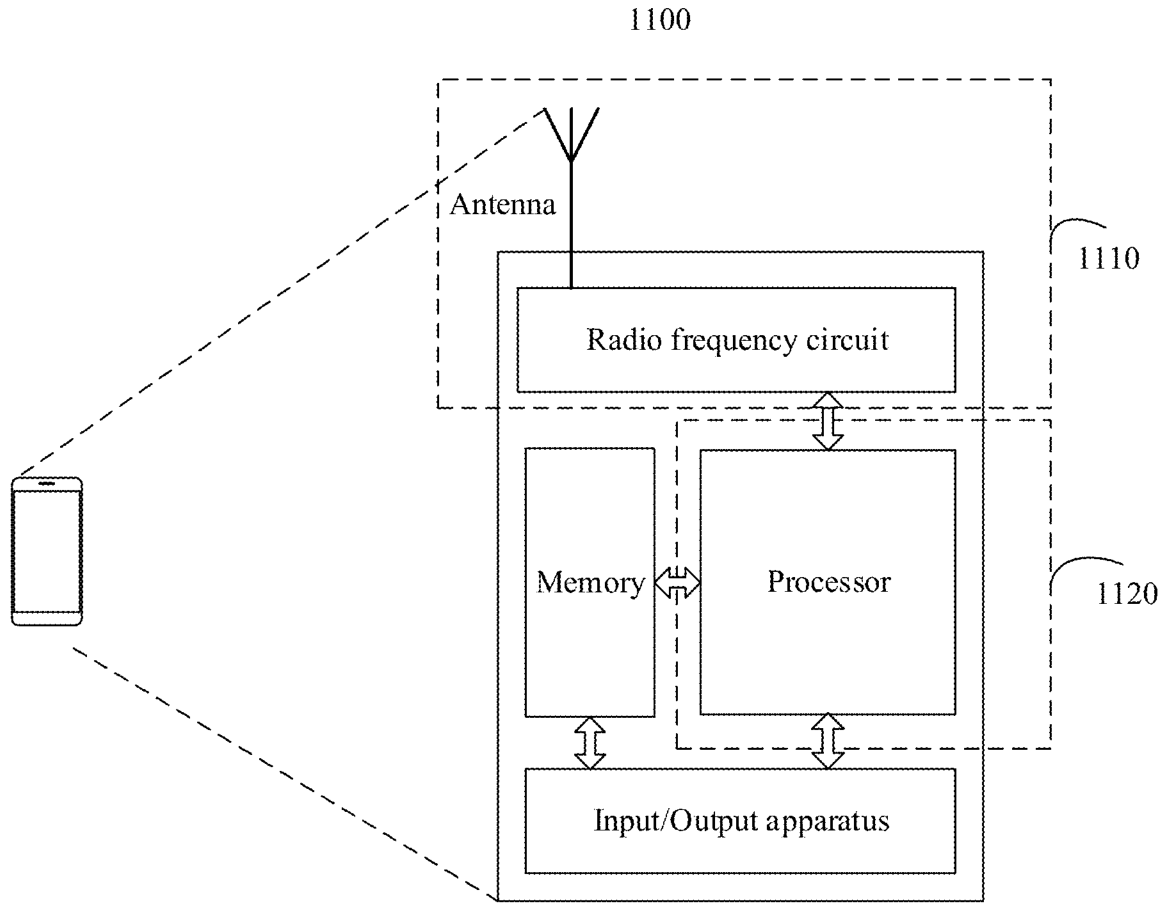
FIG. 11 is a schematic block diagram of a terminal device according to an embodiment of this application.

An embodiment of this application further provides a communication apparatus 1100. The communication apparatus 1100 may be a terminal device or a chip. The communication apparatus 1100 may be configured to perform an operation performed by the terminal device in the foregoing method embodiments. When the communication apparatus 1100 is a terminal device, FIG. 11 is a simplified schematic structural diagram of the terminal device. For ease of understanding and ease of illustration, in FIG. 11, an example in which the terminal device is a mobile phone is used. As shown in FIG. 11, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display, or a keyboard, is mainly configured to receive data entered by a user, and output data to the user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 11 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, the antenna and a radio frequency circuit that have a transceiver function may be considered as a transceiver unit of the terminal device, and a processor that has a processing function may be considered as a processing unit of the terminal device.

As shown in FIG. 11, the terminal device includes a transceiver unit 1110 and a processing unit 1120. The transceiver unit 1110 may also be referred to as a transceiver, a transceiver machine, a transceiver apparatus, or the like. The processing unit 1120 may also be referred to as a processor, a processing board, a processing module, a processing apparatus, or the like.

Optionally, a component that is in the transceiver unit 1110 and that is configured to implement a receiving function may be considered as a receiving unit, and a component that is in the transceiver unit 1110 and that is configured to implement a sending function may be considered as a sending unit. That is, the transceiver unit 1110 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmit circuit, or the like.

For example, in an implementation, the transceiver unit 1110 is configured to perform receiving operations of the terminal device in FIG. 2 to FIG. 7. The processing unit 1120 is configured to perform processing actions on the terminal device side in FIG. 2 to FIG. 7.

It should be understood that FIG. 11 is merely an example instead of a limitation. The terminal device including the transceiver unit and the processing unit may not depend on the structure shown in FIG. 11.

When the communication apparatus 1100 is a chip, the chip includes a transceiver unit and a processing unit. The transceiver unit may be an input/output circuit or a communication interface. The processing unit may be a processor, a microprocessor, or an integrated circuit that is integrated on the chip.

An embodiment of this application further provides a communication apparatus 1200. The communication apparatus 1200 may be a network device or a chip. The communication apparatus 1200 may be configured to perform an operation performed by the network device in the foregoing method embodiments.

Figure 12:
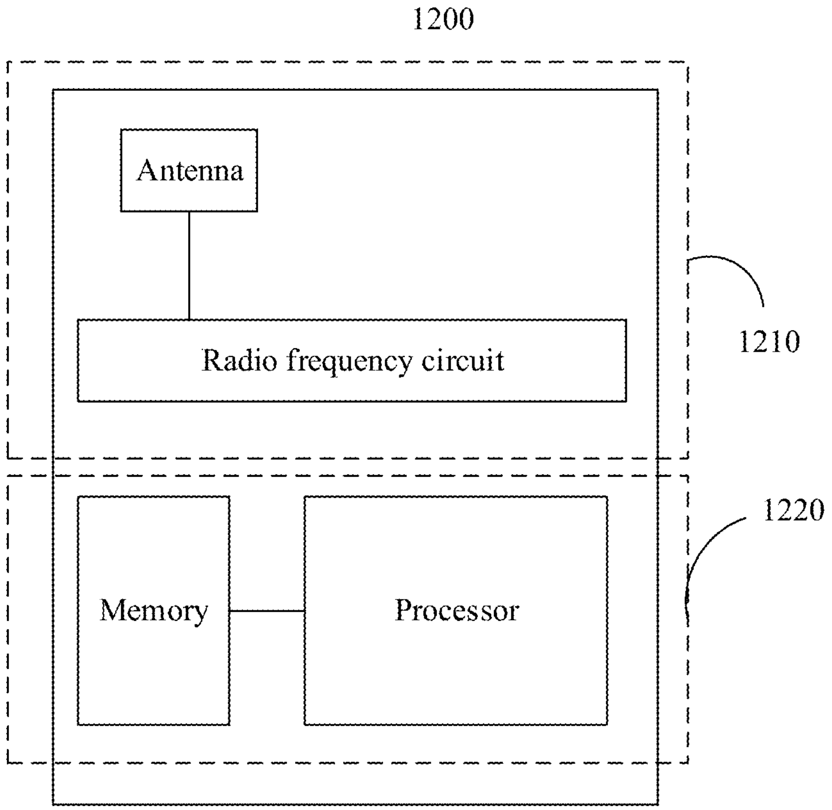
FIG. 12 is a schematic block diagram of a network device according to an embodiment of this application.

When the communication apparatus 1200 is a network device, for example, a base station, FIG. 12 is a simplified schematic diagram of a structure of the base station. The base station includes a part 1210 and a part 1220. The part 1212 is mainly configured to: send and receive a radio frequency signal, and perform conversion between the radio frequency signal and a baseband signal. The part 1220 is mainly configured to: perform baseband processing, control the base station, and so on. The part 1210 may be usually referred to as a transceiver unit, a transceiver machine, a transceiver circuit, a transceiver, or the like. The part 1220 is usually a control center of the base station, and may usually be referred to as a processing unit, and is configured to control the base station to perform a processing operation on a network device side in the foregoing method embodiments.

The transceiver unit in the part 1210 may also be referred to as a transceiver, a transceiver machine, or the like, and includes an antenna and a radio frequency circuit. The radio frequency circuit is mainly configured to perform radio frequency processing. Optionally, a component, in the part 1210, that is configured to implement a receiving function may be considered as a receiving unit, and a component that is configured to implement a sending function may be considered as a sending unit. That is, the part 1210 includes the receiving unit and the sending unit. The receiving unit may also be referred to as a receiving machine, a receiver, a receiving circuit, or the like. The sending unit may be referred to as a transmitter machine, a transmitter, a transmitting circuit, or the like.

The part 1220 may include one or more boards, and each board may include one or more processors and one or more memories. The processor is configured to read and execute a program in the memory, to implement a baseband processing function and control the base station. If there are a plurality of boards, the boards may be interconnected with each other, to enhance a processing capability. In an optional implementation, a plurality of boards may share one or more processors, a plurality of boards may share one or more memories, or a plurality of boards may simultaneously share one or more processors.

For example, in an implementation, the transceiver unit in the part 1210 is configured to perform receiving/sending-related steps performed by the network device in the embodiments shown in FIG. 2 to FIG. 3, and the part 1220 is configured to perform processing-related steps performed by the network device in the embodiments shown in FIG. 2 to FIG. 3.

It should be understood that FIG. 12 is merely an example instead of a limitation. The network device including the transceiver unit and the processing unit may not depend on the structure shown in FIG. 12.

When the communication apparatus 1200 is the chip, the chip includes a transceiver unit and a processing unit. The transceiver unit may be an input/output circuit or a communication interface. The processing unit is a processor, a microprocessor, or an integrated circuit integrated on the chip.

An embodiment of this application further provides a computer-readable storage medium. The computer-readable storage medium stores computer instructions used to implement the method performed by the terminal device or the method performed by the network device in the foregoing method embodiment.

For example, when a computer program is executed by a computer, the computer is enabled to implement the method performed by the terminal device or the method performed by the network device in the foregoing method embodiments.

An embodiment of this application further provides a computer program product including instructions. When the instructions are executed by a computer, the computer is enabled to implement the method performed by the terminal device or the method performed by the network device in the foregoing method embodiments.

An embodiment of this application further provides a communication system. The communication system includes the network device and the terminal device in the foregoing embodiments.

In an example, the communication system includes the network device and the terminal device in embodiments described above with reference to FIG. 2 to FIG. 7.

For explanations and beneficial effects of related content of any of the communication apparatuses provided above, refer to the corresponding method embodiment provided above. Details are not described herein again.

In this embodiment of this application, the terminal device or the network device may include a hardware layer, an operating system layer running above the hardware layer, and an application layer running above the operating system layer. The hardware layer may include hardware such as a central processing unit (CPU), a memory management unit (MMU), and a memory (also referred to as a primary memory). An operating system at the operating system layer may be any one or more computer operating systems that implement service processing through a process, for example, a Linux operating system, a Unix operating system, an Android operating system, an iOS operating system, or a Windows operating system. The application layer may include applications such as a browser, an address book, word processing software, and instant messaging software.

A specific structure of an execution body of the method provided in embodiments of this application is not specifically limited in embodiments of this application, provided that a program that records code for the method provided in embodiments of this application can be run to perform communication according to the method provided in embodiments of this application. For example, the method provided in embodiments of this application may be performed by a terminal device, a network device, or a function module that is in a terminal device or a network device and that can invoke and execute the program.

Aspects or features of this application may be implemented as a method, an apparatus or a product that uses standard programming and/or engineering technologies. The term "product" used in this specification may cover a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive).

Various storage media described in this specification may indicate one or more devices and/or other machine-readable media that are configured to store information. The term "machine-readable media" may include but is not limited to a radio channel and various other media that can store, include, and/or carry instructions and/or data.

It should be understood that, the processor mentioned in embodiments of this application may be a CPU or may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be understood that the memory mentioned in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM). For example, the RAM may be used as an external cache. By way of example, and not limitation, the RAM may include the following plurality of forms: a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or transistor logic device, or a discrete hardware component, the memory (storage module) may be integrated into the processor.

It should further be noted that the memory described in this specification aims to include but is not limited to these memories and any memory of another proper type.

A person of ordinary skill in the art may be aware that, units and algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief descriptions, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objective of the solutions of embodiments.

In addition, function units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the method described in embodiments of this application. The foregoing storage medium includes any medium that can store program code, for example, a USB flash drive, a removable hard disk, a read-only memory (ROM), a random access memory (RAM), a magnetic disk, or an optical disc.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

It should also be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be further understood that numbers "first" and "second" are introduced in embodiments of this application only to distinguish between different objects, for example, to distinguish between different "devices", or "units". This constitutes no limitation on embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method performed by a terminal device, the method comprising:

receiving, from a network device, first scheduling information for a transmission in a first time unit and second scheduling information for a transmission in a second time unit;

when the first scheduling information is same as the second scheduling information, determining that the transmission in the first time unit meets a first condition, wherein the first condition comprises same transmit power as the transmission in the second time unit, same precoding as the transmission in the second time unit, a same antenna port as the transmission in the second time unit, or a same frequency domain resource as the transmission in the second time unit; and wherein the second time unit is a time unit before the first time unit, a transmission direction of the transmission in the first time unit is same as a transmission direction of the transmission in the second time unit, no transmission in an opposite direction exists between the second time unit and the first time unit;

receiving third scheduling information sent by the network device, wherein the third scheduling information indicates that a sending device, which is in the terminal device and sends uplink data or which is in the network device and sends downlink data, meets a second condition within first duration, wherein the first duration is duration between the first time unit and the second time unit, and wherein the second condition comprises one or more of: the sending device does not turn off a power amplifier, the sending device does not perform carrier frequency switching, or the sending device does not perform antenna switching, wherein when both the first condition and the second condition are met, the first time unit and the second time unit are available for joint channel estimation; and sending the uplink data in the first time unit and the second time unit, or receiving the downlink data in the first time unit and the second time unit.

2. The method according to claim 1, wherein the first scheduling information and the second scheduling information are carried in downlink control information (DCI) to the terminal device.

3. The method according to claim 1, wherein before the step of receiving downlink data, the method further comprises:

reporting capability information, wherein the capability information indicates whether the terminal device supports joint channel estimation in a plurality of time units.

4. The method according to claim 3, wherein the capability information includes a first part indicating whether the terminal device supports joint channel estimation in the plurality of time units, and a second part indicating a maximum quantity of different time units in which the terminal device can support joint channel estimation.

5. The method according to claim 1, wherein the sending device is the network device that sends the downlink data, the method further comprises:

when both the first condition and the second condition are met, performing joint channel estimation in the first time unit and the second time unit based on a demodulation reference signal (DMRS) in the first time unit and a DMRS in the second time unit.

6. The method according to claim 1, wherein the first duration is duration between the first time unit and the second time unit, and the third scheduling information includes same information as the first scheduling information, and the method further comprises:

determining that the duration between the first time unit and the second time unit, the first time unit and the second time unit are used for joint channel estimation.

7. A method performed by a network device, comprising:

sending, to a terminal device, first scheduling information for a transmission in a first time unit and second scheduling information for a transmission in a second time unit, wherein the second time unit is a time unit before the first time unit, a transmission direction of the transmission in the first time unit is same as a transmission direction of the transmission in the second time unit, no transmission in an opposite direction exists between the second time unit and the first time unit, wherein when the first scheduling information is same as the second scheduling information, the transmission in the first time unit meets a first condition, the first condition comprises same transmit power as the transmission in the second time unit, same precoding as the transmission in the second time unit, a same antenna port as the transmission in the second time unit, or a same frequency domain resource as the transmission in the second time unit;

sending, to the terminal device, third scheduling information indicating that a sending device, which is in the terminal device and sends uplink data or which is in the network device and sends downlink data, meets a second condition within first duration, wherein the first duration is duration between the first time unit and the second time unit, and wherein the second condition comprises one or more of: the sending device does not turn off a power amplifier, the sending device does not perform carrier frequency switching, or the sending device does not perform antenna switching, wherein when both the first condition and the second condition are met, the first time unit and the second time unit are available for joint channel estimation; and sending the downlink data in the first time unit and the second time unit to the terminal device, or receiving the uplink data in the first time unit and the second time unit from the terminal device.

8. The method according to claim 7, wherein the first scheduling information and the second scheduling information are carried in downlink control information (DCI) to the terminal device.

9. The method according to claim 7, wherein before the step of sending the downlink data, the method further comprises:

receiving capability information sent by the terminal device, wherein the capability information indicates whether the terminal device supports joint channel estimation in a plurality of time units.

10. The method according to claim 9, wherein the capability information includes a first part indicating whether the terminal device supports joint channel estimation in the plurality of time units, and a second part indicating a maximum quantity of different time units in which the terminal device can support joint channel estimation.

11. The method according to claim 7, wherein the sending device is the terminal device that sends the uplink data, the method further comprises:

when both the first condition and the second condition are met, performing joint channel estimation in the first time unit and the second time unit based on a demodulation reference signal (DMRS) in the first time unit and a DMRS in the second time unit.

12. The method according to claim 7, wherein the first duration is duration between the first time unit and the second time unit, and the third scheduling information includes same information as the first scheduling information, and the method further comprises:

determining that the duration between the first time unit and the second time unit, the first time unit and the second time unit are used for joint channel estimation.

13. A terminal device comprising:

a memory storing executable instructions;

a processor configured to execute the executable instructions to perform operations of:

receiving, from a network device, first scheduling information for a transmission in a first time unit and second scheduling information for a transmission in a second time unit;

determining that the transmission in the first time unit meets a first condition when the first scheduling information is same as the second scheduling information, wherein the second time unit is a time unit before the first time unit, a transmission direction of the transmission in the first time unit is the same as a transmission direction of the transmission in the second time unit, and no transmission in an opposite direction exists between the second time unit and the first time unit; and the first condition comprises same transmit power as the transmission in the second time unit, same precoding as the transmission in the second time unit, a same antenna port as the transmission in the second time unit, or a same frequency domain resource as the transmission in the second time unit;

receiving, from the network device, third scheduling information indicating that a sending device, which is in the terminal device and sends uplink data or which is in the network device and sends downlink data, meets a second condition within first duration, wherein the first duration is duration between the first time unit and the second time unit, and wherein the second condition comprises one or more of: the sending device does not turn off a power amplifier, the sending device does not perform carrier frequency switching, or the sending device does not perform antenna switching, wherein when both the first condition and the second condition are met, the first time unit and the second time unit are available for joint channel estimation; and sending the uplink data in the first time unit and the second time unit, or receiving the downlink data in the first time unit and the second time unit.

14. The terminal device according to claim 13, wherein the first scheduling information and the second scheduling information are carried in downlink control information (DCI) to the terminal device.

15. The terminal device according to claim 13, wherein before receiving the downlink data, the processor is configured to perform a further operation of:

reporting capability information to the network device, wherein the capability information indicates whether the terminal device supports joint channel estimation in a plurality of time units.

16. The terminal device according to claim 15, wherein the capability information includes a first part indicating whether the terminal device supports joint channel estimation in the plurality of time units, and a second part indicating a maximum quantity of different time units in which the terminal device can support joint channel estimation.

17. A network device comprising:

a memory storing executable instructions; and a processor configured to execute the executable instructions to perform operations of:

sending, to a terminal device, first scheduling information for a transmission in a first time unit and second scheduling information for a transmission in a second time unit, wherein the second time unit is a time unit before the first time unit, a transmission direction of the transmission in the first time unit is same as a transmission direction of the transmission in the second time unit, no transmission in an opposite direction exists between the second time unit and the first time unit, wherein when the first scheduling information is same as the second scheduling information, the transmission in the first time unit meets a first condition, the first condition comprises same transmit power as the transmission in the second time unit, same precoding as the transmission in the second time unit, a same antenna port as the transmission in the second time unit, or a same frequency domain resource as the transmission in the second time unit;

sending, to the terminal device, third scheduling information indicating that a sending device, which is in the terminal device and sends uplink data or which is in the network device and sends downlink data, meets a second condition within first duration, wherein the first duration is duration between the first time unit and the second time unit, and wherein the second condition comprises one or more of: the sending device does not turn off a power amplifier, the sending device does not perform carrier frequency switching, or the sending device does not perform antenna switching, wherein when both the first condition and the second condition are met, the first time unit and the second time unit are available for joint channel estimation; and sending the downlink data in the first time unit and the second time unit to the terminal device, or receiving the uplink data in the first time unit and the second time unit from the terminal device.

18. The network device according to claim 17, wherein the first scheduling information and the second scheduling information are carried in downlink control information (DCI) to the terminal device.

19. The network device according to claim 17, wherein the processor is configured to perform a further operation of:

receiving, from the terminal device, capability information indicating whether the terminal device supports joint channel estimation in a plurality of time units.

20. The network device according to claim 19, wherein the capability information includes a first part indicating whether the terminal device supports joint channel estimation in the plurality of time units, and a second part indicating a maximum quantity of different time units in which the terminal device can support joint channel estimation.

* * * * *